US012250518B2

(12) United States Patent
Kim et al.

(10) Patent No.: US 12,250,518 B2
(45) Date of Patent: Mar. 11, 2025

(54) VIBRATION APPARATUS AND APPARATUS INCLUDING THE SAME

(71) Applicant: LG Display Co., Ltd., Seoul (KR)

(72) Inventors: Taehyung Kim, Paju-si (KR); MinHo Sohn, Paju-si (KR); JunSeok Oh, Paju-si (KR); Jeonggoo Kang, Paju-si (KR); SeulKi Nam, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 237 days.

(21) Appl. No.: 17/876,112

(22) Filed: Jul. 28, 2022

(65) Prior Publication Data

US 2023/0035018 A1 Feb. 2, 2023

(30) Foreign Application Priority Data

Jul. 30, 2021 (KR) ........................ 10-2021-0101039

(51) Int. Cl.
*H04R 17/00* (2006.01)

(52) U.S. Cl.
CPC .................................... *H04R 17/00* (2013.01)

(58) Field of Classification Search
CPC ...... H04R 17/00; H04R 17/005; H04R 29/00; H04R 29/001; H04R 29/002; H04R 2499/15
See application file for complete search history.

(56) References Cited

U.S. PATENT DOCUMENTS

| | | | | |
|---|---|---|---|---|
| 10,327,083 | B2 * | 6/2019 | Rusconi Clerici Beltrami | H04R 29/004 |
| 10,349,182 | B2 * | 7/2019 | Stoppel | H04R 17/00 |
| 10,390,156 | B2 * | 8/2019 | Khwaja | H04R 3/04 |
| 10,516,943 | B2 * | 12/2019 | Dorfmeister | H04R 31/00 |
| 10,715,892 | B2 * | 7/2020 | Guo | H04R 7/04 |
| 11,348,567 | B2 * | 5/2022 | Bernal Castillo | H04R 29/001 |
| 11,709,094 | B2 * | 7/2023 | Kim | H04N 17/004 73/649 |
| 11,750,165 | B2 * | 9/2023 | Oh | H03G 3/30 381/59 |
| 2012/0313484 | A1 | 12/2012 | Kim et al. | |
| 2013/0049876 | A1 | 2/2013 | Onishi et al. | |
| 2013/0108061 | A1 | 5/2013 | Ando et al. | |

(Continued)

FOREIGN PATENT DOCUMENTS

| | | | |
|---|---|---|---|
| CN | 112805096 | A | 5/2021 |
| DE | 102012001443 | A1 | 5/2013 |

(Continued)

OTHER PUBLICATIONS

Japanese Office Action of Application No. 2022-119186, dated Aug. 8, 2023, 4 pages.

(Continued)

*Primary Examiner* — Ryan Robinson
(74) *Attorney, Agent, or Firm* — Morgan, Lewis & Bockius LLP

(57) ABSTRACT

A vibration apparatus may include a vibration generator including a piezoelectric material and a sensor portion configured at the vibration generator, and thus, may correct or compensate for an electrical characteristic change of the vibration generator and may correct or compensate for a vibration characteristic of the vibration generator. An apparatus including the vibration apparatus is also disclosed.

44 Claims, 24 Drawing Sheets

(56) References Cited

U.S. PATENT DOCUMENTS

| | | | | |
|---|---|---|---|---|
| 2013/0134835 | A1 | 5/2013 | Kim et al. | |
| 2015/0180443 | A1 | 6/2015 | Hayashi et al. | |
| 2018/0295439 | A1* | 10/2018 | Garrett | H04R 1/1016 |
| 2019/0155087 | A1* | 5/2019 | Yoon | G02F 1/133602 |
| 2019/0268696 | A1 | 8/2019 | Roche et al. | |
| 2021/0048339 | A1 | 2/2021 | Kim et al. | |
| 2021/0240272 | A1* | 8/2021 | Tominaga | G06F 3/016 |

FOREIGN PATENT DOCUMENTS

| | | | |
|---|---|---|---|
| DE | 102017214630 | A1 * | 2/2019 |
| JP | 2012049789 | A | 3/2012 |
| JP | 2013115814 | A | 6/2013 |
| JP | 2016134842 | A | 7/2016 |
| JP | 2018157347 | A | 10/2018 |
| TW | 201535634 | A | 9/2015 |
| TW | 201838429 | A | 10/2018 |
| WO | 2017/196682 | A1 | 11/2017 |
| WO | 2018021075 | A1 | 2/2018 |

OTHER PUBLICATIONS

Taiwan Office Action of Application No. 111128636, dated May 11, 2023, 6 pages.

Extended European Search Report of Application No. 22187176.7, dated Dec. 1, 2022, 7 pages.

* cited by examiner

11a: 11a1, 11a2 PL1: PL11, PL12 PL2: PL21, PL22

VIBRATION APPARATUS AND APPARATUS INCLUDING THE SAME

CROSS-REFERENCE TO RELATED APPLICATIONS

This application claims the benefit of and priority to Korean Patent Application No. 10-2021-0101039 filed on Jul. 30, 2021, the entirety of which is incorporated herein by reference for all purposes as if fully set forth herein.

BACKGROUND

1. Technical Field

The present disclosure relates to apparatuses and particularly to, for example, without limitation, a vibration apparatus and an apparatus including the vibration apparatus.

2. Discussion of the Related Art

Vibration apparatuses may vibrate to output a sound based on a component of a particular type such as a coil type including a magnet and a coil or a piezoelectric type using a piezoelectric device.

Piezoelectric-type vibration apparatuses may be easily damaged by an external impact due to a fragile characteristic of a piezoelectric device, and as a result, there is a problem where the reliability of sound reproduction is low. Moreover, comparing with the coil type, because a piezoelectric constant of piezoelectric devices is low, the piezoelectric-type vibration apparatuses are low in sound characteristic and/or sound pressure level characteristic in a low-pitched sound band.

The inventors have recognized that a piezoelectric characteristic or a vibration characteristic of a piezoelectric material of a piezoelectric device may be changed by temperature. The inventors have recognized that a driving characteristic or a driving characteristic of the piezoelectric material of the piezoelectric device may be changed based on, for example, a peripheral environment variable such as a temperature and/or humidity, or the like, and as a result, there is a problem where the reliability of sound reproduction is low.

The description provided in the discussion of the related art section should not be assumed to be prior art merely because it is mentioned in or associated with that section. The discussion of the related art section may include information that describes one or more aspects of the subject technology.

SUMMARY

Accordingly, the inventors have recognized the problems described above as well as the problems and disadvantages of the related art and have performed extensive research and experiments for implementing a vibration apparatus having an enhanced reliability of sound reproduction by a piezoelectric material and have performed additional search and experiments for implementing a vibration apparatus where a sound characteristic and/or a sound pressure level characteristic may be enhanced in a low-pitched sound band. Through the extensive research and experiments, the inventors have invented a new vibration apparatus for enhancing the reliability of sound reproduction and an apparatus including the vibration apparatus and have invented a new vibration apparatus for enhancing a sound characteristic and/or a sound pressure level characteristic of the low-pitched sound band and an apparatus including the vibration apparatus.

An aspect of the present disclosure is directed to providing a vibration apparatus having an enhanced reliability of a vibration generator using a piezoelectric material and an apparatus including the vibration apparatus.

Another aspect of the present disclosure is directed to providing a vibration apparatus for correcting an electrical characteristic and/or a vibration characteristic of a vibration generator using a piezoelectric material and an apparatus including the vibration apparatus.

Another aspect of the present disclosure is directed to providing a vibration apparatus for enhancing a sound characteristic and/or a sound pressure level characteristic of a low-pitched sound band and an apparatus including the vibration apparatus.

Another aspect of the present disclosure is directed to providing a vibration apparatus for reproducing a sound including sounds of two or more channels and an apparatus including the vibration apparatus.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

To achieve these and other aspects and advantages of the present disclosure, as embodied and broadly described herein, in one or more aspects, a vibration apparatus includes a vibration generator including a piezoelectric material, and a sensor portion configured at the vibration generator.

In another aspect of the present disclosure, an apparatus may include a vibration member, and a vibration generating apparatus including one or more vibration devices configured to vibrate the vibration member. The one or more vibration devices may include a vibration generator including a piezoelectric material, and a sensor portion configured at the vibration generator.

According to an example embodiment of the present disclosure, a vibration apparatus having an enhanced reliability of a vibration generator using a piezoelectric material and an apparatus including the vibration apparatus may be provided.

According to an example embodiment of the present disclosure, a vibration apparatus for correcting an electrical characteristic and/or a vibration characteristic of a vibration generator using a piezoelectric material and an apparatus including the vibration apparatus may be provided.

According to an example embodiment of the present disclosure, a vibration apparatus for enhancing a sound characteristic and/or a sound pressure level characteristic of a low-pitched sound band and an apparatus including the vibration apparatus may be provided.

According to an example embodiment of the present disclosure, a vibration apparatus for reproducing a sound including sounds of two or more channels and an apparatus including the vibration apparatus may be provided.

The details of the present disclosure described with respect to technical problems, technical solutions, and advantageous effects do not specify essential features of claims, and thus, the scope of claims is not limited by the details described in the detailed description of the present disclosure.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

Figure 1:
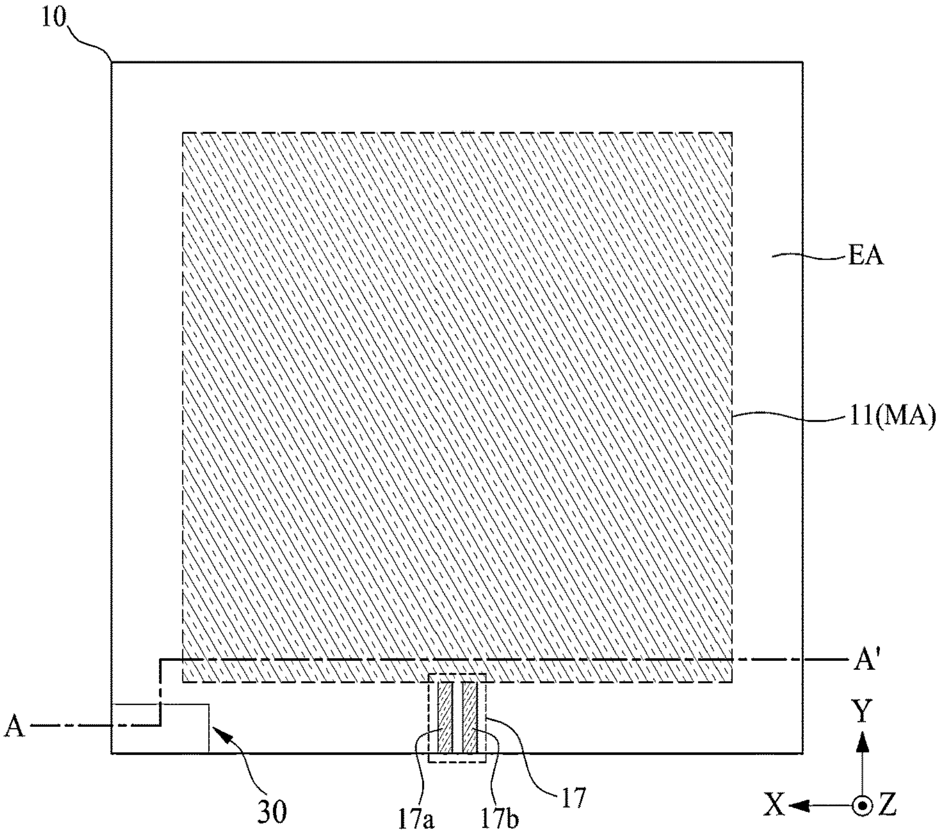
FIG. 1 illustrates a vibration apparatus according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are provided so that this disclosure is thorough and complete and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely examples, and thus, the present disclosure is not limited to the illustrated details.

When the term “comprise,” “have,” “include,” “contain,” “constitute,” “make up of,” “formed of,” or the like is used, one or more other elements may be added unless a term such as “only” or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. Any implementation described herein as an “example” is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term “may” encompasses all the meanings of the term “can.”

In describing a positional relationship, where the positional relationship between two parts is described, for example, using “on,” “over,” “under,” “above,” “below,” “beneath,” “near,” “close to,” or “adjacent to,” “beside,” “next to,” or the like, one or more other parts may be located between the two parts unless a more limiting term, such as “immediate(ly),” “direct(ly),” or “close(ly),” is used. For example, when a structure is described as being positioned “on,” “over,” “under,” “above,” “below,” “beneath,” “near,” “close to,” or “adjacent to,” “beside,” or “next to” another structure, this description should be construed as including a case in which the structures contact each other as well as a case in which one or more additional structures are disposed or interposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

In describing a temporal relationship, when the temporal order is described as, for example, “after,” “subsequent,” “next,” “before,” “preceding,” “prior to,” or the like, a case that is not consecutive or not sequential may be included unless a more limiting term, such as “just,” “immediate(ly),” or “direct(ly),” is used.

It is understood that, although the term “first,” “second,” or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. [The terms “first,” “second,” and the like may be used to distinguish components from each other, but the functions or structures of the components are not limited by ordinal numbers or component names in front of the components.]

In describing elements of the present disclosure, the terms “first,” “second,” “A,” “B,” “(a),” “(b),” or the like may be used. These terms are intended to identify the corresponding element(s) from the other element(s), and these are not used to define the essence, basis, order, or number of the elements.

For the expression that an element or layer is “connected,” “coupled,” or “adhered” to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer “contacts,” “overlaps,” or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term “at least one” should be understood as including any and all combinations of one or more of the associated listed items. For example, the meaning of “at least one of a first item, a second item, and a third item” denotes the combination of items proposed from two or more of the first item, the second item, and the third item as well as only one of the first item, the second item, or the third item.

The expression of a first element, a second elements “and/or” a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression “element A/element B” may be understood as element A and/or element B.

In one or more aspects, the terms “between” and “among” may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Hereinafter, various example embodiments of the present disclosure are described in detail with reference to the accompanying drawings. For convenience of description, a scale, dimension, size, and thickness of each of the elements illustrated in the accompanying drawings may differ from an actual scale, dimension, size, and thickness, and thus, embodiments of the present disclosure are not limited to a scale, dimension, size, and thickness illustrated in the drawings.

Figure 2:
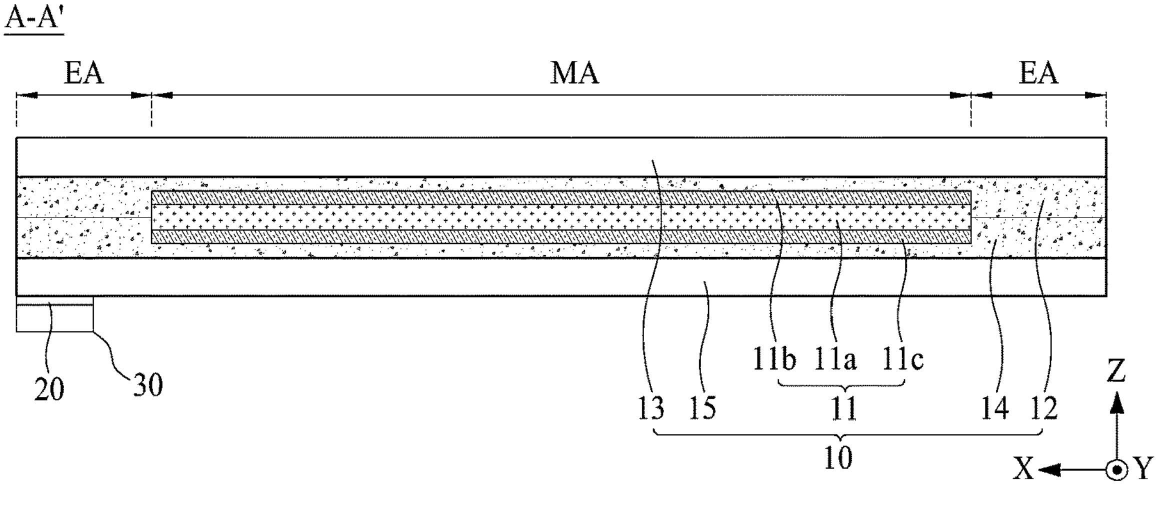
FIG. 2 is an example of a cross-sectional view taken along line A-A' illustrated in FIG. 1.

FIG. 1 illustrates a vibration apparatus according to an example embodiment of the present disclosure, and FIG. 2 is an example of a cross-sectional view taken along line A-A' illustrated in FIG. 1.

With reference to FIGS. 1 and 2, the vibration apparatus according to an example embodiment of the present disclosure may include a vibration generator 10 and a sensor portion 30.

The vibration generator 10 may include a piezoelectric material. For example, the vibration generator 10 may include a piezoelectric material (or a piezoelectric element) having a piezoelectric characteristic (or a piezoelectric effect). For example, the vibration generator 10 may include an inner region MA and an outer region EA surrounding the inner region MA. For example, in the vibration generator 10, the inner region MA may be referred to as a first region, an internal region, a middle region, or a center region, but embodiments of the present disclosure are not limited thereto. The outer region EA may be referred to as a second region, a peripheral region, a border region, an edge region, or an external region, but embodiments of the present disclosure are not limited thereto. For example, the outer region EA of the vibration generator 10 may include a plurality of corner regions.

The vibration generator 10 according to an example embodiment of the present disclosure may each include a vibration structure 11, a first protection member 13, and a second protection member 15.

The vibration structure 11 may be configured in the inner region MA of the vibration generator 10, but embodiments of the present disclosure are not limited thereto. The vibration structure 11 may include a piezoelectric material (or a piezoelectric element) having a piezoelectric characteristic (or a piezoelectric effect). For example, the piezoelectric material may have a characteristic where when pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. For example, the vibration structure 11 may be referred to as a vibration generating structure, a sound generating structure, a vibration generating portion, a sound generating portion, a piezoelectric structure, or a displacement structure, but embodiments of the present disclosure are not limited thereto.

The vibration structure 11 according to an example embodiment of the present disclosure may include a vibration portion 11*a* including a piezoelectric material, a first electrode portion 11*b* disposed at a first surface of the vibration portion 11*a*, and a second electrode portion 11*c* disposed at a second surface, which is opposite to or different from the first surface, of the vibration portion 11*a*.

The vibration portion 11*a* may include a piezoelectric material. The vibration portion 11*a* may be referred to as a vibration layer, a piezoelectric layer, a piezoelectric material layer, a piezoelectric material portion, a piezoelectric vibration layer, a piezoelectric vibration portion, an electroactive layer, an electroactive portion, a displacement portion, a piezoelectric displacement layer, a piezoelectric displacement portion, a sound wave generating layer, a sound wave generating portion, an inorganic material layer, an inorganic material portion, a piezoelectric ceramic, or a piezoelectric ceramic layer, or the like, but embodiments of the present disclosure are not limited thereto.

The vibration portion 11*a* may be formed of a transparent, semitransparent, or opaque piezoelectric material, and the vibration portion 11*a* may be transparent, semitransparent, or opaque.

The vibration portion 11*a* may be configured with (or may include) a ceramic-based material for generating a relatively high vibration, or may be configured with a piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". In the chemical formula, "A" may include a divalent metal element, and "B" may include a tetravalent metal element. As an embodiment of the present disclosure, in the chemical formula "$ABO_3$", "A", and "B" may be cations, and "O" may be anions. For example, the chemical formula "$ABO_3$" may include at least one or more of $PbTiO_3$, $PbZrO_3$, $BaTiO_3$, and $SrTiO_3$, but embodiments of the present disclosure are not limited thereto.

The vibration portion 11*a* according to an example embodiment of the present disclosure may include one or more among lead (Pb), zirconium (Zr), titanium (Ti), zinc (Zn), nickel (Ni), and niobium (Nb), but embodiments of the present disclosure are not limited thereto.

As another embodiment of the present disclosure, the vibration portion 11*a* may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but embodiments of the present disclosure are not limited thereto. In addition, the vibration portion 11*a* may include at least one or more of $CaTiO_3$, $BaTiO_3$, and $SrTiO_3$ without Pb, but embodiments of the present disclosure are not limited thereto.

The vibration portion 11*a* according to an example embodiment of the present disclosure may include a piezoelectric deformation coefficient "$d_{33}$" based on a thickness direction Z. For example, the vibration portion 11*a* may have a piezoelectric deformation coefficient "$d_{33}$" of 1,000 pC/N or more based on a thickness direction Z, and thus, the vibration generating apparatus 200 may be applied to a vibration apparatus having a large size or may be applied to a vibration apparatus having a sufficient vibration characteristic or piezoelectric characteristic. For example, the vibration portion 11*a* according to an example embodiment of the present disclosure may include a PZT-based material ($PbZrTiO_3$) as a main component and may include a softener dopant material doped into "A" site (Pb) and a relaxor ferroelectric material doped into "B" site (ZrTi).

The softener dopant material may configure a morphotropic phase boundary (MPB) of the piezoelectric material, and thus, a piezoelectric characteristic and a dielectric characteristic of the vibration portion 11*a* may be enhanced. For example, in the vibration portion 11*a*, the morphotropic phase boundary (MPB) may be configured by including the softener dopant material to the PZT-based material ($PbZrTiO_3$), and thus, a piezoelectric characteristic and a dielectric characteristic may be enhanced. For example, the softener dopant material may increase the piezoelectric deformation coefficient "$d_{33}$" of the vibration portion 11*a*. The softener dopant material according to an example embodiment of the present disclosure may include a dyad element "+2" to a triad element "+3". For example, the softener dopant material may include strontium (Sr), barium (Ba), lanthanum (La), neodymium (Nd), calcium (Ca), yttrium (Y), erbium (Er), or ytterbium (Yb).

The relaxor ferroelectric material may enhance an electric deformation characteristic of the vibration portion 11*a*. For example, the relaxor ferroelectric material doped into the PZT-based material ($PbZrTiO_3$) may enhance an electric deformation characteristic of the vibration portion 11*a*. For example, the relaxor ferroelectric material according to an example embodiment of the present disclosure may include a lead magnesium niobate (PMN)-based material or a lead nickel niobate (PNN)-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$.

According to an example embodiment of the present disclosure, the vibration portion 11*a* may further include a donor material doped into "B" site (ZrTi) of the PZT-based material ($PbZrTiO_3$), in order to more enhance a piezoelectric coefficient. For example, the donor material doped into the "B" site (ZrTi) may include a tetrad element "+4" or a hexad element "+6". For example, the donor material doped into the "B" site (ZrTi) may include tellurium (Te), germanium (Ge), uranium (U), bismuth (Bi), niobium (Nb), tantalum (Ta), antimony (Sb), or tungsten (W).

The vibration portion 11*a* according to an example embodiment of the present disclosure may have a piezoelectric deformation coefficient "$d_{33}$" of 1,000 pC/N or more based on a thickness direction Z, thereby implementing a vibration apparatus having an enhanced vibration characteristic. For example, a vibration apparatus including a vibration portion 11*a* having an enhanced vibration characteristic may be applied to an apparatus including a large-area vibration member or a display apparatus including a large-area vibration member.

The vibration portion 11*a* according to an example embodiment of the present disclosure may be configured in a circular shape, an ellipse shape, or a polygonal shape, but embodiments of the present disclosure are not limited thereto.

The first electrode portion 11*b* may be disposed at a first surface (or a top surface) of the vibration portion 11*a*. For example, the first electrode portion 11*b* may be electrically connected to the first surface of the vibration portion 11*a*. For example, the first electrode portion 11*b* may have a single electrode (or a common electrode) shape which is disposed at a whole first surface of the vibration portion 11*a*. For example, the first electrode portion 11*b* may have the same shape as the vibration portion 11*a*, but embodiments of the present disclosure are not limited thereto. The first electrode portion 11*b* according to an example embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), Mg, or the like, or an alloy thereof, but embodiments of the present disclosure are not limited thereto.

The second electrode portion 11*c* may be disposed at a second surface (or a rear surface) opposite to or different from the first surface the vibration portion 11*a*. For example, the second electrode portion 11*c* may be electrically connected to the second surface of the vibration portion 11*a*. For example, the second electrode portion 11*c* may have a single electrode (or a common electrode) shape which is disposed at a whole second surface of the vibration portion 11*a*. The second electrode portion 11*c* may have the same shape as the vibration portion 11*a*, but embodiments of the present disclosure are not limited thereto. The second electrode portion 11*c* according to an example embodiment of the present disclosure may be formed of a transparent conductive material, a semitransparent conductive material, or an opaque conductive material. For example, the second electrode portion 11*c* may be formed of the same material as the first electrode portion 11*b*, but embodiments of the present disclosure are not limited thereto. As another embodiment of the present disclosure, the second electrode portion 11*c* may be formed of a different material than the first electrode portion 11*b*.

The vibration portion 11*a* may be polarized (or poling) by a certain voltage applied to the first electrode portion 11*b* and the second electrode portion 11*c* in a certain temperature atmosphere or a temperature atmosphere which is changed from a high temperature to a room temperature, but embodiments of the present disclosure are not limited thereto. For example, the vibration portion 11*a* may alternately and repeatedly contract and expand based on an inverse piezoelectric effect according to a vibration driving signal (or a sound signal or a voice signal) applied to the first electrode portion 11*b* and the second electrode portion 11*c* from the outside, and thus, may be displaced or vibrated.

The first protection member 13 may be disposed at the first electrode portion 11*b*. The first protection member 13 may protect the first electrode portion 11*b*. The second protection member 15 may be disposed at the second electrode portion 11*c*. The second protection member 15 may protect the second electrode portion 11*c*. For example, the first protection member 13 and the second protection member 15 may be formed of a plastic material, a fiber material, or wood material, but embodiments of the present disclosure are not limited thereto. For example, the first protection member 13 may be formed of the same or different material as the second protection member 15. For example, each of the first protection member 13 and the second protection member 15 may be a polyimide (PI) film or a polyethylene terephthalate (PET) film, but embodiments of the present disclosure are not limited thereto. Any one of the first protection member 13 and the second protection member 15 may be connected or coupled to a vibration member (or a vibration plate) by a connection member. For example, the first protection member 13 may be connected or coupled to the vibration member by the connection member.

The vibration generator 10 according to an example embodiment of the present disclosure may further include a first adhesive layer 12 and a second adhesive layer 14.

The first adhesive layer 12 may be disposed between the vibration structure 11 and the first protection member 13. For example, the first adhesive layer 12 may be disposed between the first electrode portion 11*b* of the vibration structure 11 and the first protection member 13. The first protection member 13 may be disposed at a first surface (or the first electrode portion 11*b*) of the vibration structure 11 by the first adhesive layer 12. For example, the first protection member 13 may be coupled or connected to the first surface (or the first electrode portion 11*b*) of the vibration structure 11 by a film laminating process using the first adhesive layer 12.

The second adhesive layer 14 may be disposed between the vibration structure 11 and the second protection member 15. For example, the second adhesive layer 14 may be disposed between the second electrode portion 11*c* of the vibration structure 11 and the second protection member 15. The second protection member 15 may be disposed at a second surface (or the second electrode portion 11*c*) of the vibration structure 11 by the second adhesive layer 14. For example, the second protection member 15 may be coupled or connected to the second surface (or the second electrode portion 11*c*) of the vibration structure 11 by a film laminating process using the second adhesive layer 14.

The first adhesive layer 12 and the second adhesive layer 14 may be connected or coupled to each other between the first protection member 13 and the second protection member 15. For example, the first adhesive layer 12 and the second adhesive layer 14 may be connected or coupled to each other at the outer region EA of the vibration generator 10. For example, the first adhesive layer 12 and the second adhesive layer 14 may be connected or coupled to each other at a periphery portion between the first protection member 13 and the second protection member 15. Accordingly, the vibration structure 11 may be surrounded by the first adhesive layer 12 and the second adhesive layer 14. For example, the first adhesive layer 12 and the second adhesive layer 14 may completely surround the whole vibration structure 11.

The first adhesive layer 12 and the second adhesive layer 14 may include an electric insulating material. For example, the electric insulating material may have adhesiveness and may include a material capable of compression and decompression. For example, one or more of the first adhesive layer 12 and the second adhesive layer 14 may include an epoxy-based polymer, an acrylic-based polymer, a silicone-based polymer, or a urethane-based polymer, but embodiments of the present disclosure are not limited thereto.

The vibration generator 10 according to an example embodiment of the present disclosure may further include a pad portion (or a terminal part) 17.

The pad portion 17 may be electrically connected to one portion (or one end or one side) of one or more among the first electrode portion 11*b* and the second electrode portion 11*c*. For example, the pad portion 17 may be disposed at a first periphery portion of one or more among the first protection member 13 and the second protection member 15.

The pad portion 17 according to an example embodiment of the present disclosure may include a first pad electrode 17*a* and a second pad electrode 17*b*. For example, one or more of the first pad electrode 17*a* and the second pad electrode 17*b* may be exposed at the first periphery portion of one or more among the first protection member 13 and the second protection member 15.

The first pad electrode 17*a* may be electrically coupled or electrically and directly connected to a portion of the first electrode portion 11*b*. For example, the first pad electrode 17*a* may be a protrusion portion which extends or protrudes from a portion of the first electrode portion 11*b*, but embodiments of the present disclosure are not limited thereto.

The second pad electrode 17*b* may be electrically coupled or electrically and directly connected to a portion of the second electrode portion 11*c*. For example, the second pad electrode 17*b* may be a protrusion portion which extends or protrudes from a portion of the second electrode portion 11*c*, but embodiments of the present disclosure are not limited thereto.

The sensor portion 30 may be configured in the vibration generator 10. For example, the sensor portion 30 may be configured outside or inside the vibration generator 10. For example, the sensor portion 30 may include one or more sensors which are configured at one or more of the inner region MA and the outer region EA of the vibration generator 10.

The sensor portion 30 according to an example embodiment of the present disclosure may be disposed at the outer region EA of the vibration generator 10. For example, the sensor portion 30 may be disposed at the outer region EA adjacent to the pad portion 17 of the vibration generator 10.

The sensor portion 30 according to an example embodiment of the present disclosure may be configured at one or more of the first protection member 13 and the second protection member 15 of the vibration generator 10. For example, the sensor portion 30 may be configured at one periphery portion (or a first periphery portion) of any one of the first protection member 13 and the second protection member 15 so as to be parallel with the pad portion 17 of the vibration generator 10.

The sensor portion 30 according to an example embodiment of the present disclosure may be configured to sense a peripheral environment change of the vibration apparatus or the vibration generator 10. For example, the sensor portion 30 may be configured to sense a peripheral environment change and/or humidity change of the vibration apparatus or the vibration generator 10, or may be configured to sense a temperature change and/or a humidity change of the vibration apparatus or the vibration generator 10 caused by a peripheral environment of the vibration apparatus or the vibration generator 10. For example, the sensor portion 30 may be configured so that an electrical feature thereof is changed based on a physical displacement and/or deformation caused by a temperature change and/or a humidity change of the vibration apparatus or the vibration generator 10.

The sensor portion 30 according to an example embodiment of the present disclosure may be configured to sense an electrical characteristic change and/or a physical change of the vibration generator 10. For example, the sensor portion 30 may be configured to sense an electrical characteristic change and/or a physical change of the vibration generator 10 caused by a peripheral environment change of the vibration apparatus or the vibration generator 10. The sensor portion 30 may be configured to have an electrical feature which is changed by a physical displacement and/or deformation caused by a stress applied to the vibration generator 10. For example, a stress applied to the vibration generator 10 may include a force, pressure, a tension, a weight, heat, or humidity, or the like, but embodiments of the present disclosure are not limited thereto.

The sensor portion 30 according to an example embodiment of the present disclosure may include a strain gauge, a capacitive sensor, or an acceleration sensor, but embodiments of the present disclosure are not limited thereto. When the sensor portion 30 includes a strain gauge, the strain gauge may include a linear strain gauge, a share strain gauge, a half-bridge strain gauge, a full-bridge strain gauge, a multi-grid strain gauge, or a diagram strain gauge, but embodiments of the present disclosure are not limited thereto.

The sensor portion 30 according to an example embodiment of the present disclosure may be physically displaced and/or deformed based on a temperature change and/or a humidity change of the vibration apparatus or the vibration generator 10. For example, the sensor portion 30 may be physically deformed based on a vibration of the vibration generator 10. For example, the sensor portion 30 may be physically deformed based on a temperature change and/or a humidity change of the vibration generator 10 or may be physically deformed based on a vibration of the vibration generator 10, and thus, an electrical characteristic thereof may be changed.

According to an example embodiment of the present disclosure, the sensor portion 30 may be attached on or coupled to the vibration generator 10 by an adhesive member 20.

The adhesive member 20 may be disposed between the vibration generator 10 and the sensor portion 30, and thus, may be attach or couple the sensor portion 30 on or to the vibration generator 10. For example, the sensor portion 30 may be connected or coupled to a rear surface of the vibration generator 10 by the adhesive member 20. For example, the sensor portion 30 may be connected or coupled to any one of the first protection member 13 and the second protection member 15 of the vibration generator 10 by the adhesive member 20. For example, the sensor portion 30 may be connected or coupled to a rear surface of the second protection member 15 of the vibration generator 10 by the adhesive member 20. For example, in a case where the first protection member 13 of the vibration generator 10 is connected to a vibration member by a connection member, the sensor portion 30 may be connected or coupled to a rear surface of the second protection member 15 of the vibration generator 10 by the adhesive member 20.

The adhesive member 20 according to an example embodiment of the present disclosure may be configured with a material including an adhesive layer having sufficient adhesive force or attaching force with respect to each of the vibration generator 10 and the sensor portion 30. For example, the adhesive member 20 may include a double-sided tape or an adhesive, or the like, but embodiments of the present disclosure are not limited thereto. For example, the adhesive layer of the adhesive member 20 may include epoxy-based polymer, acrylic-based polymer, silicone-based polymer, or urethane-based polymer, but embodiments of the present disclosure are not limited thereto. For example, the adhesive layer of the adhesive member 20 may include an acrylic-based material which is relatively better in adhesive force and hardness of acrylic and urethane. Therefore, one or more of a deformation of the vibration generator 10 based on a temperature and/or humidity, or the like and a deformation of the vibration generator 10 based on a vibration of the vibration generator 10 may be well transferred to the sensor portion 30, and thus, a sensing sensitivity of the sensor portion 30 may be enhanced.

The vibration apparatus according to an example embodiment of the present disclosure may further include a vibration driving circuit coupled to each of the vibration generator 10 and the sensor portion 30.

The vibration driving circuit (or a sound processing circuit) may generate an alternating current (AC) vibration driving signal based on a sound source and may supply the vibration driving signal to the vibration generator 10. The vibration driving signal may sense an electrical characteristic change of the sensor portion 30 to correct or vary the vibration driving signal supplied to the vibration generator 10. For example, the vibration driving circuit may generate sensing data based on an electrical signal supplied from the sensor portion 30 and may set or vary a gain value of an amplifier circuit which outputs the vibration driving signal based on the sensing data, and thus, may correct a characteristic change of the vibration generator 10 (or the vibration structure 11) based on a temperature and/or humidity, or the like or may compensate for a sound characteristic and/or a sound pressure level characteristic of the vibration generator 10 based on a vibration of the vibration structure 11.

As described above, the vibration apparatus according to an example embodiment of the present disclosure may include the sensor portion 30 which senses an electrical characteristic change and/or a physical change of the vibration generator 10 (or the vibration structure 11), and thus, may correct or compensate for an electrical characteristic change of the vibration generator 10 (or the vibration structure 11) based on a temperature and/or humidity, or the like, correct or compensate for a vibration characteristic of the vibration generator 10 (or the vibration structure 11), and detect a physical change, such as damage or breakdown, or the like, of the vibration generator 10 (or the vibration structure 11).

Figure 3A:
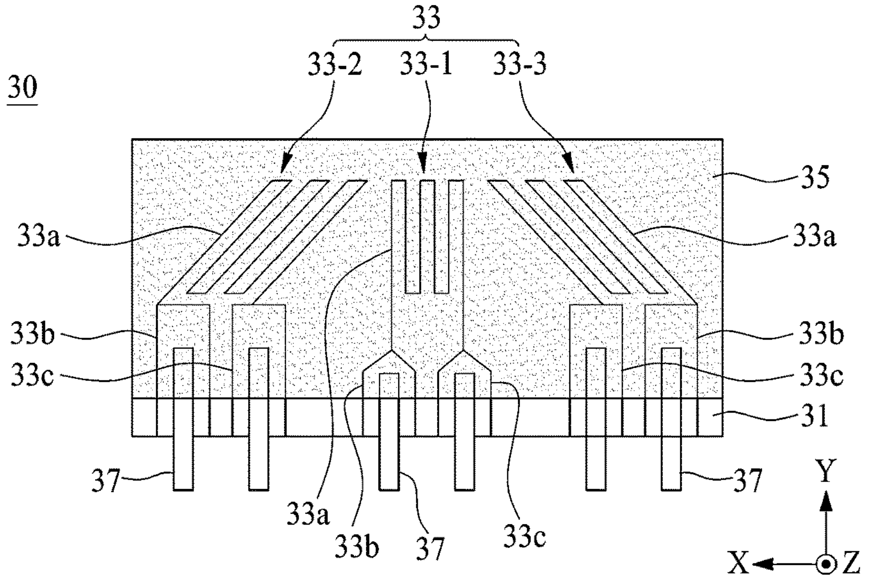
FIGS. 3A and 3B illustrate a sensor portion according to an example embodiment of the present disclosure and illustrate an example of the sensor portion illustrated in FIGS. 1 and 2.
Figure 3B:
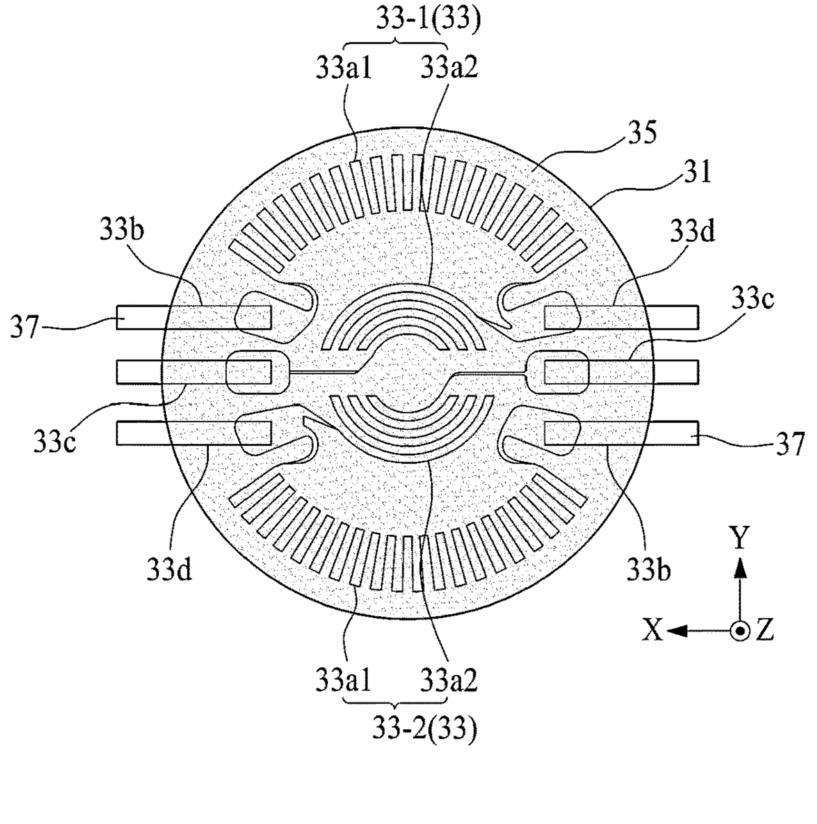

FIGS. 3A and 3B illustrate a sensor portion according to an example embodiment of the present disclosure. FIGS. 3A and 3B illustrate the sensor portion illustrated in FIGS. 1 and 2.

With reference to FIG. 3A, a sensor portion 30 according to an example embodiment of the present disclosure may include a base member 31, a gauge pattern portion 33, and an insulation member 35.

The base member 31 may include an electrical insulating material. For example, the base member 31 may include a plastic material. For example, the base member 31 may be a polyimide (PI) film or a polyethylene terephthalate (PET) film, but embodiments of the present disclosure are not limited thereto.

The gauge pattern portion 33 may be configured at the base member 31. For example, the gauge pattern portion 33 may be configured at a first surface of the base member 31, or may be configured to directly contact the first surface of the base member 31.

The gauge pattern portion 33 according to an example embodiment of the present disclosure may include one or more gauge patterns 33-1, 33-2, and 33-3. For example, the gauge pattern portion 33 may include first to third gauge patterns 33-1, 33-2, and 33-3.

The one or more gauge patterns 33-1, 33-2, and 33-3 may include a grid pattern 33*a* which is configured in a zigzag shape, a first terminal pattern 33*b* which is disposed at one edge portion of the base member 31 and is coupled to one end of the grid pattern 33*a*, and a second terminal pattern 33*c* which is disposed at one edge portion of the base member 31 and is coupled to the other end of the grid pattern 33*a*.

The grid pattern 33*a*, the first terminal pattern 33*b*, and the second terminal pattern 33*c* may be simultaneously configured by a process of patterning a metal layer disposed at the base member 31. For example, the metal layer for implementing each of the grid pattern 33*a*, the first terminal pattern 33*b*, and the second terminal pattern 33*c* may include copper (Cu), nickel (Ni), chromium (Cr), aluminum (Al), tungsten (W), platinum (Pt), a Cu—Ni alloy, a Cu—Ni—Al-Iron (Fe) alloy, a Ni—Fe alloy, a Cr—Ni alloy, an Al alloy, a W alloy, or a Pt—W alloy, but embodiments of the present disclosure are not limited thereto.

According to an example embodiment of the present disclosure, when the gauge pattern portion 33 includes first to third gauge patterns 33-1, 33-2, and 33-3, a grid pattern 33*a* of the first gauge pattern 33-1 may include a zigzag shape having a rectilinear shape, a grid pattern 33*a* of each of the second and third gauge patterns 33-2 and 33-3 may include a zigzag shape having a diagonal shape, and the grid pattern 33*a* of each of the second and third gauge patterns 33-2 and 33-3 may include a symmetrical structure with respect to the grid pattern 33*a* of the first gauge pattern 33-1.

According to an example embodiment of the present disclosure, the one or more gauge patterns 33-1, 33-2, and 33-3 configured in the gauge pattern portion 33 may be deformed based on a temperature and/or humidity, or the like of the vibration apparatus, or may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

The insulation member 35 may be provided at the base member 31 to cover the gauge pattern portion 33. For example, the insulation member 35 may be provided at the base member 31 to cover a portion, other than one periphery portion, of the base member 31, thereby covering or protecting the gauge pattern portion 33. For example, the insulation member 35 may be provided at the base member 31 to expose at least a portion of each of the first terminal pattern 33*b* and the second terminal pattern 33*c* of each of the one or more gauge patterns 33-1, 33-2, and 33-3 provided in the gauge pattern portion 33.

The insulation member 35 according to an example embodiment of the present disclosure may include an electric insulating layer or an electric insulating material. For example, the insulation member 35 may include an epoxy-based polymer, an acrylic-based polymer, a silicone-based polymer, or a urethane-based polymer, but embodiments of the present disclosure are not limited thereto.

The insulation member 35 according to another example embodiment of the present disclosure may include a plastic material which is the same as or differs from the base member 31. For example, the insulation member 35 may be a polyimide (PI) film or a polyethylene terephthalate (PET) film, but embodiments of the present disclosure are not limited thereto.

The sensor portion 30 according to an example embodiment of the present disclosure may further include a sensor lead line 37 coupled to the gauge pattern portion 33.

The sensor lead line 37 may be electrically coupled to each of the first terminal pattern 33*b* and the second terminal pattern 33*c* which are configured in the one or more gauge patterns 33-1, 33-2, and 33-3 or each of the one or more gauge patterns 33-1, 33-2, and 33-3. For example, the sensor lead line 37 may include a first sensor lead line electrically coupled to the first terminal pattern 33*b* and a second sensor lead line electrically coupled to the second terminal pattern 33*c*.

The sensor lead line 37 according to an example embodiment of the present disclosure may be electrically coupled to the vibration driving circuit. Therefore, because the vibration driving circuit is electrically coupled to the sensor lead line 37, an electrical signal based on a deformation of the gauge pattern portion 33 may be sensed through the sensor lead line 37, and based thereon, an electrical characteristic change of the vibration generator 10 (or the vibration structure 11) may be corrected or compensated for and a physical change such as the damage or breakdown, or the like, of the vibration generator 10 (or the vibration structure 11) may be detected.

According to an example embodiment of the present disclosure, each of the first terminal pattern 33*b* and the second terminal pattern 33*c* and at least a portion of the sensor lead line 37 may be covered by the insulation member 35, but embodiments of the present disclosure are not limited thereto. Accordingly, a portion of the sensor lead line 37 may protrude to the outside of the base member 31, or may be exposed to the outside of the base member 31.

In FIG. 3A, the gauge pattern portion 33 of the sensor portion 30 has been described as including three gauge patterns 33-1, 33-2, and 33-3 having a linear strain gauge structure, but embodiments of the present disclosure are not limited thereto. For example, the gauge pattern portion 33 of the sensor portion 30 may include a structure such as a share strain gauge, a half-bridge strain gauge, a full-bridge strain gauge, or a multi-grid strain gauge, or the like, instead of one linear strain gauge structure or a plurality of linear strain gauge structures.

With reference to FIG. 3B, a sensor portion 30 according to another example embodiment of the present disclosure may include a base member 31, a gauge pattern portion 33, and an insulation member 35.

Except that the base member 31 have a circular shape, the base member 31 may the same or substantially the same as the base member 31 described above with reference to FIG. 3A, and the repetitive description thereof may be omitted for brevity.

The gauge pattern portion 33 may be configured at the base member 31. For example, the gauge pattern portion 33 may be configured at a first surface of the base member 31, or may be configured to contact or directly contact the first surface of the base member 31.

The gauge pattern portion 33 according to an example embodiment of the present disclosure may include one or more gauge patterns 33-1 and 33-2. For example, the gauge pattern portion 33 may include first and second gauge patterns 33-1 and 33-2.

The one or more gauge patterns 33-1 and 33-2 or the first and second gauge patterns 33-1 and 33-2 may include a first grid pattern **33*a*1 which is configured in a zigzag shape, a second grid pattern 33*a*2 which is configured in a zigzag shape, a first terminal pattern 33*b* which is coupled to one end of the first grid pattern 33*a*1, a second terminal pattern 33*c* which is commonly coupled to one end of the second grid pattern 33*a*2, and a third terminal pattern 33*d* which is coupled to the other end of the first grid pattern 33*a*1 and the other end of the second grid pattern 33*a*2**.

In the sensor portion 30 according to another example embodiment of the present disclosure, each of the first and second gauge patterns 33-1 and 33-2 may include a half-bridge structure, but embodiments of the present disclosure are not limited thereto. According to an example embodiment of the present disclosure, the one or more gauge patterns 33-1 and 33-2 configured in the gauge pattern portion 33 may be deformed based on a temperature and/or humidity, or the like of the vibration apparatus, or may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

With respect to a center portion of the base member 31, the first gauge pattern 33-1 may be provided on the base member 31 and the second gauge pattern 33-2 may be provided under the base member 31, but embodiments of the present disclosure are not limited thereto.

The sensor portion 30 according to another example embodiment of the present disclosure may further include a sensor lead line 37 coupled to the gauge pattern portion 33.

The sensor lead line 37 may be electrically coupled to each of the first terminal pattern **33*b* and the second terminal pattern 33*c* which are configured at the one or more gauge patterns 33-1 and 33-2 or each of the first and second gauge patterns 33-1 and 33-2. For example, the sensor lead line 37 may include a first sensor lead line electrically coupled to the first terminal pattern 33*b*, a second sensor lead line electrically coupled to the second terminal pattern 33*c*, and a third sensor lead line electrically coupled to the third terminal pattern 33*d***.

According to an example embodiment of the present disclosure, the gauge pattern portion 33 and the sensor lead line 37 disposed at the base member 31 may be covered by the insulation member 35, but embodiments of the present disclosure are not limited thereto. Accordingly, a portion of the sensor lead line 37 may protrude to the outside of the base member 31, or may be exposed to the outside of the base member 31.

In FIG. 3B, the gauge pattern portion 33 of the sensor portion 30 has been described as including two gauge patterns 33-1 and 33-2 having a half-bridge strain gauge structure, but embodiments of the present disclosure are not limited thereto. For example, the gauge pattern portion 33 of the sensor portion 30 may include a structure such as one linear strain gauge structure, a plurality of linear strain gauge structures, a share strain gauge, a full-bridge strain gauge, or a multi-grid strain gauge, or the like, instead of a half-bridge strain gauge structure.

Figure 4:
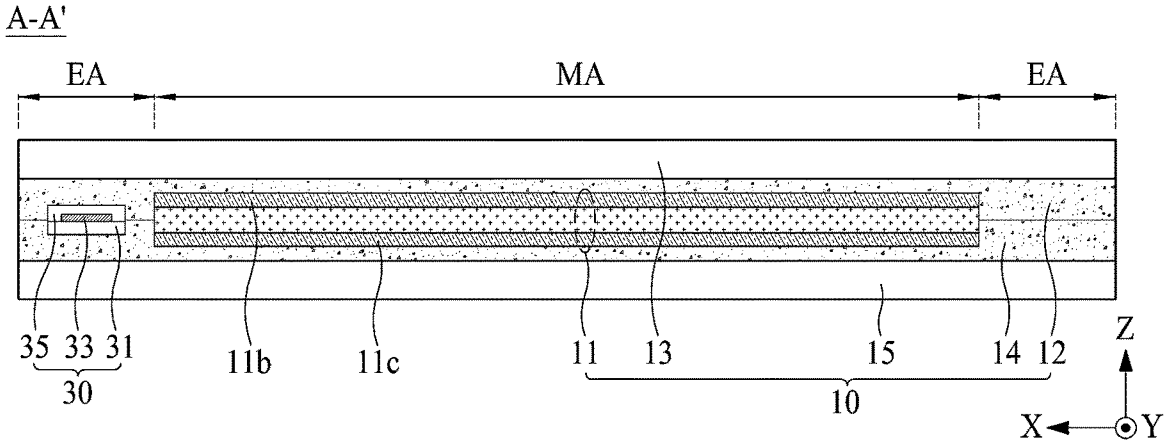
FIG. 4 is an example of another cross-sectional view taken along line A-A' illustrated in FIG. 1.

FIG. 4 is an example of another cross-sectional view taken along line A-A' illustrated in FIG. 1. FIG. 4 illustrates an example embodiment implemented by modifying the sensor portion illustrated in FIG. 2.

With reference to FIGS. 1 and 4, a vibration apparatus according to another example embodiment of the present disclosure may include a vibration generator 10 and a sensor portion 30.

The vibration generator 10 of FIG. 4 may be substantially the same as the vibration generator 10 described above with reference to FIGS. 1 and 2, and thus, the repetitive description thereof may be omitted for brevity.

The sensor portion 30 may be configured in or inside the vibration generator 10. For example, the sensor portion 30 may be embedded (or built-in) in or inside the vibration generator 10, and thus, may not be exposed at the outside of the vibration generator 10. For example, the sensor portion 30 may be embedded (or built-in) at an outer region EA adjacent to a pad portion 17 of the vibration generator 10. For example, the sensor portion 30 may be disposed between a first protection member 13 and a second protection member 15 in parallel with the pad portion 17 of the vibration generator 10.

The sensor portion 30 according to an example embodiment of the present disclosure may be disposed between the first protection member 13 and the second protection member 15 of the vibration generator 10 and may be surrounded by first and second adhesive layers 12 and 14. For example, the sensor portion 30 may be fully surrounded by the first and second adhesive layers 12 and 14. For example, the sensor portion 30 may be embedded or built-in in or into the first and second adhesive layers 12 and 14. Accordingly, the first protection member 13 and the second protection member 15 of the vibration generator 10 may protect the vibration generator 10 and may protect the sensor portion 30.

The sensor portion 30 according to an example embodiment of the present disclosure may be disposed at a center region between the first protection member 13 and the second protection member 15 of the vibration generator 10, with respect to a thickness direction Z of the vibration generator 10, but embodiments of the present disclosure are not limited thereto. For example, the sensor portion 30 may be disposed on the same plane (or the same layer) as one of a first electrode portion **11*b* and a second electrode portion 11*c* of the vibration generator 10 with respect to the thickness direction Z of the vibration generator 10**.

The sensor portion 30 according to an example embodiment of the present disclosure may include a base member 31, a gauge pattern portion 33, an insulation member 35, and a sensor lead line. For example, the base member 31, the gauge pattern portion 33, the insulation member 35, and the sensor lead line of the sensor portion 30 may be respectively and substantially the same as the base member 31, the gauge pattern portion 33, the insulation member 35, and the sensor lead line 37 of the sensor portion 30 described above with reference to FIG. 3A or 3B, and thus, their repetitive descriptions may be omitted for brevity. According to an example embodiment of the present disclosure, the sensor lead line 37 of the sensor portion 30 may pass through the first and second adhesive layers 12 and 14 and may protrude to the outside of a lateral surface of the vibration generator 10.

The sensor portion 30 according to an example embodiment of the present disclosure may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

The vibration apparatus described above with reference to FIG. 4 according to another example embodiment of the present disclosure may have the same effect as the vibration apparatus described above with reference to FIGS. 1 and 2, and because the sensor portion 30 is embedded in or inside to the vibration generator 10, the damage of the sensor portion 30 may be prevented by the first protection member 13 and the second protection member 15 of the vibration generator 10.

Figure 5:
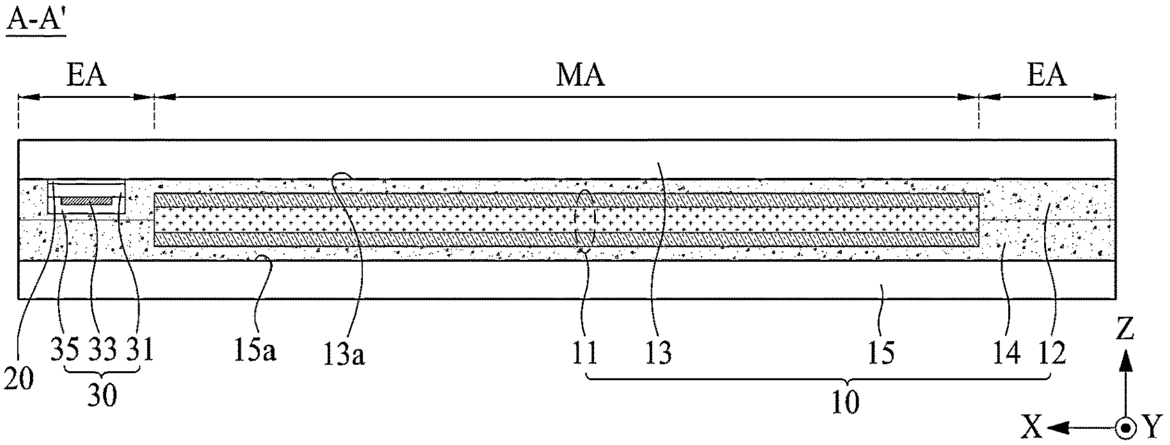
FIG. 5 is an example of another cross-sectional view taken along line A-A' illustrated in FIG. 1.

FIG. 5 is an example of another cross-sectional view taken along line A-A' illustrated in FIG. 1. FIG. 5 illustrates an example embodiment implemented by modifying the sensor portion illustrated in FIG. 4.

With reference to FIGS. 1 and 5, a vibration apparatus according to another example embodiment of the present disclosure may include a vibration generator 10 and a sensor portion 30.

The vibration generator 10 may be substantially the same as the vibration generator 10 described above with reference to FIGS. 1 and 2, and thus, the repetitive description thereof may be omitted for brevity.

The sensor portion 30 may be configured in or inside the vibration generator 10. For example, the sensor portion 30 may be embedded (or built-in) in or inside the vibration generator 10, and thus, may not be exposed at the outside of the vibration generator 10. For example, the sensor portion 30 may be embedded (or built-in) an outer region EA adjacent to a pad portion 17 of the vibration generator 10. For example, the sensor portion 30 may be disposed between a first protection member 13 and a second protection member 15 in parallel with the pad portion 17 of the vibration generator 10.

The sensor portion 30 according to an example embodiment of the present disclosure may be disposed between the first protection member 13 and the second protection member 15 of the vibration generator 10 and may be surrounded by first and second adhesive layers 12 and 14. Accordingly, the first protection member 13 and the second protection member 15 of the vibration generator 10 may protect the vibration generator 10 and may protect the sensor portion 30.

The sensor portion 30 according to an example embodiment of the present disclosure may be disposed or configured at an inner surface 13*a* (or a rear surface or a second surface) of the first protection member 13. For example, the sensor portion 30 may be disposed or configured at the inner surface 13*a* of the first protection member 13 which is toward the vibration structure 11 or faces the vibration structure 11, in the vibration generator 10. For example, the sensor portion 30 may be attached on or coupled to the inner surface 13*a* of the first protection member 13 by an adhesive member 20, in the vibration generator 10.

The sensor portion 30 according to an example embodiment of the present disclosure may include a base member 31, a gauge pattern portion 33, an insulation member 35, and a sensor lead line. For example, the base member 31, the gauge pattern portion 33, the insulation member 35, and the sensor lead line of the sensor portion 30 may be respectively and substantially the same as the base member 31, the gauge pattern portion 33, the insulation member 35, and the sensor lead line 37 of the sensor portion 30 described above with reference to FIG. 3A or 3B, and thus, their repetitive descriptions may be omitted for brevity. According to an example embodiment of the present disclosure, the sensor lead line 37 of the sensor portion 30 may pass through the first and second adhesive layers 12 and 14 and may protrude to the outside of a lateral surface of the vibration generator 10.

According to an example embodiment of the present disclosure, the base member 31 of the sensor portion 30 may be attached on or coupled to the inner surface 13*a* of the first protection member 13 by an adhesive member 20, but embodiments of the present disclosure are not limited thereto. For example, the insulation member 35 of the sensor portion 30 may be attached on or coupled to the inner surface 13*a* of the first protection member 13 by an adhesive member 20, in the vibration generator 10.

In FIG. 5, it has been described that the sensor portion 30 is attached on or coupled to the inner surface 13*a* of the first protection member 13 by an adhesive member 20, but embodiments of the present disclosure are not limited thereto. For example, the sensor portion 30 according to an example embodiment of the present disclosure may be disposed or configured on an inner surface 15*a* (or a front surface or a first surface) of the second protection member 15. For example, the sensor portion 30 may be disposed or configured on the inner surface 15*a* of the second protection member 15 which is toward the vibration structure 11 or faces the vibration structure 11, in the vibration generator 10. For example, in the sensor portion 30, the base member 31 and the insulation member 35 may be attached on or coupled to the inner surface 15*a* of the second protection member 15 by an adhesive member 20.

The sensor portion 30 according to an example embodiment of the present disclosure may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

The vibration apparatus described above with reference to FIG. 5 according to another example embodiment of the present disclosure may have the same effect as the vibration apparatus described above with reference to FIGS. 1 and 2, and thus, the repetitive description thereof may be omitted for brevity.

Figure 6:
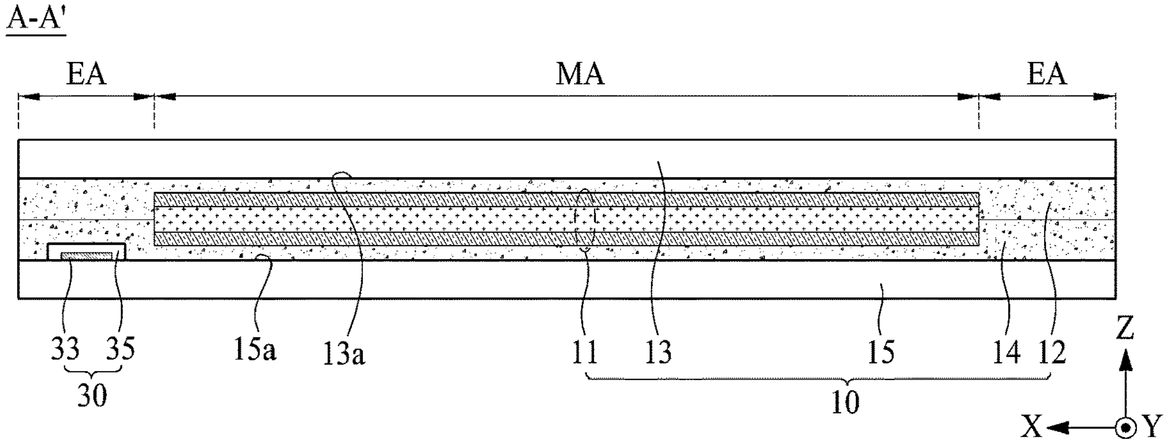
FIG. 6 is an example of another cross-sectional view taken along line A-A' illustrated in FIG. 1.

FIG. 6 is an example of another cross-sectional view taken along line A-A' illustrated in FIG. 1. FIG. 6 illustrates an example embodiment implemented by modifying the sensor portion illustrated in FIG. 2.

With reference to FIGS. 1 and 6, a vibration apparatus according to another example embodiment of the present disclosure may include a vibration generator 10 and a sensor portion 30.

The vibration generator 10 may be substantially the same as the vibration generator 10 described above with reference to FIGS. 1 and 2, and thus, the repetitive description thereof may be omitted for brevity.

The sensor portion 30 may be directly configured or integrated in or into inside the vibration generator 10. For example, the sensor portion 30 may be directly configured or integrated in or into inner surfaces 13*a* and 15*a* of any one of the first protection member 13 and the second protection member 15 in parallel with the pad portion 17 of the vibration generator 10.

The sensor portion 30 according to an example embodiment of the present disclosure may include a gauge pattern portion 33, an insulation member 35, and a sensor lead line. For example, each of the gauge pattern portion 33, the insulation member 35, and the sensor lead line of the sensor portion 30 may include a structure where the base member 31 is omitted in the sensor portion 30 described above with reference to FIG. 3A or 3B.

The gauge pattern portion 33 of the sensor portion 30 may be directly configured inside or integrated in or into inner surfaces 13*a* and 15*a* of any one of the first protection member 13 and the second protection member 15. For example, each of the first protection member 13 and the second protection member 15 may include a plastic material which enables a metal layer to be formed and patterned, but embodiments of the present disclosure are not limited thereto. For example, each of the first protection member 13 and the second protection member 15 may be a polyimide (PI) film or a polyethylene terephthalate (PET) film, but embodiments of the present disclosure are not limited thereto.

The gauge pattern portion 33 may be provided on an inner surface 15*a* of the second protection member 15, or may be configured to contact or directly contact the inner surface 15*a* of the second protection member 15. For example, except that the gauge pattern portion 33 is configured to directly contact the inner surface 15*a* of the second protection member 15 instead of a base member, the gauge pattern portion 33 may be substantially the same as the gauge pattern portion 33 of the sensor portion 30 described above with reference to FIG. 3A or 3B, and thus, the repetitive description thereof may be omitted for brevity. For example, the gauge pattern portion 33 may include a structure such as a share strain gauge, a half-bridge strain gauge, a full-bridge strain gauge, or a multi-grid strain gauge, or the like, instead of the gauge pattern portion 33 of the sensor portion 30 described above with reference to FIG. 3A or 3B.

The insulation member 35 may be configured at the inner surface 15*a* of the second protection member 15 where the gauge pattern portion 33 is configured, and may be configured to cover the gauge pattern portion 33. For example, the insulation member 35 may be configured at the inner surface 15*a* of the second protection member 15 to cover the gauge pattern portion 33.

The sensor lead line may be configured at the inner surface 15*a* of the second protection member 15 together with the gauge pattern portion 33. For example, the sensor lead line may be formed at the inner surface 15*a* of the second protection member 15 at the same time with the gauge pattern portion 33 through a process of patterning a metal layer formed at the inner surface 15*a* of the second protection member 15. Accordingly, a process (for example, a soldering process) of connecting the gauge pattern portion 33 to the sensor lead line may be omitted.

According to an example embodiment of the present disclosure, the insulation member 35 may be configured to surround the gauge pattern portion 33 and cover a portion of the sensor lead line, but embodiments of the present disclosure are not limited thereto. For example, the insulation member 35 may be configured to cover all of the gauge pattern portion 33 and the sensor lead line. For example, at least a portion of the sensor lead line configured adjacent to the pad portion 17 of the vibration generator 10 may be exposed at the outside like the pad portion 17 of the vibration generator 10.

In FIG. 6, it has been described that the gauge pattern portion 33 is configured at the inner surface 15*a* of the second protection member 15, but embodiments of the present disclosure are not limited thereto. For example, the gauge pattern portion 33 may be configured to contact or directly contact the inner surface 13*a* of the first protection member 13. For example, the insulation member 35 may be configured at the inner surface 13*a* of the first protection member 13 where the gauge pattern portion 33 is configured, and may be configured to cover the gauge pattern portion 33. For example, the insulation member 35 may be configured at the inner surface 13*a* of the first protection member 13 to cover the gauge pattern portion 33.

The sensor lead line may be configured at the inner surface 13*a* of the first protection member 13 together with the gauge pattern portion 33. For example, the sensor lead line may be formed at the inner surface 13*a* of the first protection member 13 at the same time with the gauge pattern portion 33 through a process of patterning a metal layer formed at the inner surface 13*a* of the first protection member 13. For example, at least a portion of the sensor lead line may be exposed at the outside like the pad portion 17 of the vibration generator 10. Accordingly, a process (for example, a soldering process) of connecting the gauge pattern portion 33 to the sensor lead line may be omitted.

In FIG. 6, the insulation member 35 of the sensor portion 30 may be omitted. For example, in the sensor portion 30, the gauge pattern portion 33 provided to contact or directly contact the inner surface 15*a* of the second protection member 15 or the inner surface 13*a* of the first protection member 13 may be covered by the first and second adhesive layers 12 and 14 of the vibration generator 10, but the insulation member 35 may be omitted.

The sensor portion 30 according to an example embodiment of the present disclosure may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

The vibration apparatus described above with reference to FIG. 6 according to another example embodiment of the present disclosure may have the same effect as the vibration apparatus described above with reference to FIGS. 1 and 4 or the same effect as the vibration apparatus described above with reference to FIGS. 1 and 5, and a separate sensor assembly process of attaching or coupling the sensor portion 30 at or to the vibration generator 10 may be omitted.

Figure 7:
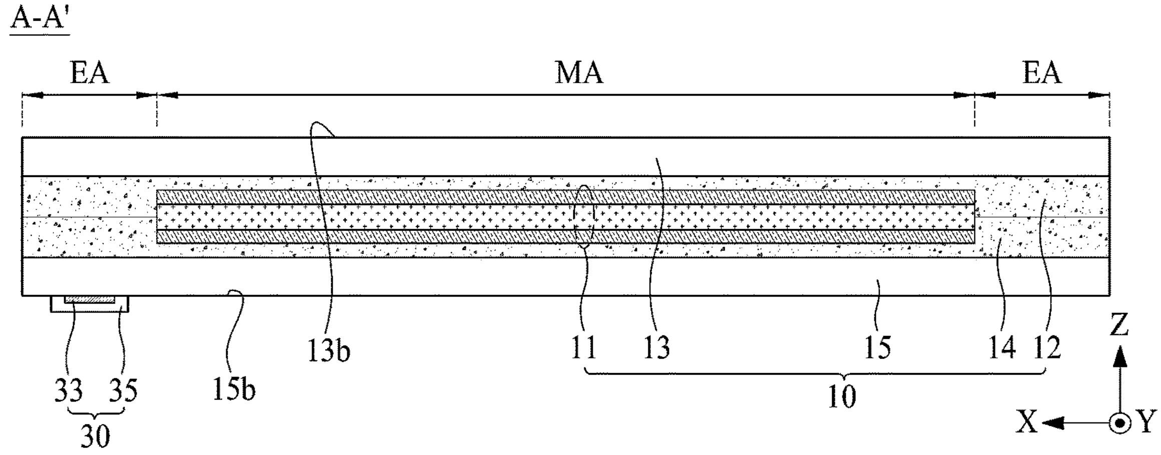
FIG. 7 is an example of another cross-sectional view taken along line A-A' illustrated in FIG. 1.

FIG. 7 is an example of another cross-sectional view taken along line A-A' illustrated in FIG. 1. FIG. 7 illustrates an example embodiment implemented by modifying the sensor portion illustrated in FIG. 2.

With reference to FIGS. 1 and 7, a vibration apparatus according to another example embodiment of the present disclosure may include a vibration generator 10 and a sensor portion 30.

The vibration generator 10 may be substantially the same as the vibration generator 10 described above with reference to FIGS. 1 and 2, and thus, the repetitive description thereof may be omitted for brevity.

The sensor portion 30 may be directly configured or integrated in or into outside the vibration generator 10. For example, the sensor portion 30 may be directly configured at or integrated in or into outer surfaces 13*b* and 15*b* of any one of the first protection member 13 and the second protection member 15 in parallel with the pad portion 17 of the vibration generator 10. For example, the outer surface 13*b* of the first protection member 13 may be referred to as a front surface or a first surface of the first protection member 13, or the like, but embodiments of the present disclosure are not limited thereto. The outer surface 15*b* of the second protection member 15 may be referred to as a rear surface or a second surface of the second protection member 15, or the like, but embodiments of the present disclosure are not limited thereto.

The sensor portion 30 according to an example embodiment of the present disclosure may include a gauge pattern portion 33, an insulation member 35, and a sensor lead line. For example, each of the gauge pattern portion 33, the insulation member 35, and the sensor lead line of the sensor portion 30 may include a structure where the base member 31 is omitted in the sensor portion 30 described above with reference to FIG. 3A or 3B.

The gauge pattern portion 33 of the sensor portion 30 according to an example embodiment of the present disclosure may be directly configured or integrated in or into the outer surfaces 13*b* and 15*b* of any one of the first protection member 13 and the second protection member 15. For example, each of the first protection member 13 and the second protection member 15 may include a plastic material which enables a metal layer to be formed and patterned, but embodiments of the present disclosure are not limited thereto. For example, each of the first protection member 13 and the second protection member 15 may be a polyimide (PI) film or a polyethylene terephthalate (PET) film, but embodiments of the present disclosure are not limited thereto.

Except that the gauge pattern portion 33 of the sensor portion 30 according to an example embodiment of the present disclosure is directly configured or integrated in or into the outer surface 15*b* of the second protection member 15, the gauge pattern portion 33 of the sensor portion 30 may be substantially the same as the gauge pattern portion 33 of the sensor portion 30 described above with reference to FIG. 6, and thus, the repetitive description thereof may be omitted for brevity. For example, in a case where the first protection member 13 of the vibration generator 10 or the vibration apparatus according to an example embodiment of the present disclosure is connected or coupled to a vibration member (or a vibration plate) by a connection member, the sensor portion 30 may be directly configured or integrated in or into the outer surface 15*b* of the second protection member 15. For example, the insulation member 35 of the sensor portion 30 may be configured in a pattern shape at the outer surface 15*b* of the second protection member 15 to cover the gauge pattern portion 33 directly configured at the outer surface 15*b* of the second protection member 15, but embodiments of the present disclosure are not limited thereto. For example, the insulation member 35 of the sensor portion 30 may be configured to cover all of the outer surface 15*b* of the second protection member 15. Accordingly, a rear surface of the vibration generator 10 or the outer surface 15*b* of the second protection member 15 where the sensor portion 30 is provided may have a flat structure without a step height caused by the sensor portion 30.

Except that the gauge pattern portion 33 of the sensor portion 30 according to another example embodiment of the present disclosure is directly configured or integrated in or into the outer surface 13*b* of the first protection member 13, the gauge pattern portion 33 of the sensor portion 30 may be substantially the same as the gauge pattern portion 33 of the sensor portion 30 described above with reference to FIG. 6, and thus, the repetitive description thereof may be omitted for brevity. For example, in a case where the second protection member 15 of the vibration generator 10 or the vibration apparatus according to another example embodiment of the present disclosure is connected or coupled to a vibration member (or a vibration plate) by a connection member, the sensor portion 30 may be directly configured or integrated in or into the outer surface 13*b* of the first protection member 13. For example, the insulation member 35 of the sensor portion 30 may be configured to cover all of the outer surface 13*b* of the first protection member 13. Accordingly, a rear surface of the vibration generator 10 or the outer surface 13*b* of the first protection member 13 where the sensor portion 30 is provided may have a flat structure without a step height caused by the sensor portion 30.

The sensor portion 30 according to an example embodiment of the present disclosure may be deformed by one or more of a deformation of the vibration generator 10 (or the vibration structure 11) based on a temperature and/or humidity, or the like and a deformation of the vibration generator 10 (or the vibration structure 11) based on a vibration of the vibration structure 11.

The vibration apparatus described above with reference to FIG. 7 according to another example embodiment of the present disclosure may have the same effect as the vibration apparatus described above with reference to FIGS. 1 and 2, and a separate sensor assembly process of attaching or coupling the sensor portion 30 at or to the vibration generator 10 may be omitted.

Figure 8:
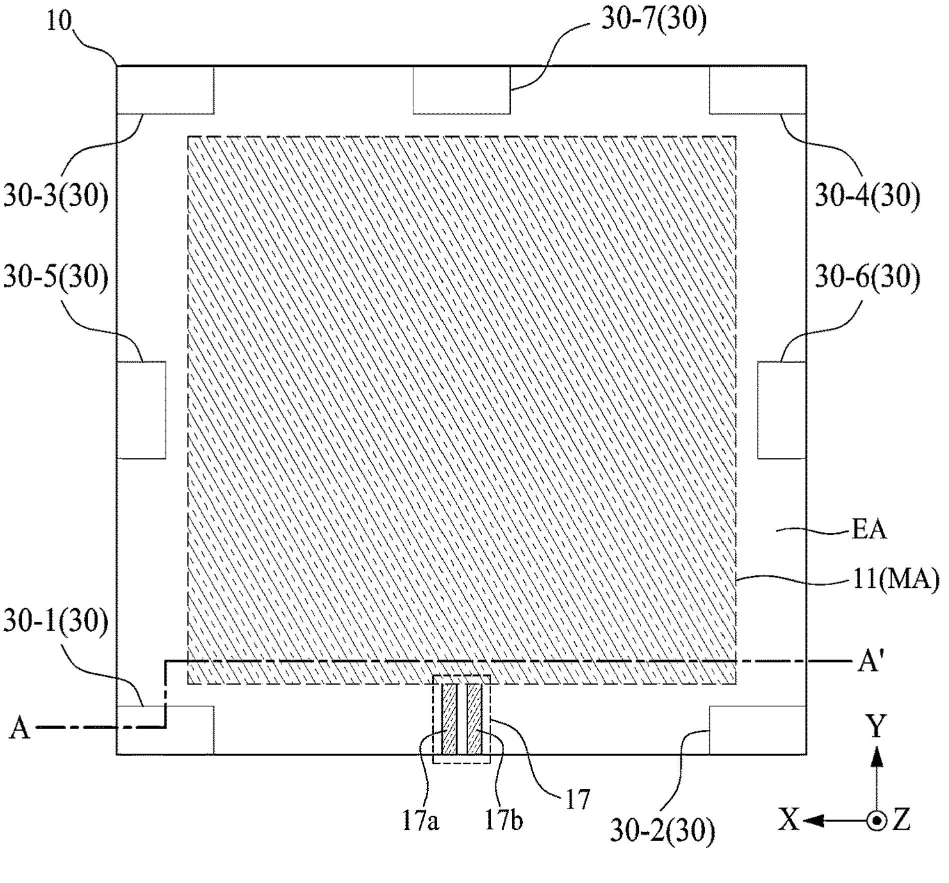
FIG. 8 illustrates a vibration apparatus according to another example embodiment of the present disclosure.

FIG. 8 illustrates a vibration apparatus according to another example embodiment of the present disclosure. FIG. 8 illustrates an example embodiment implemented by modifying the sensor portion illustrated in FIGS. 1 and 2. An example of a cross-sectional view taken along line A-A' illustrated in FIG. 8 is illustrated in any one of FIGS. 2 and 4 to 7.

With reference to FIGS. 2 and 8, the vibration apparatus according to another example embodiment of the present disclosure may include a vibration generator 10 and a sensor portion 30.

The vibration generator 10 of FIG. 8 may be substantially the same as the vibration generator 10 described above with reference to FIGS. 1 and 2, and thus, the repetitive description thereof may be omitted for brevity.

The sensor portion 30 may be configured outside the vibration generator 10. For example, the sensor portion 30 may be disposed at the outer region EA of the vibration generator 10. For example, the sensor portion 30 may be disposed at an outer surface of any one of the first protection member 13 and the second protection member 15 in parallel with the pad portion 17 of the vibration generator 10.

A sensor portion 30 according to another example embodiment of the present disclosure may include a plurality of sensors 30-1 to 30-4. For example, the sensor portion 30 may include first to fourth sensors 30-1 to 30-4.

Each of the plurality of sensors 30-1 to 30-4 or first to fourth sensors 30-1 to 30-4 may be configured at a corner portion of a vibration generator 10. For example, when the vibration generator 10 has a tetragonal shape including first to fourth corner portions, the first to fourth sensors 30-1 to 30-4 may be respectively configured at the first to fourth corner portions of the vibration generator 10.

Each of the first to fourth sensors 30-1 to 30-4 may include a base member, a gauge pattern portion, an insulation member, and a sensor lead line like the sensor portion 30 described above with reference to FIG. 3A or 3B, and thus, their repetitive descriptions may be omitted for brevity.

Each of the first to fourth sensors 30-1 to 30-4 may be configured at a corresponding corner portion of an outer surface of the second protection member 15 corresponding to a corner portion of the vibration generator 10.

Each of the first to fourth sensors 30-1 to 30-4 may be deformed by one or more of a deformation of each corner portion of the vibration generator 10 (or the vibration structure 11) based on a temperature and/or humidity, or the like and a deformation of each corner portion of the vibration generator 10 (or the vibration structure 11) based on a vibration of the vibration structure 11.

Because the sensor portion 30 according to another example embodiment of the present disclosure includes the plurality of sensors 30-1 to 30-4 which are respectively and individually provided at corner portions of the vibration generator 10, the sensor portion 30 may more precisely sense one or more of a deformation of the vibration generator 10 (or the vibration structure 11) based on a temperature and/or humidity, or the like and a deformation of the vibration generator 10 (or the vibration structure 11) based on a vibration of the vibration structure 11. For example, the vibration apparatus according to another example embodiment of the present disclosure may sense a deformation of the vibration generator 10 (or the vibration structure 11) through each of the first to fourth sensors 30-1 to 30-4 which are respectively and individually provided at the corner portions of the vibration generator 10 (or the vibration structure 11), and thus, may precisely correct or compensate for an electrical characteristic change of the vibration generator 10 (or the vibration structure 11) based on a temperature and/or humidity, or the like, optimize a vibration characteristic of the vibration generator 10 (or the vibration structure 11), and accurately detect a physical change, such as damage or breakdown, or the like, of the vibration generator 10 (or the vibration structure 11).

The sensor portion 30 may further include fifth to seventh sensors 30-5, 30-6, and 30-7 which are disposed at a center portion between adjacent corner portions of the vibration generator 10.

The fifth sensor 30-5 may be configured between the first sensor 30-1 and the third sensor 30-3. The sixth sensor 30-6 may be configured between the second sensor 30-2 and the fourth sensor 30-4. The seventh sensor 30-7 may be configured between the third sensor 30-3 and the fourth sensor 30-4. Each of the fifth to seventh sensors 30-5, 30-6, and 30-7 may include a base member, a gauge pattern portion, an insulation member, and a sensor lead line like the sensor portion 30 described above with reference to FIG. 3A or 3B, and thus, their repetitive descriptions may be omitted for brevity.

Each of the fifth to seventh sensors 30-5, 30-6, and 30-7 may be deformed by one or more of a deformation of a center portion of an outer region EA of the vibration generator 10 based on a temperature and/or humidity, or the like and a deformation of a center portion of the outer region EA of the vibration generator 10 based on a vibration of the vibration structure 11.

Because the sensor portion 30 according to another example embodiment of the present disclosure further includes the fifth to seventh sensors 30-5, 30-6, and 30-7 which are respectively and individually provided at the center portion of the outer region EA of the vibration generator 10, the sensor portion 30 may more precisely sense one or more of a deformation of the vibration generator 10 (or the vibration structure 11) based on a temperature and/or humidity, or the like and a deformation of the vibration generator 10 (or the vibration structure 11) based on a vibration of the vibration structure 11. For example, the vibration apparatus according to another example embodiment of the present disclosure may sense a deformation of the vibration generator 10 (or the vibration structure 11) through each of the first to seventh sensors 30-1 to 30-7, and thus, may precisely correct or compensate for an electrical characteristic change of the vibration generator 10 (or the vibration structure 11) based on a temperature and/or humidity, or the like, more optimize a vibration characteristic of the vibration generator 10 (or the vibration structure 11) or enhance the vibration uniformity of the vibration generator 10 (or the vibration structure 11), and more accurately detect a physical change, such as damage or breakdown, or the like, of the vibration generator 10 (or the vibration structure 11).

According to another example embodiment of the present disclosure, the sensor portion 30 may include only the first to fourth sensors 30-1 to 30-4 or may include only the fifth to seventh sensors 30-5 to 30-7, but embodiments of the present disclosure are not limited thereto and may include all of the first to seventh sensors 30-1 to 30-7.

According to another example embodiment of the present disclosure, each of the first to fourth sensors 30-1 to 30-4 and/or the fifth to seventh sensors 30-5 to 30-7, as described above with reference to FIG. 2, may be connected or coupled to any one of the first protection member 13 and the second protection member 15 of the vibration generator 10 by an adhesive member 20, and their repetitive descriptions may be omitted for brevity.

According to another example embodiment of the present disclosure, each of the first to fourth sensors 30-1 to 30-4 and/or the fifth to seventh sensors 30-5 to 30-7, as described above with reference to FIG. 4 or 5, may be configured between the first protection member 13 and the second protection member 15 of the vibration generator 10, and their repetitive descriptions may be omitted for brevity.

According to another example embodiment of the present disclosure, each of the first to fourth sensors 30-1 to 30-4 and/or the fifth to seventh sensors 30-5 to 30-7, as described above with reference to FIG. 6, may be provided to directly contact the inner surfaces 13*a* and 15*a* of the first protection member 13 and the second protection member 15 of the vibration generator 10, and their repetitive descriptions may be omitted for brevity.

According to another example embodiment of the present disclosure, each of the first to fourth sensors 30-1 to 30-4 and/or the fifth to seventh sensors 30-5 to 30-7, as described above with reference to FIG. 7, may be provided to directly contact the outer surfaces 13*b* and 15*b* of the first protection member 13 and the second protection member 15 of the vibration generator 10, and their repetitive descriptions may be omitted for brevity.

Figure 9:
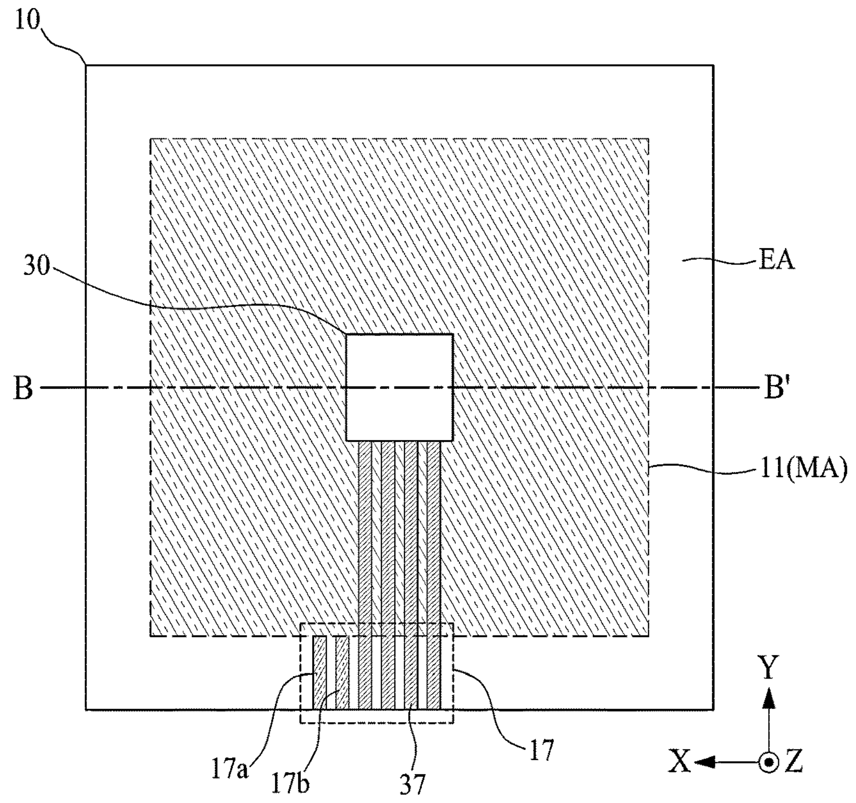
FIG. 9 illustrates a vibration apparatus according to another example embodiment of the present disclosure.
Figure 10:
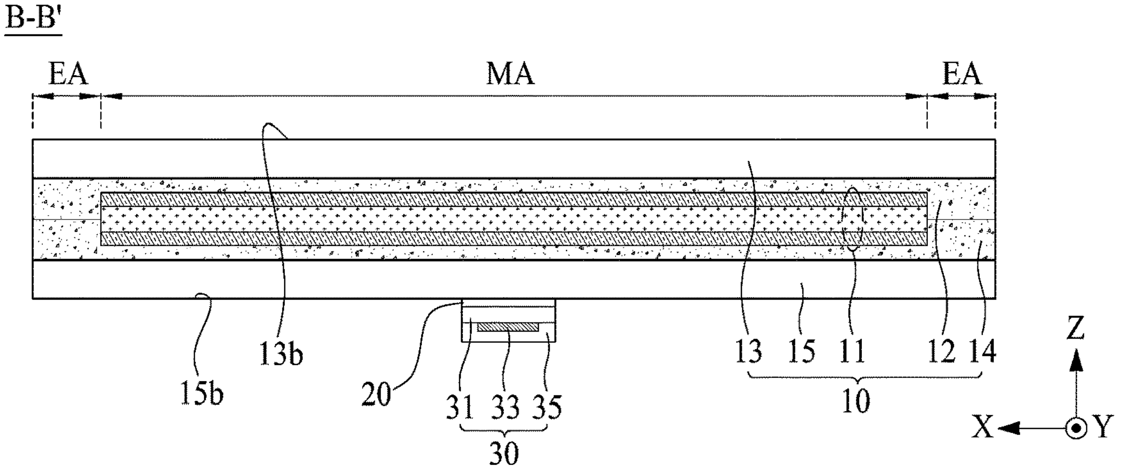
FIG. 10 is an example of a cross-sectional view taken along line B-B' illustrated in FIG. 9.

FIG. 9 illustrates a vibration apparatus according to another example embodiment of the present disclosure. FIG. 10 is an example of a cross-sectional view taken along line B-B' illustrated in FIG. 9. FIGS. 9 and 10 illustrate an example embodiment implemented by modifying the sensor portion illustrated in FIGS. 1 and 2.

With reference to FIGS. 9 and 10, the vibration apparatus according to another example embodiment of the present disclosure may include a vibration generator 10 and a sensor portion 30.

The vibration generator 10 of FIGS. 9 and 10 may be substantially the same as the vibration generator 10 described above with reference to FIGS. 1 and 2, and thus, the repetitive description thereof may be omitted for brevity.

The sensor portion 30 may be disposed at an inner region MA of the vibration generator 10. For example, the sensor portion 30 may be configured at the inner region MA of the vibration generator 10 to overlap at least a portion of a vibration portion 11*a* configured at the vibration generator 10. For example, the sensor portion 30 may be configured to sense a characteristic change or a vibration characteristic of the inner region MA of the vibration generator 10 (or the vibration structure 11) and/or a deformation of the inner region MA of the vibration generator 10 (or the vibration structure 11) based on a temperature and/or humidity, or the like.

The sensor portion 30 according to an example embodiment of the present disclosure may include a base member 31, a gauge pattern portion 33, an insulation member 35, and a sensor lead line 37. For example, the base member 31, the gauge pattern portion 33, the insulation member 35, and the sensor lead line 37 of the sensor portion 30 may be respectively and substantially the same as the base member 31, the gauge pattern portion 33, the insulation member 35, and the sensor lead line 37 of the sensor portion 30 described above with reference to FIG. 3A or 3B, and thus, their repetitive descriptions may be omitted for brevity.

The sensor portion 30 according to an example embodiment of the present disclosure may be configured at a center portion of the vibration generator 10. For example, the sensor portion 30 may be configured at a central portion of the vibration generator 10. For example, the sensor portion 30 may be provided at a center portion of a vibration portion 11*a* configured at the vibration generator 10. For example, a center portion of the sensor portion 30 may be disposed or aligned at the center portion of the vibration generator 10.

According to an example embodiment of the present disclosure, the sensor lead line 37 of the sensor portion 30 may extend to a pad portion 17 of the vibration generator 10. For example, the sensor lead line 37 may be disposed in parallel with each of a first pad electrode 17*a* and a second pad electrode 17*b* of the pad portion 17.

The sensor portion 30 according to an example embodiment of the present disclosure may be connected on or coupled to a rear surface of the vibration generator 10 by an adhesive member 20. For example, the sensor portion 30 may be connected on or coupled to any one of the first protection member 13 and the second protection member 15 of the vibration generator 10 by an adhesive member 20. For example, the adhesive member 20 may be substantially the same as the adhesive member 20 described above with reference to FIGS. 1 and 2, and thus, the repetitive description thereof may be omitted for brevity.

According to an example embodiment of the present disclosure, the sensor portion 30 may be connected or coupled to a center portion of an outer surface 15*b* of the second protection member 15 corresponding to the center portion of the vibration generator 10 by an adhesive member 20. According to another example embodiment of the present disclosure, the sensor portion 30 may be connected or coupled to a center portion of an outer surface 13*b* of the first protection member 13 corresponding to the center portion of the vibration generator 10 by an adhesive member 20.

According to an example embodiment of the present disclosure, the sensor portion 30 may be connected or coupled to a surface which is opposite to a connection surface of the vibration generator 10 connected or coupled to a vibration member, by an adhesive member 20. For example, when a first surface (or a second surface) of the vibration generator 10 is connected or coupled to the vibration member, the sensor portion 30 may be connected or coupled to the second surface (or the first surface) of the vibration generator 10.

As described above, the vibration apparatus according to another example embodiment of the present disclosure may include the sensor portion 30 which senses an electrical characteristic change and/or a physical change of the center portion of the vibration generator 10 (or the vibration structure 11), and thus, may correct or compensate for an electrical characteristic change of the vibration generator 10 (or the vibration structure 11) based on a temperature and/or humidity, or the like, correct or compensate for a vibration characteristic of the vibration generator 10 (or the vibration structure 11), and detect a physical change, such as damage or breakdown, or the like, of the vibration generator 10 (or the vibration structure 11). In addition, the vibration apparatus according to another example embodiment of the present disclosure may sense, through the sensor portion 30, a deformation of the center portion of the vibration generator 10 (or the vibration structure 11) having a highest displacement amount or a largest vibration width, and thus, may correct or compensate for an electrical characteristic change of the vibration generator 10 (or the vibration structure 11) based on a temperature and/or humidity, or the like, optimize a vibration characteristic of the vibration generator 10 (or the vibration structure 11), and detect a physical change, such as damage or breakdown, or the like, of the vibration generator 10 (or the vibration structure 11).

The vibration apparatus according to another example embodiment of the present disclosure may further include a secondary sensor portion which is configured at the outer region EA of the vibration generator 10. The secondary sensor portion may include first to fourth sensors 30-1 to 30-4 and/or fifth to seventh sensors 30-5 to 30-7 described above with reference to FIG. 8. A sensor of the secondary sensor portion, as described above with reference to FIG. 2, 4, or 5, may be coupled to any one of the first protection member 13 and the second protection member 15 of the vibration generator 10 by the adhesive member 20 or may be configured between the first protection member 13 and the second protection member 15, and thus, the repetitive description thereof may be omitted for brevity. Accordingly, because the vibration apparatus according to another example embodiment of the present disclosure further includes the secondary sensor portion which is configured at the outer region EA of the vibration generator 10, an effect of the vibration apparatus described above with reference to FIG. 8 may be additionally realized.

Figure 11:
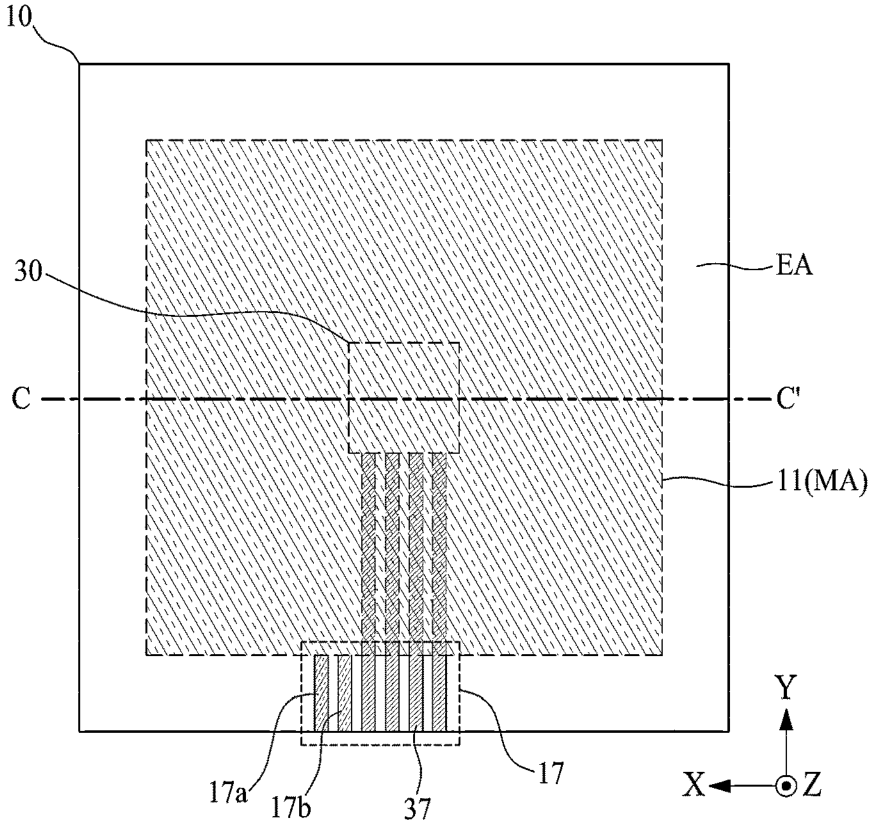
FIG. 11 illustrates a vibration apparatus according to another example embodiment of the present disclosure.
Figure 12:
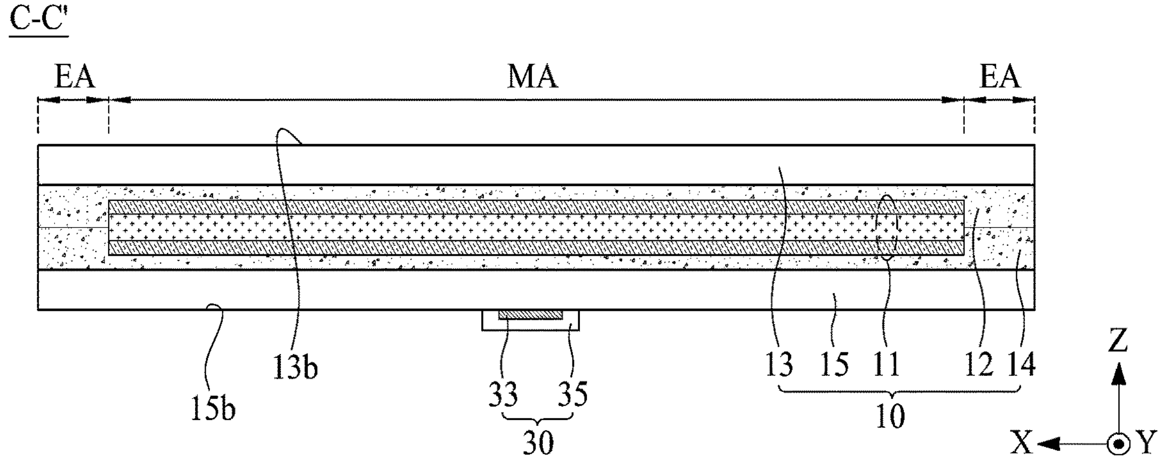
FIG. 12 is an example of a cross-sectional view taken along line C-C' illustrated in FIG. 11.

FIG. 11 illustrates a vibration apparatus according to another example embodiment of the present disclosure. FIG. 12 is an example of a cross-sectional view taken along line C-C' illustrated in FIG. 11. FIGS. 11 and 12 illustrate an example embodiment implemented by modifying the sensor portion illustrated in FIGS. 9 and 10.

With reference to FIGS. 11 and 12, the vibration apparatus according to another example embodiment of the present disclosure may include a vibration generator 10 and a sensor portion 30.

The vibration generator 10 of FIGS. 11 and 12 may be substantially the same as the vibration generator 10 described above with reference to FIGS. 1 and 2, and thus, the repetitive description thereof may be omitted for brevity.

The sensor portion 30 may be directly configured or integrated outside the vibration generator 10 corresponding to an inner region MA of the vibration generator 10. For example, the sensor portion 30 may be directly configured or integrated in or into outer surfaces 13*b* and 15*b* of any one of a first protection member 13 and a second protection member 15, overlapping the inner region MA, of the vibration generator 10. For example, each of the first protection member 13 and the second protection member 15 may include a plastic material which enables a metal layer to be formed and patterned, but embodiments of the present disclosure are not limited thereto. For example, each of the first protection member 13 and the second protection member 15 may be a polyimide (PI) film or a polyethylene terephthalate (PET) film, but embodiments of the present disclosure are not limited thereto.

The sensor portion 30 according to an example embodiment of the present disclosure may be configured at the vibration generator 10. For example, the sensor portion 30 may be configured at a center portion of the vibration generator 10. For example, a center portion of the sensor portion 30 may be disposed or aligned at the center portion of the vibration generator 10.

The sensor portion 30 according to an example embodiment of the present disclosure may include a gauge pattern portion 33, an insulation member 35, and a sensor lead line 37. For example, each of the gauge pattern portion 33, the insulation member 35, and the sensor lead line 37 of the sensor portion 30 may include a structure where the base member 31 is omitted in the sensor portion 30 described above with reference to FIG. 3A or 3B.

Except that the sensor portion 30 according to an example embodiment of the present disclosure is configured to contact or directly contact center portions of the outer surfaces 13*b* and 15*b* of any one of the first protection member 13 and the second protection member 15 overlapping a center portion of the vibration generator 10, the sensor portion 30 may be substantially the same as the sensor portion 30 described above with reference to FIG. 7, and thus, their repetitive descriptions may be omitted for brevity.

According to an example embodiment of the present disclosure, the gauge pattern portion 33 of the sensor portion 30 may be connected or coupled to a surface which is opposite to a connection surface of the vibration generator 10 connected or coupled to a vibration member, by a connection member. For example, when a first surface (or a second surface) of the vibration generator 10 is connected or coupled to the vibration member, the gauge pattern portion 33 of the sensor portion 30 may be directly configured or integrated in or into a center portion of the second surface (or the first surface) of the vibration generator 10.

According to an example embodiment of the present disclosure, the sensor lead line 37 of the sensor portion 30 may extend to a pad portion 17 of the vibration generator 10. For example, the sensor lead line 37 may be disposed in parallel with each of a first pad electrode 17*a* and a second pad electrode 17*b* of the pad portion 17.

The vibration apparatus described above with reference to FIGS. 11 and 12 according to another example embodiment of the present disclosure may have the same effect as the vibration apparatus described above with reference to FIGS. 9 and 10, and a separate sensor assembly process of attaching or coupling the sensor portion 30 at or to the vibration generator 10 may be omitted.

The vibration apparatus according to another example embodiment of the present disclosure may further include a secondary sensor portion which is configured at the outer region EA of the vibration generator 10. The secondary sensor portion may include first to fourth sensors 30-1 to 30-4 and/or fifth to seventh sensors 30-5 to 30-7 described above with reference to FIG. 8. A sensor of the secondary sensor portion, as described above with reference to FIG. 7, may be directly configured or integrated in or into the outer surfaces 13*b* and 15*b* of any one of the first protection member 13 and the second protection member 15 of the vibration generator 10. Accordingly, because the vibration apparatus according to another example embodiment of the present disclosure further includes the secondary sensor portion which is configured at the outer region EA of the vibration generator 10, an effect of the vibration apparatus described above with reference to FIG. 8 may be additionally realized.

Figure 13:
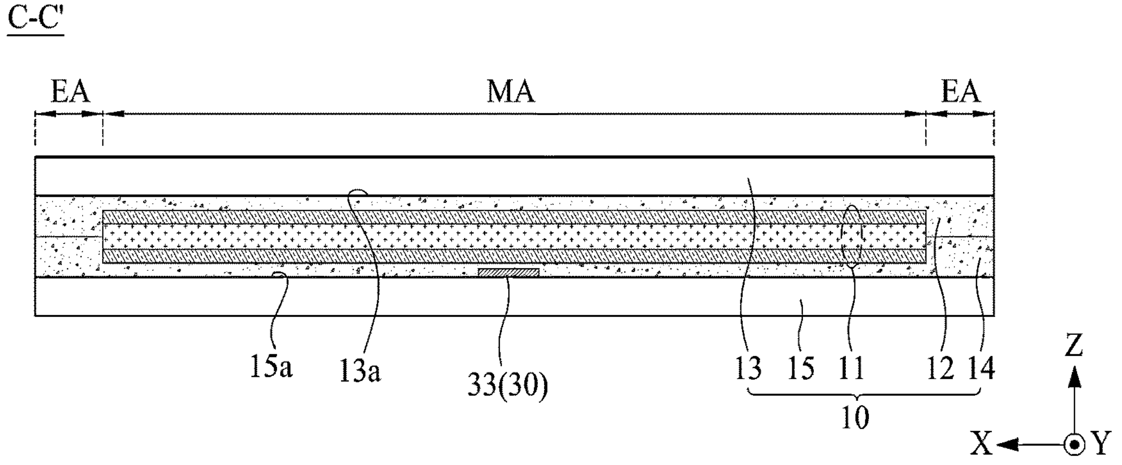
FIG. 13 is an example of another cross-sectional view taken along line C-C' illustrated in FIG. 11.

FIG. 13 is an example of another cross-sectional view taken along line C-C' illustrated in FIG. 11. FIG. 13 illustrates an example embodiment implemented by modifying the sensor portion illustrated in FIGS. 11 and 12.

With reference to FIGS. 11 and 13, the vibration apparatus according to another example embodiment of the present disclosure may include a vibration generator 10 and a sensor portion 30.

The vibration generator 10 of FIG. 13 may be substantially the same as the vibration generator 10 described above with reference to FIGS. 1 and 2, and thus, the repetitive description thereof may be omitted for brevity.

The sensor portion 30 may be directly configured or integrated inside the vibration generator 10 corresponding to an inner region MA of the vibration generator 10. For example, the sensor portion 30 may be directly configured or integrated in or into inner surfaces 13*a* and 15*a* of one or more of a first protection member 13 and a second protection member 15 overlapping the inner region MA of the vibration generator 10. For example, the sensor portion 30 may be directly configured or integrated in or into a center portion of the inner surfaces 13*a* and 15*a* of one or more of a first protection member 13 and a second protection member 15 overlapping a center portion of the vibration generator 10. For example, each of the first protection member 13 and the second protection member 15 may include a plastic material which enables a metal layer to be formed and patterned, but embodiments of the present disclosure are not limited thereto. For example, each of the first protection member 13 and the second protection member 15 may be a polyimide (PI) film or a polyethylene terephthalate (PET) film, but embodiments of the present disclosure are not limited thereto.

The sensor portion 30 according to an example embodiment of the present disclosure may be configured at the vibration generator 10. For example, the sensor portion 30 may be configured at a center portion of the vibration generator 10. For example, the sensor portion 30 may be configured at a central portion of the vibration generator 10. For example, a center portion of the sensor portion 30 may be disposed or aligned at the center portion of the vibration generator 10.

The sensor portion 30 according to an example embodiment of the present disclosure may include a gauge pattern portion 33 and a sensor lead line 37. For example, each of the gauge pattern portion 33 and the sensor lead line 37 of the sensor portion 30 may include a structure where the base member 31 and the insulation member 35 are omitted in the sensor portion 30 described above with reference to FIG. 3A or 3B.

Except that the gauge pattern portion 33 of the sensor portion 30 according to an example embodiment of the present disclosure is configured to contact or directly contact center portions of the inner surfaces 13*a* and 15*a* of any one of the first protection member 13 and the second protection member 15 overlapping a center portion of the vibration generator 10, the sensor portion 30 may be substantially the same as the sensor portion 30 described above with reference to FIG. 6, and thus, their repetitive descriptions may be omitted for brevity.

Except that the gauge pattern portion 33 of the sensor portion 30 according to an example embodiment of the present disclosure is configured to contact or directly contact center portions of the inner surfaces 13*a* and 15*a* of each of the first protection member 13 and the second protection member 15 overlapping a center portion of the vibration generator 10, the sensor portion 30 may be substantially the same as the sensor portion 30 described above with reference to FIG. 6, and thus, their repetitive descriptions may be omitted for brevity.

According to an example embodiment of the present disclosure, the gauge pattern portion 33 of the sensor portion 30 configured at an inner surface 13*a* of the first protection member 13 may be covered by a first adhesive layer 12, and thus, may be electrically insulated. According to an example embodiment of the present disclosure, the gauge pattern portion 33 of the sensor portion 30 configured at an inner surface 15*a* of the second protection member 15 may be covered by a second adhesive layer 14, and thus, may be electrically insulated.

According to an example embodiment of the present disclosure, the sensor lead line 37 of the sensor portion 30 may extend to a pad portion 17 of the vibration generator 10. For example, the sensor lead line 37 may be disposed in parallel with each of a first pad electrode 17*a* and a second pad electrode 17*b* of the pad portion 17.

The vibration apparatus described above with reference to FIG. 13 according to another example embodiment of the present disclosure may have the same effect as the vibration apparatus described above with reference to FIGS. 11 and 12, and an insulation member of the sensor portion 30 may be omitted.

The vibration apparatus according to another example embodiment of the present disclosure may further include a secondary sensor portion which is configured at the outer region EA of the vibration generator 10. The secondary sensor portion may include first to fourth sensors 30-1 to 30-4 and/or fifth to seventh sensors 30-5 to 30-7 described above with reference to FIG. 8. A sensor of the secondary sensor portion, as described above with reference to FIG. 6, may be directly configured or integrated in or into the inner surfaces 13*a* and 15*a* of any one of the first protection member 13 and the second protection member 15 of the vibration generator 10. Accordingly, because the vibration apparatus according to another example embodiment of the present disclosure further includes the secondary sensor portion which is configured at the outer region EA of the vibration generator 10, an effect of the vibration apparatus described above with reference to FIG. 8 may be additionally realized.

Figure 14:
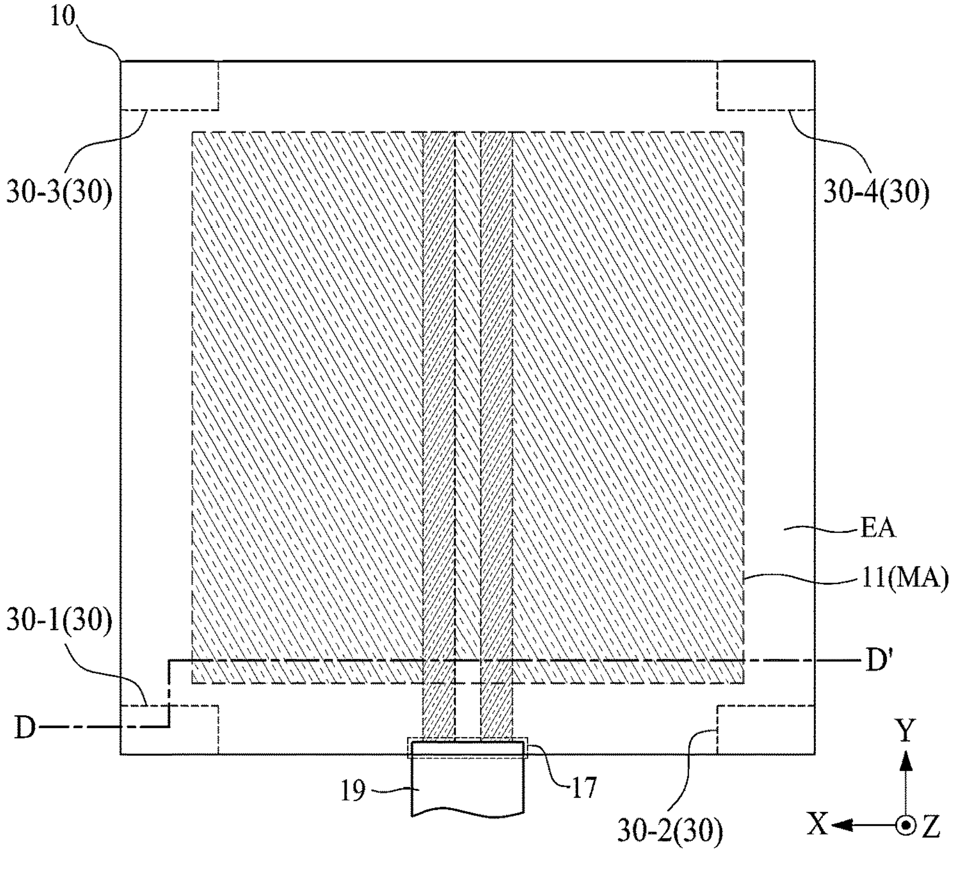
FIG. 14 illustrates a vibration apparatus according to another example embodiment of the present disclosure.
Figure 15:
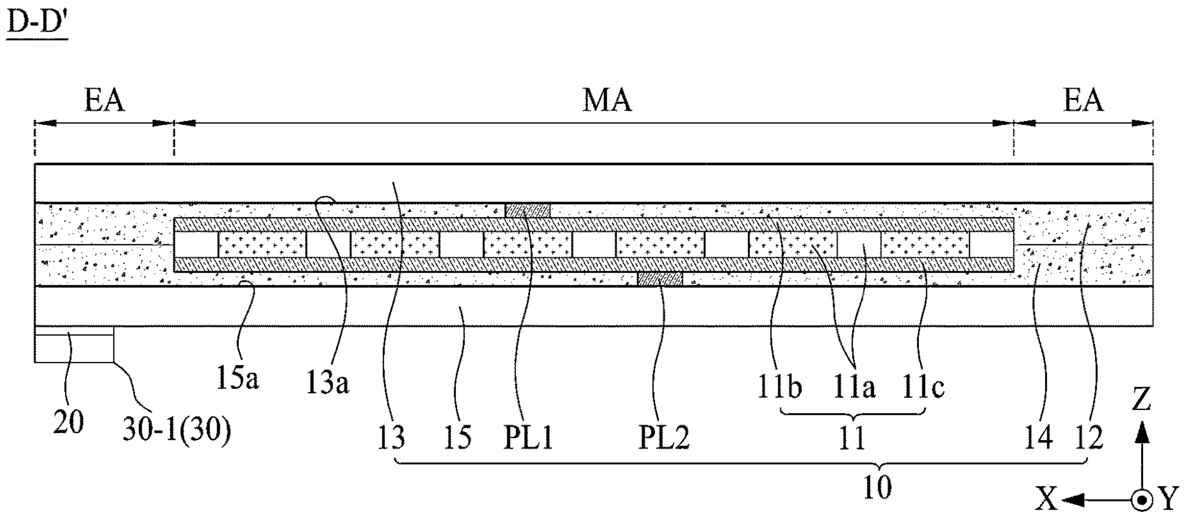
FIG. 15 is an example of a cross-sectional view taken along line D-D' illustrated in FIG. 14.
Figure 16:
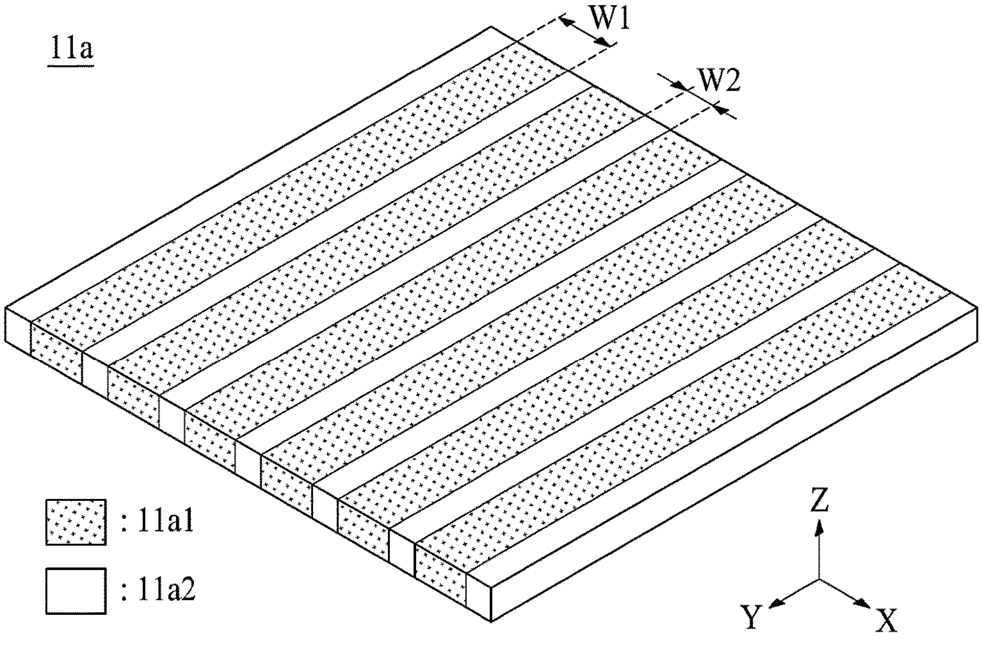
FIG. 16 is an example of a perspective view illustrating a vibration portion of a vibration structure illustrated in FIG. 15.

FIG. 14 illustrates a vibration apparatus according to another example embodiment of the present disclosure. FIG. 15 is an example of a cross-sectional view taken along line D-D' illustrated in FIG. 14. FIG. 16 is an example of a perspective view illustrating a vibration portion of a vibration structure illustrated in FIG. 15. The FIGS. 14 to 16 illustrate an example embodiment implemented by modifying a vibration structure described above with reference to one or more of FIGS. 1, 2, and 4 to 13. In the following description, therefore, their repetitive descriptions of the elements except a vibration structure and relevant elements thereto may be omitted or will be briefly given.

With reference to FIGS. 14 to 16, a vibration apparatus according to another example embodiment of the present disclosure may include a vibration generator 10 and a sensor portion 30.

The vibration generator 10 according to an example embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration generator 10 according to an example embodiment of the present disclosure may include a vibration structure 11, a first protection member 13, and a second protection member 15. The vibration generator 10 (or a vibration structure 11) according to another example embodiment of the present disclosure may include a vibration portion 11*a*, a first electrode portion 11*b*, and a second electrode portion 11*c*.

The vibration portion 11*a* may include a piezoelectric material, a composite piezoelectric material, or an electroactive material, and the piezoelectric material, the composite piezoelectric material and the electroactive material may have a piezoelectric effect. The vibration portion 11*a* may include an inorganic material and an organic material. For example, the vibration portion 11*a* may include a plurality of inorganic material portion configured with a piezoelectric material and at least one organic material portion configured with a flexible material. For example, the vibration portion 11*a* may be referred to as a vibration layer, a piezoelectric layer, a piezoelectric material layer, a piezoelectric material portion, a piezoelectric vibration layer, a piezoelectric vibration portion, an electroactive layer, an electroactive portion, a displacement portion, a piezoelectric displacement layer, a piezoelectric displacement portion, a sound wave generating layer, a sound wave generating portion, an organic-inorganic material layer, an organic-inorganic material portion, a piezoelectric composite layer, a piezoelectric composite, or a piezoelectric ceramic composite, or the like, but embodiments of the present disclosure are not limited thereto. The vibration portion 11*a* may be formed of a transparent, semitransparent, or opaque piezoelectric material, and the vibration portion 11*a* may be transparent, semitransparent, or opaque.

The vibration portion 11*a* according to an example embodiment of the present disclosure may include a plurality of first portions 11*a*1 and a plurality of second portions 11*a*2. For example, the plurality of first portions 11*a*1 and the plurality of second portions 11*a*2 may be alternately and repeatedly arranged in a first direction X (or a second direction Y). For example, the first direction X may be a widthwise direction of the vibration portion 11*a*, the second direction Y may be a lengthwise direction of the vibration portion 11*a*, but embodiments of the present disclosure are not limited thereto. For example, the first direction X may be the lengthwise direction of the vibration portion 11*a*, and the second direction Y may be the widthwise direction of the vibration portion 11*a*.

Each of the plurality of first portions 11*a*1 may be configured as (or may be or may include) an inorganic material portion. The inorganic material portion may include a piezoelectric material, a composite piezoelectric material, or an electroactive material which are includes a piezoelectric effect. For example, each of the plurality of first portions 11*a*1 may include a piezoelectric material which is be substantially the same as the vibration portion 11*a* described above with reference to FIGS. 1 and 2, and thus, like reference numerals may refer to like elements, and the repetitive description thereof may be omitted for brevity.

Each of the plurality of first portions 11*a*1 according to an example embodiment of the present disclosure may be disposed between the plurality of second portions 11*a*2. Each of the plurality of second portions 11*a*2 may be disposed (or arranged) parallel to each other with the first portions 11*a*1 therebetween. For example, the plurality of first portions 11*a*1 may have a first width W1 parallel to the first direction X (or the second direction Y) and a length parallel to the second direction Y (or the first direction X). Each of the plurality of second portions 11*a*2 may have a second width W2 parallel to the first direction X (or the second direction Y) and may have a length parallel to the second direction Y (or the first direction X).

According to an example embodiment of the present disclosure, the first width W1 may be the same as or different from the second width W2. For example, the first width W1 may be greater than the second width W2. Each of the plurality of second portions 11*a*2 may have the same size, for example, the same width, area, or volume. For example, each of the plurality of second portions 11*a*2 may have the same size (for example, the same width, area, or volume) within a process error range (or an allowable error) occurring in a manufacturing process. For example, the first portion 11*a*1 and the second portion 11*a*2 may include a line shape or a stripe shape which has the same size or different sizes.

Therefore, the vibration portion 11*a* may include a 2-2 composite structure and thus may have a resonance frequency of 20 kHz or less, but embodiments of the present disclosure are not limited thereto. For example, the resonance frequency of the vibration portion 11*a* may vary based on at least one or more of a shape, a length, and a thickness.

According to an example embodiment of the present disclosure, the plurality of first portions 11*a*1 and the plurality of second portions 11*a*2 may be disposed (or arranged) on the same plane (or the same layer) in parallel. The plurality of first portions 11*a*1 and the plurality of second portions 11*a*2 may be disposed (or arranged) in parallel on the same plane (or the same layer) and may be connected or coupled to one another.

Each of the plurality of second portions 11*a*2 may be configured to fill a gap between two adjacent first portions of the plurality of first portions 11*a*1. Each of the plurality of second portions 11*a*2 may be connected to or attached to first portions 11*a*1 adjacent thereto. For example, each of the plurality of second portions 11*a*2 may be configured to fill a gap between two adjacent first portions 11*a*1 and may be connected or attached to adjacent second portion 11*a*2. Thus, the vibration portion 11*a* may extend by a desired size or length based on the side coupling (or connection) of the first portions 11*a*1 and the second portions 11*a*2.

According to an example embodiment of the present disclosure, a width (or a size) W2 of each of the plurality of second portions 11*a*2 may progressively decrease in a direction from a center portion to both periphery portions (or both ends) of the vibration portion 11*a* or the vibration generator 10.

According to an example embodiment of the present disclosure, a second portion 11*a*2, having a largest width W2 among the plurality of second portions 11*a*2, may be located at a portion at which a highest stress may concentrate when the vibration portion 11*a* or the vibration generator 10 vibrates in a vertical direction Z (or a thickness direction). A second portion 11*a*2, having a smallest width W2 among the plurality of second portions 11*a*2, may be disposed at a portion where a relatively low stress may occur when the vibration portion 11*a* or the vibration generator 10 vibrates in the vertical direction Z. For example, the second portion 11*a*2, having the largest width W2 among the plurality of second portions 11*a*2, may be disposed at the center portion of the vibration portion 11*a*, and the second portion 11*a*2, having the smallest width W2 among the plurality of second portions 11*a*2 may be disposed at one or more of the both periphery portions of the vibration portion 11*a*. Therefore, when the vibration portion 11*a* or the vibration generator 10 vibrates in the vertical direction Z, interference of a sound wave or overlapping of a resonance frequency, occurring in the portion on which the highest stress concentrates, may be reduced or minimized. Thus, a dip phenomenon of a sound pressure level occurring in the low-pitched sound band may be reduced, thereby improving flatness of a sound characteristic in the low-pitched sound band.

According to an example embodiment of the present disclosure, each of the plurality of first portions 11*a*1 may have different sizes (or widths). For example, a size (or a width) of each of the plurality of first portions 11*a*1 may progressively decrease or increase in a direction from the center portion to the both periphery portions (or both ends) of the vibration portion 11*a* or the vibration generator 10. In the vibration portion 11*a*, a sound pressure level characteristic of a sound may be enhanced and a sound reproduction band may increase, based on various natural vibration frequencies according to a vibration of each of the plurality of first portions 11*a*1 having different sizes.

The plurality of second portions 11*a*2 may be respectively disposed between the plurality of first portions 11*a*1. Therefore, in the vibration portion 11*a* or the vibration generator 10, vibration energy by a link in a unit lattice of each first portion 11*a*1 may increase by a corresponding second portion 11*a*2, and thus, a vibration characteristic may increase, and a piezoelectric characteristic and flexibility may be secured. For example, the second portion 11*a*2 may include one or more of an epoxy-based polymer, an acrylic-based polymer, and a silicone-based polymer, but embodiments of the present disclosure are not limited thereto.

The plurality of second portions 11*a*2 according to an example embodiment of the present disclosure may be configured with an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration portion 11*a* or the vibration generator 10, and may provide flexibility to the vibration portion 11*a* or the vibration generator 10.

The plurality of second portions 11*a*2 according to an example embodiment of the present disclosure may have modulus (or Young's modulus) and viscoelasticity that are lower than those of each first portion 11*a*1, and thus, the second portion 11*a*2 may enhance the reliability of each first portion 11*a*1 vulnerable to an impact due to a fragile characteristic. For example, the second portion 11*a*2 may be configured with (or may include) a material having a loss coefficient of about 0.01 to about 1 and modulus of about 0.1 GPa (Giga Pascal) to about 10 GPa (Giga Pascal).

The organic material portion configured at the second portion 11*a*2 may include an organic material, an organic polymer, an organic piezoelectric material, or an organic non-piezoelectric material that has a flexible characteristic in comparison with the inorganic material portion of the first portions 11*a*1. For example, the second portion 11*a*2 may be referred to as an adhesive portion, an elastic portion, a bending portion, a damping portion, or a flexible portion, or the like each having flexibility, but embodiments of the present disclosure are not limited thereto.

The plurality of first portions 11_a_1 and the plurality of second portion 11_a_2 may be disposed on (or connected to) the same plane, and thus, the vibration portion 11_a_ according to an example embodiment of the present disclosure may have a single thin film-type. For example, the vibration portion 11_a_ may have a structure in which a plurality of first portions 11_a_1 are connected to one side. For example, the plurality of first portions 11_a_1 may have a structure connected to each other through the second portion 11_a_2 in a whole the vibration portion 11_a_. For example, the vibration portion 11_a_ may be vibrated in a vertical direction by the first portion 11_a_1 having a vibration characteristic and may be bent in a curved shape by the second portion 11_a_2 having flexibility.

In the vibration portion 11_a_ according to an example embodiment of the present disclosure, a size of the first portion 11_a_1 and a size of the second portion 11_a_2 may be adjusted based on a piezoelectric characteristic and flexibility needed for the vibration portion 11_a_ or the vibration generator 10. As an embodiment of the present disclosure, when the vibration portion 11_a_ needs a piezoelectric characteristic rather than flexibility, a size of the first portion 11_a_1 may be adjusted to be greater than the second portion 11_a_2. As another embodiment of the present disclosure, when the vibration portion 11_a_ needs flexibility rather than a piezoelectric characteristic, a size of the second portion 11_a_2 may be adjusted to be greater than the first portion 11_a_1. Accordingly, a size of the vibration portion 11_a_ may be adjusted based on a characteristic needed therefor, and thus, the vibration portion 11_a_ may be easy to design.

The first electrode portion 11_b_ may be disposed at a first surface (or a top surface) of the vibration portion 11_a_. The first electrode portion 11_b_ may be disposed at or coupled to a first surface of each of the plurality of first portions 11_a_1 and a first surface of each of the plurality of second portions 11_a_2 in common and may be electrically coupled to the first surface of each of the plurality of first portions 11_a_1. For example, the first electrode portion 11_b_ may have a single electrode (or a common electrode) shape which is disposed at a whole first surface of the vibration portion 11_a_. For example, the first electrode portion 11_b_ may substantially have the same shape as the vibration portion 11_a_, but embodiments of the present disclosure are not limited thereto.

The second electrode portion 11_c_ may be disposed at a second surface (or a rear surface) different from (or opposite to) the first surface of the vibration portion 11_a_. The second electrode portion 11_c_ may be disposed at or coupled to a second surface of each of the plurality of first portions 11_a_1 and a second surface of each of the plurality of second portions 11_a_2 in common and may be electrically connected to the second surface of each of the plurality of first portions 11_a_1. For example, the second electrode portion 11_c_ may have a single electrode (or a common electrode) shape which is disposed at a whole second surface of the vibration portion 11_a_. The second electrode portion 11_c_ may have the same shape as the vibration portion 11_a_, but embodiments of the present disclosure are not limited thereto.

The first electrode portion 11_b_ and the second electrode portion 11_c_ according to an example embodiment of the present disclosure may be configured to the same material as the first electrode portion 11_b_ and the second electrode portion 11_c_ described above with reference to FIGS. 1 and 2, and thus, their repetitive descriptions may be omitted for brevity.

The first electrode portion 11_b_ may be covered by the above-described first protection member 13. The second electrode portion 11_c_ may be covered by the above-described second protection member 15.

The vibration portion 11_a_ may be polarized by a certain voltage applied to the first electrode portion 11_b_ and the second electrode portion 11_c_ in a certain temperature atmosphere or a temperature atmosphere which is changed from a high temperature to a room temperature, but embodiments of the present disclosure are not limited thereto. For example, the vibration portion 11_a_ may alternately and repeatedly contract and expand based on an inverse piezoelectric effect according to a vibration driving signal (or a sound signal or a voice signal) applied to the first electrode portion 11_b_ and the second electrode portion 11_c_ from the outside, and thus, may be displaced or vibrated. For example, the vibration portion 11_a_ may vibrate based on a vertical-direction vibration and a planar direction vibration according to a vibration driving signal applied to the first electrode portion 11_b_ and the second electrode portion 11_c_. The displacement of the vibration portion 11_a_ may be increased by contraction and expansion in the planar direction, whereby a vibration characteristic may be further improved.

The vibration generator 10 according to an example embodiment of the present disclosure may further include a first power supply line PL1 and a second power supply line PL2.

The first power supply line PL1 may be disposed at the first protection member 13 and may be electrically coupled to the first electrode portion 11_b_. For example, the first power supply line PL1 may be disposed at an inner surface 13_a_ of the first protection member 13 facing the first electrode portion 11_b_ and may be electrically coupled or electrically and directly connected to the first electrode portion 11_b_. The second power supply line PL2 may be disposed at the second protection member 15 and may be electrically coupled to the second electrode portion 11_c_. For example, the second power supply line PL2 may be disposed at an inner surface 15_a_ of the second protection member 15 facing the second electrode portion 11_c_ and may be electrically coupled or electrically and directly connected to the second electrode portion 11_c_.

The vibration generator 10 according to an example embodiment of the present disclosure may include a pad portion 17.

The pad portion 17 may be configured at one periphery portion of any one of the first protection member 13 and the second protection member 15 to be electrically connected to one portion (or one end) of each of the first power supply line PL1 and the second power supply line PL2.

The pad portion 17 according to an example embodiment of the present disclosure may include a first pad electrode electrically coupled to one portion of the first power supply line PL1 and a second pad electrode electrically coupled to one portion of the second power supply line PL2.

The first pad electrode may be disposed at one periphery portion of any one of the first protection member 13 and the second protection member 15 and may be connected to one portion of the first power supply line PL1. For example, the first pad electrode may pass through any one of the first protection member 13 and the second protection member 15 to be electrically coupled to one portion of the first power supply line PL1.

The second pad electrode may be disposed in parallel with the first pad electrode and may be electrically coupled to one portion of the second power supply line PL2. For example, the second pad electrode may pass through any one of the first protection member 13 and the second protection member 15 to be electrically connected to one portion of the second power supply line PL2.

According to an example embodiment of the present disclosure, each of the first power supply line PL1, the second power supply line PL2, and the pad portion 17 may be configured to be transparent, translucent, or opaque.

The pad portion 17 according to another example embodiment of the present disclosure may be electrically coupled to a signal cable 19.

The signal cable 19 may be electrically connected to the pad portion 17 disposed at the vibration generator 10 and may supply the vibration generator 10 with vibration driving signals (or sound signals or a voice signal) provided from a vibration driving circuit (or a sound processing circuit). The signal cable 19 according to an example embodiment of the present disclosure may include a first terminal electrically coupled to the first pad electrode of the pad portion 17 and a second terminal electrically coupled to the second pad electrode of the pad portion 17. For example, the signal cable 19 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sensor portion 30 may include one or more sensors 30-1 to 30-4 configured at the vibration generator 10. For example, the sensor portion 30 may be substantially the same as the sensor portion 30 described above with reference to FIGS. 1 to 13, and thus, the repetitive description thereof may be omitted or will be briefly given below.

According to an example embodiment of the present disclosure, the sensor portion 30 may include the one or more sensors 30-1 to 30-4 which are configured outside or inside the vibration generator 10. In an embodiment of the present disclosure, the sensor portion 30 may include first to fourth sensors 30-1 to 30-4 which are configured at an outer region EA of the vibration generator 10 and may be substantially the same as the sensor portion 30 described above with reference to FIGS. 1, 2, and 4 to 7, and thus, the repetitive description thereof may be omitted for brevity. In another embodiment of the present disclosure, the sensor portion 30 may include first to fourth sensors 30-1 to 30-4 which are configured at corner portions of the vibration generator 10 and may be substantially the same as the sensor portion 30 described above with reference to FIG. 8, and thus, the repetitive description thereof may be omitted for brevity.

According to an example embodiment of the present disclosure, the sensor portion 30 may include the first to fourth sensors 30-1 to 30-4. Each of the first to fourth sensors 30-1 to 30-4, as described above with reference to FIG. 6 or 13, may include a gauge pattern portion which is configured to contact or directly contact inner surfaces 13*a* and 15*a* of any one of a first protection member 13 and a second protection member 15 of the vibration generator 10. For example, the gauge pattern portion of each of the first to fourth sensors 30-1 to 30-4 may include the same metal material as a first power supply line PL1 or a second power supply line PL2, and the first power supply line PL1 or the second power supply line PL2 may be patterned together. For example, each of the first to fourth sensors 30-1 to 30-4 may be covered by one or more of a first adhesive layer 12 and a second adhesive layer 14, and thus, may be electrically insulated from each other.

As described above, the vibration generator 10 according to another example embodiment of the present disclosure may be implemented as a thin film type because a first portion 11*a*1 having a piezoelectric characteristic and a second portion 11*a*2 having flexibility are alternately and repeatedly connected to each other. Accordingly, the vibration apparatus including the vibration generator 10 may have flexibility, and thus, damage or breakdown, or the like caused by an external impact may be minimized or prevented and the reliability of sound reproduction may be enhanced.

FIGS. 17A to 17D are perspective views, each of which illustrates a vibration portion of a vibration structure according to another example embodiment of the present disclosure, in vibration generator according to another example embodiment of the present disclosure. FIGS. 17A to 17D illustrate an example embodiment where the vibration portion described above with reference to FIGS. 15 and 16 is modified. In the following description, therefore, repetitive descriptions of the elements except a vibration portion and relevant elements thereto may be omitted or will be briefly given.

Figure 17A:
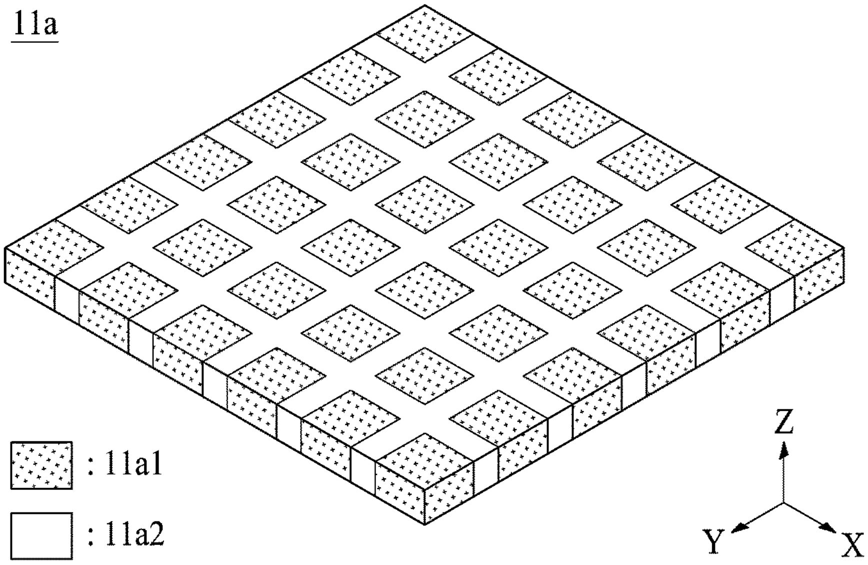
FIGS. 17A to 17D are perspective views, each of which illustrates a vibration portion of a vibration structure according to another example embodiment of the present disclosure.

With reference to FIG. 17A, the vibration portion 11*a* according to another example embodiment of the present disclosure may include a plurality of first portions 11*a*1, which are spaced apart from one another along a first direction X and a second direction Y, and a second portion (or one or more second portions) 11*a*2 disposed between the plurality of first portions 11*a*1.

Each of the plurality of first portions 11*a*1 may be disposed to be spaced apart from one another along the first direction X and the second direction Y. For example, each of the plurality of first portions 11*a*1 may have a hexahedral shape (or a six-sided object shape) having the same size and may be disposed in a lattice shape. Each of the plurality of first portions 11*a*1 may include a piezoelectric material which is be substantially the same as the first portion 11*a*1 described above with reference to FIGS. 1 and 2 or the first portion 11*a*1 described above with reference to FIGS. 14 to 16, and thus, like reference numerals may refer to like elements, and the repetitive description thereof may be omitted for brevity.

The second portion 11*a*2 may be disposed between the plurality of first portions 11*a*1 along each of the first direction X and the second direction Y. The second portion 11*a*2 may be configured to fill a gap or a space between two adjacent first portions 11*a*1 or to surround each of the plurality of first portions 11*a*1, and thus, may be connected to or attached on an adjacent first portion 11*a*1. According to an example embodiment of the present disclosure, a width of a second portion 11*a*2 disposed between two first portions 11*a*1 adjacent to each other along the first direction X may be the same as or different from a width of the first portion 11*a*1, and the width of a second portion 11*a*2 disposed between two first portions 11*a*1 adjacent to each other along the second direction Y may be the same as or different from the width of the first portion 11*a*1. The second portion 11*a*2 may include an organic material which is be substantially the same as the second portion 11*a*2 described above with reference to FIGS. 14 to 16, and thus, like reference numerals may refer to like elements, and the repetitive description thereof may be omitted for brevity.

As described above, the vibration portion 11*a* according to another example embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration portion 11*a* may vary based on at least one or more of a shape, a length, and a thickness, or the like.

Figure 17B:
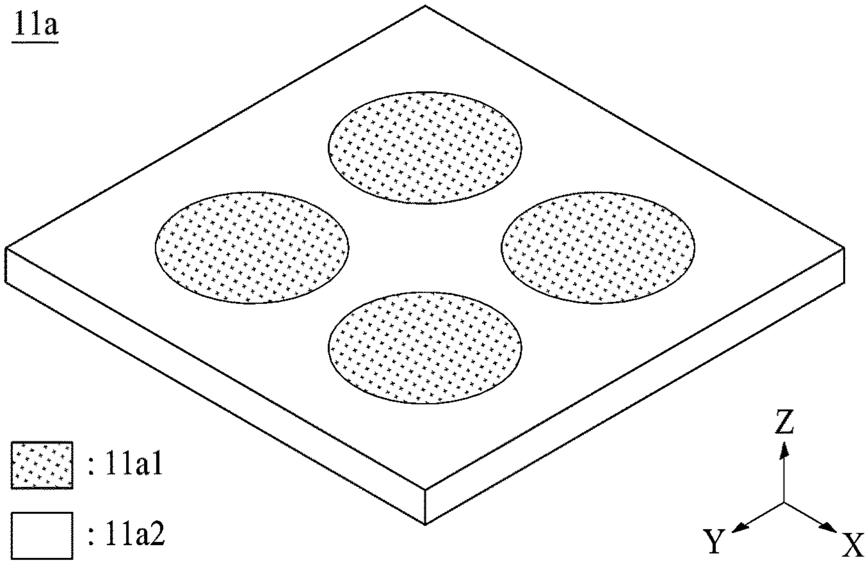

With reference to FIG. 17B, the vibration portion 11*a* according to another example embodiment of the present disclosure may include a plurality of first portions 11*a*1, which are spaced apart from one another along a first direction X and a second direction Y, and a second portion (or one or more second portions) 11*a*2 disposed between the plurality of first portions 11*a*1.

Each of the plurality of first portions 11*a*1 may have a flat structure of a circular shape. For example, each of the plurality of first portions 11*a*1 may have a circular plate shape, but embodiments of the present disclosure are not limited thereto. For example, each of the plurality of first portions 11*a*1 may have a dot shape including an oval shape, a polygonal shape, or a donut shape. Each of the plurality of first portions 11*a*1 may include a piezoelectric material which is be substantially the same as the first portion 11*a*1 described above with reference to FIGS. 1 and 2 or the first portion 11*a*1 described above with reference to FIGS. 14 to 16, and thus, like reference numerals may refer to like elements, and the repetitive description thereof may be omitted for brevity.

The second portion 11*a*2 may be disposed between the plurality of first portions 11*a*1 along each of the first direction X and the second direction Y. The second portion 11*a*2 may be configured to surround each of the plurality of first portions 11*a*1, and thus, may be connected to or attached on a side surface of each of the plurality of first portions 11*a*1. Each of the plurality of first portions 11*a*1 and the second portion 11*a*2 may be disposed (or arranged) in parallel on the same plane (or the same layer). The second portion 11*a*2 may include an organic material which is be substantially the same as the second portion 11*a*2 described above with reference to FIGS. 14 to 16, and thus, like reference numerals may refer to like elements, and the repetitive description thereof may be omitted for brevity.

Figure 17C:
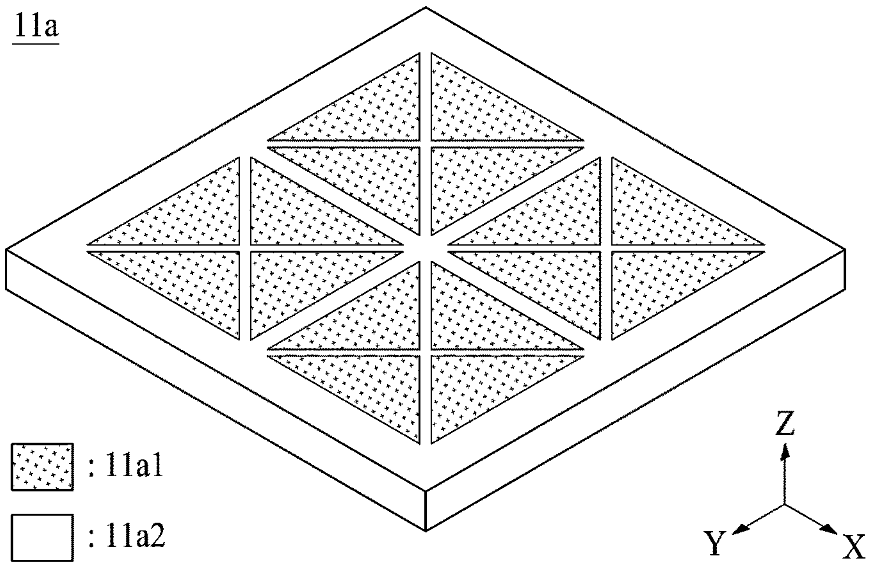

With reference to FIG. 17C, the vibration portion 11*a* according to another example embodiment of the present disclosure may include a plurality of first portions 11*a*1, which are spaced apart from one another along a first direction X and a second direction Y, and a second portion (or one or more second portions) 11*a*2 disposed between the plurality of first portions 11*a*1.

Each of the plurality of first portions 11*a*1 may have a flat structure of a triangular shape. For example, each of the plurality of first portions 11*a*1 may have a triangular plate shape, but embodiments of the present disclosure are not limited thereto. Each of the plurality of first portions 11*a*1 may include a piezoelectric material which is be substantially the same as the first portion 11*a*1 described above with reference to FIGS. 1 and 2 or the first portion 11*a*1 described above with reference to FIGS. 14 to 16, and thus, like reference numerals may refer to like elements, and the repetitive description thereof may be omitted for brevity.

According to an example embodiment of the present disclosure, four adjacent first portions 11*a*1 among the plurality of first portions 11*a*1 may be adjacent to one another to form a tetragonal (or quadrilateral shape or a square shape). Vertices of the four adjacent first portions 11*a*1 forming a tetragonal shape may be adjacent to one another in a center portion (or a central portion) of the tetragonal shape.

The second portion 11*a*2 may be disposed between the plurality of first portions 11*a*1 along each of the first direction X and the second direction Y. The second portion 11*a*2 may be configured to surround each of the plurality of first portions 11*a*1, and thus, may be connected to or attached on a side surface of each of the plurality of first portions 11*a*1. Each of the plurality of first portions 11*a*1 and the second portion 11*a*2 may be disposed (or arranged) in parallel on the same plane (or the same layer). The second portion 11*a*2 may include an organic material which is be substantially the same as the second portion 11*a*2 described above with reference to FIGS. 14 to 16, and thus, like reference numerals may refer to like elements, and the repetitive description thereof may be omitted for brevity.

Figure 17D:
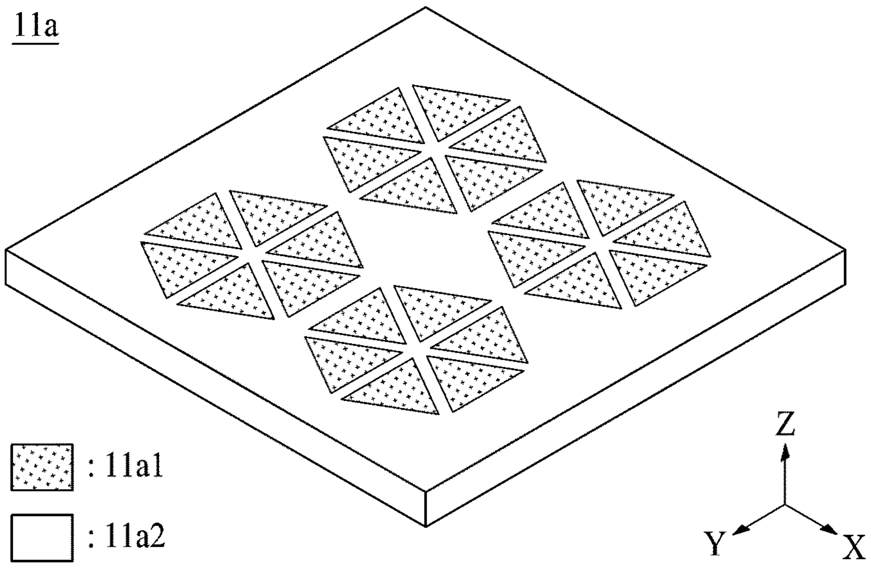

With reference to FIG. 17D, the vibration portion 11*a* according to another example embodiment of the present disclosure may include a plurality of first portions 11*a*1, which are spaced apart from one another along a first direction X and a second direction Y, and a second portion (or one or more second portions) 11*a*2 disposed between the plurality of first portions 11*a*1.

Each of the plurality of first portions 11*a*1 may have a flat structure of a triangular shape. For example, each of the plurality of first portions 11*a*1 may have a triangular plate shape, but embodiments of the present disclosure are not limited thereto. Each of the plurality of first portions 11*a*1 may include a piezoelectric material which is be substantially the same as the first portion 11*a*1 described above with reference to FIGS. 1 and 2 or the first portion 11*a*1 described above with reference to FIGS. 14 to 16, and thus, like reference numerals may refer to like elements, and the repetitive description thereof may be omitted for brevity.

According to another example embodiment of the present disclosure, six adjacent first portions 11*a*1 of the plurality of first portions 11*a*1 may be adjacent to one another to form a hexagonal shape (or a regularly hexagonal shape). Vertices of the six adjacent first portions 11*a*1 forming a hexagonal shape may be adjacent to one another in a center portion (or a central portion) of the hexagonal shape.

The second portion 11*a*2 may be disposed between the plurality of first portions 11*a*1 along each of the first direction X and the second direction Y. The second portion 11*a*2 may be configured to surround each of the plurality of first portions 11*a*1, and thus, may be connected to or attached on a side surface of each of the plurality of first portions 11*a*1. Each of the plurality of first portions 11*a*1 and the second portion 11*a*2 may be disposed (or arranged) in parallel on the same plane (or the same layer). The second portion 11*a*2 may include an organic material which is be substantially the same as the second portion 11*a*2 described above with reference to FIGS. 14 to 16, and thus, like reference numerals may refer to like elements, and the repetitive description thereof may be omitted for brevity.

Figure 18:
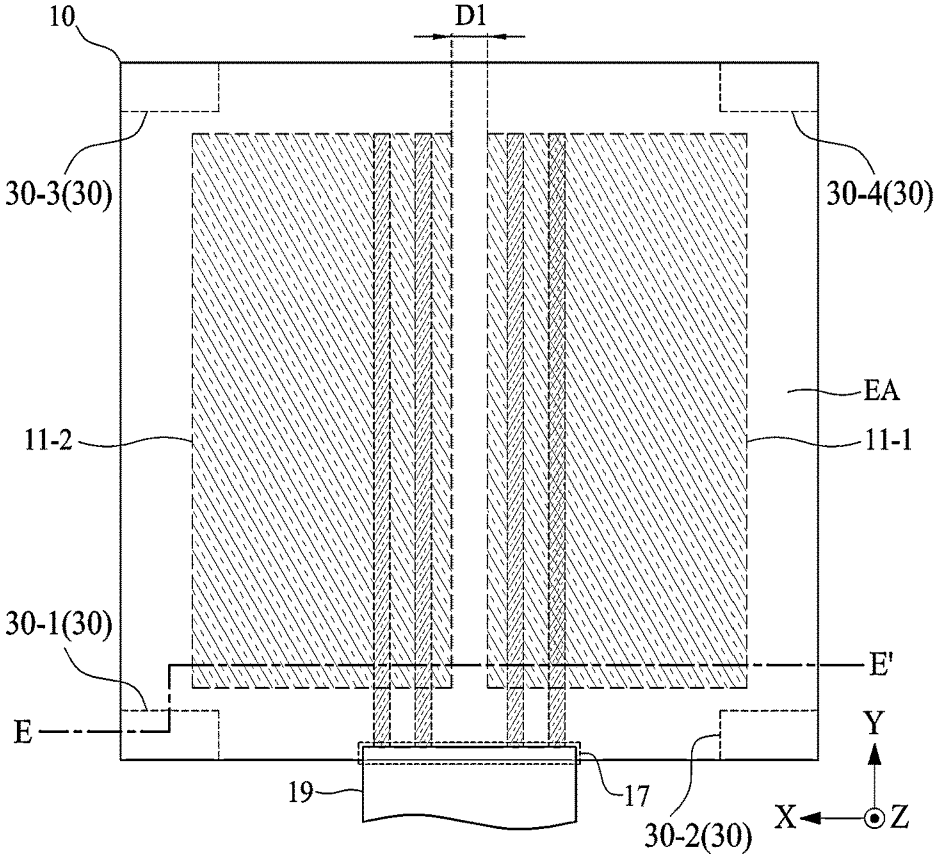
FIG. 18 illustrates a vibration generator according to another example embodiment of the present disclosure.
Figure 19:
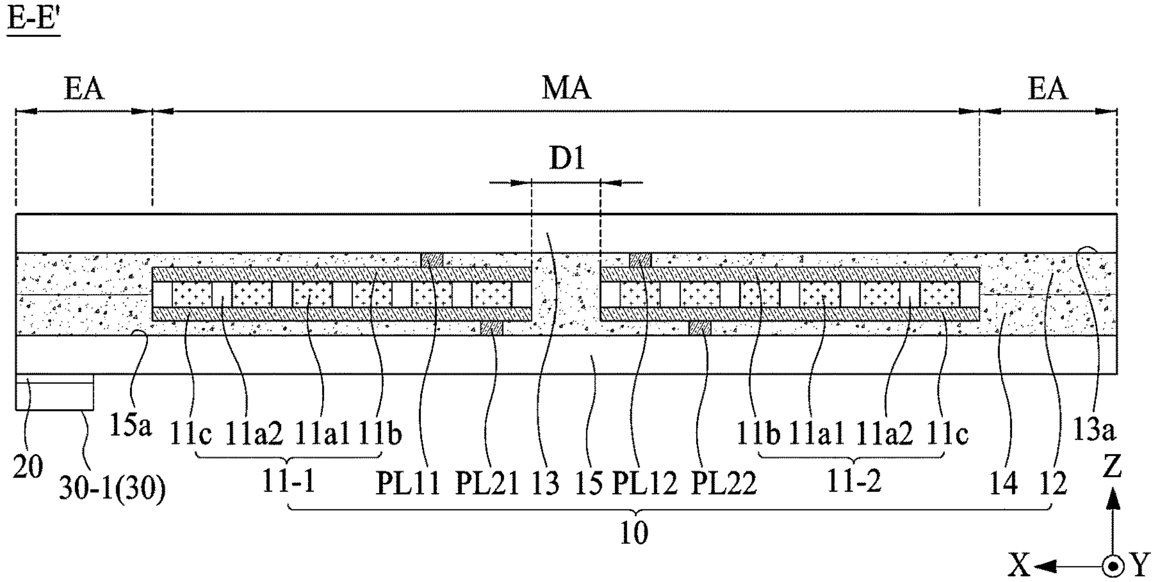
FIG. 19 is an example of a cross-sectional view taken along line E-E' illustrated in FIG. 18.

FIG. 18 illustrates a vibration generator according to another example embodiment of the present disclosure. FIG. 19 is an example of a cross-sectional view taken along line E-E' illustrated in FIG. 18. FIGS. 18 and 19 illustrate an example embodiment where the vibration structure described above with reference to FIGS. 14 to 16 is modified. In the following description, therefore, repetitive descriptions of the elements except a vibration structure and relevant elements thereto may be omitted or will be briefly given.

With reference to FIGS. 18 and 19, the vibration apparatus according to another example embodiment of the present disclosure may include a vibration generator 10 and a sensor portion 30.

The vibration generator 10 according to an example embodiment of the present disclosure may include a first vibration structure 11-1, a second vibration structure 11-2, a first protection member 13, and a second protection member 15.

Each of the first and second vibration structures 11-1 and 11-2 may be electrically separated and disposed while being spaced apart from each other along a first direction X. The first and second vibration structures 11-1 and 11-2 may be a vibration array, a vibration generating array, a division vibration array, a partial vibration array, a division vibration structure, a partial vibration structure, an individual vibration structure, a vibration module, a vibration module array portion, or a vibration array structure, but embodiments of the present disclosure are not limited thereto.

Each of the first and second vibration structures 11-1 and 11-2 may alternately and repeatedly contract and/or expand based on a piezoelectric effect to vibrate. For example, the first and second vibration structures 11-1 and 11-2 may be disposed or tiled at a certain interval (or distance) D1. Thus, the vibration generator 10 in which the first and second vibration structures 11-1 and 11-2 are tiled may be a vibration film, a displacement generator, a displacement structure, a sound generating structure, a sound generator, a tiling vibration array, a tiling vibration array module, or a tiling vibration film, but embodiments of the present disclosure are not limited thereto.

Each of the first and second vibration structures 11-1 and 11-2 according to an example embodiment of the present disclosure may have a tetragonal shape. For example, each of the first and second vibration structures 11-1 and 11-2 may have a tetragonal shape having a width of about 5 cm or more. For example, each of the first and second vibration structures 11-1 and 11-2 may have a square shape having a size of 5 cm×5 cm or more, but embodiments of the present disclosure are not limited thereto.

Each of the first and second vibration structures 11-1 and 11-2 may be arranged or tiled on the same plane, and thus, the vibration generator 10 may have an enlarged area based on tiling of the first and second vibration structures 11-1 and 11-2 having a relatively small size.

Each of the first and second vibration structures 11-1 and 11-2 may be arranged or tiled at a certain interval (or distance), and thus, may be implemented as one vibration apparatus (or a single vibration apparatus) which is driven as one complete single body without being independently driven. According to an example embodiment of the present disclosure, with respect to the first direction X, a first separation distance (or a first interval) D1 between the first and second vibration structures 11-1 and 11-2 may be 0.1 mm or more and less than 3 cm, but embodiments of the present disclosure are not limited thereto.

According to an example embodiment of the present disclosure, each of the first and second vibration structures 11-1 and 11-2 may be disposed or tiled to have the first separation distance (or the first interval) D1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration structures 11-1 and 11-2. For example, the first and second vibration structures 11-1 and 11-2 may be disposed in the first separation distance (or the first interval) D1 of 0.1 mm or more and less than 5 mm, in order to increase a reproduction band of a sound generated based on a single-body vibration of the first and second vibration structures 11-1 and 11-2 and to increase a sound of a low-pitched sound band (for example, a sound pressure level characteristic in 500 Hz or less).

According to an example embodiment of the present disclosure, when the first and second vibration structures 11-1 and 11-2 are disposed in the interval D1 of less than 0.1 mm or without the first separation distance (or the first interval) D1, the reliability of the first and second vibration structures 11-1 and 11-2 or the vibration generator 10 may be reduced due to damage or a crack caused by a physical contact therebetween which occurs when each of the first and second vibration structures 11-1 and 11-2 vibrates.

According to an example embodiment of the present disclosure, when the first and second vibration structures 11-1 and 11-2 are disposed in the first separation distance (or the first interval) D1 of 3 cm or more, the first and second vibration structures 11-1 and 11-2 may not be driven as one vibration apparatus due to an independent vibration of each of the first and second vibration structures 11-1 and 11-2. Therefore, a reproduction band of a sound and a sound pressure level characteristic of a sound which is generated based on vibrations of the first and second vibration structures 11-1 and 11-2 may be reduced. For example, when the first and second vibration structures 11-1 and 11-2 are disposed in the first separation distance (or the first interval) D1 of 3 cm or more, a sound characteristic and a sound pressure level characteristic of the low-pitched sound band (for example, in 500 Hz or less) may each be reduced.

According to an example embodiment of the present disclosure, when the first and second vibration structures 11-1 and 11-2 are disposed in the first separation distance (or the first interval) D1 interval of 5 mm, each of the first and second vibration structures 11-1 and 11-2 may not be perfectly driven as one vibration apparatus, and thus, a sound characteristic and a sound pressure level characteristic of the low-pitched sound band (for example, in 200 Hz or less) may each be reduced.

According to another example embodiment of the present disclosure, when the first and second vibration structures 11-1 and 11-2 are disposed in the first separation distance (or the first interval) D1 of 1 mm, each of the first and second vibration structures 11-1 and 11-2 may be driven as one vibration apparatus, and thus, a reproduction band of a sound may increase and a sound of the low-pitched sound band (for example, a sound pressure level characteristic in 500 Hz or less) may increase. For example, when the first and second vibration structures 11-1 and 11-2 are disposed in the first separation distance (or the first interval) D1 of 1 mm, the vibration generator 10 may be implemented as a large-area vibrator which is enlarged based on optimization of a separation distance between the first and second vibration structures 11-1 and 11-2. Therefore, the vibration generator 10 may be driven as a large-area vibrator based on a single-body vibration of the first and second vibration structures 11-1 and 11-2, and thus, a sound characteristic and a sound pressure level characteristic may each increase a reproduction band of a sound and the low-pitched sound band generated based on a large-area vibration of the vibration generator 10.

Therefore, to implement a single-body vibration (or one vibration apparatus) of the first and second vibration structures 11-1 and 11-2, the first separation distance (or the first interval) D1 between the first and second vibration structures 11-1 and 11-2 may be adjusted to 0.1 mm or more and less than 3 cm. In addition, to implement a single-body vibration (or one vibration apparatus) of the first and second vibration structures 11-1 and 11-2 and to increase a sound pressure level characteristic of a sound of the low-pitched sound band, the first separation distance (or the first interval)

D1 between the first and second vibration structures 11-1 and 11-2 may be adjusted to 0.1 mm or more and less than 5 mm.

Each of the first and second vibration structures 11-1 and 11-2 according to an example embodiment of the present disclosure may include a vibration portion 11*a*, a first electrode portion 11*b*, and a second electrode portion 11*c*.

The vibration portion 11*a* may include a ceramic-based material capable of realizing a relatively high vibration. For example, the vibration portion 11*a* may include a 1-3 composite having a piezoelectric characteristic of a 1-3 vibration mode or a 2-2 composite having a piezoelectric characteristic of a 2-2 vibration mode. For example, the vibration portion 11*a* may include the first portions 11*a*1 and the second portion 11*a*2 similar to the vibration portion 11*a* described above with reference to FIGS. 15 and 16, or to the vibration portion 11*a* described above with reference to any one of FIGS. 17A to 17D, and thus, like reference numerals refer to like elements, and their repetitive descriptions may be omitted for brevity.

According to an example embodiment of the present disclosure, the first vibration structure 11-1 may include any one vibration portion 11*a* among the vibration portion 11*a* described above with reference to FIGS. 15, 16, and 17A to 17D. The second vibration structure 11-2 may include a vibration portion 11*a* which is the same as or differs from the vibration portion 11*a* of the first vibration structure 11-1 among the vibration portion 11*a* described above with reference to FIGS. 15, 16, and 17A to 17D.

According to an example embodiment of the present disclosure, the vibration portion 11*a* may be formed of a transparent, semitransparent, or opaque piezoelectric and the vibration portion 11*a* may be transparent, semitransparent, or opaque.

The first electrode portion 11*b* may be disposed at a first surface of the corresponding vibration portion 11*a* and may be electrically coupled to the first surface of the vibration portion 11*a*. For example, the first electrode portion 11*b* may be substantially the same as the first electrode portion 11*b* described above with reference to FIGS. 15 and 16, and thus, like reference numerals may refer to like elements, and the repetitive description thereof may be omitted for brevity.

The second electrode portion 11*c* may be disposed at a second surface of the corresponding vibration portion 11*a* and electrically connected to the second surface of the vibration portion 11*a*. The second electrode portion 11*c* may be substantially the same as the second electrode portion 11*c* described above with reference to FIGS. 15 and 16, and thus, like reference numerals may refer to like elements, and the repetitive description thereof may be omitted for brevity.

The vibration generator 10 according to another example embodiment of the present disclosure may further include a first protection member 13 and a second protection member 15.

The first protection member 13 may be disposed at the first surface of the vibration generator 10. For example, the first protection member 13 may cover the first electrode portion 11*b* which is disposed at a first surface of each of the first and second vibration structures 11-1 and 11-2, and thus, the first protection member 13 may be commonly connected to the first surface of each of the first and second vibration structures 11-1 and 11-2 or may commonly support the first surface of each of the first and second vibration structures 11-1 and 11-2. Accordingly, the first protection member 13 may protect the first surface or the first electrode portion 11*b* of each of the first and second vibration structures 11-1 and 11-2.

The second protection member 15 may be disposed at the second surface of the vibration generator 10. For example, the second protection member 15 may cover the second electrode portion 11*c* which is disposed at a second surface of each of the first and second vibration structures 11-1 and 11-2, and thus, the second protection member 15 may be commonly connected to the second surface of each of the first and second vibration structures 11-1 and 11-2 or may commonly support the second surface of each of the first and second vibration structures 11-1 and 11-2. Accordingly, the second protection member 15 may protect the second surface or the second electrode portion 11*c* of each of the first and second vibration structures 11-1 and 11-2.

The first protection member 13 and the second protection member 15 according to an example embodiment of the present disclosure may each include one or more material of plastic, fiber, and wood, but embodiments of the present disclosure are not limited thereto. For example, each of the first protection member 13 and the second protection member 15 may include the same material or different material. For example, each of the first protection member 13 and the second protection member 15 may be a polyimide (PI) film or a polyethylene terephthalate (PET) film, but embodiments of the present disclosure are not limited thereto.

The first protection member 13 according to an example embodiment of the present disclosure may be disposed at the first surface of each of the first and second vibration structures 11-1 and 11-2 by a first adhesive layer 12. For example, the first protection member 13 may be directly disposed at the first surface of each of the first and second vibration structures 11-1 and 11-2 by a film laminating process using the first adhesive layer 12. Accordingly, each of the first and second vibration structures 11-1 and 11-2 may be integrated (or disposed) or tiled with the first protection member 13 to have the first separation distance (or the first interval) D1.

The second protection member 15 according to an example embodiment of the present disclosure may be disposed at the second surface of each of the first and second vibration structures 11-1 and 11-2 by a second adhesive layer 14. For example, the second protection member 15 may be directly disposed at the second surface of each of the first and second vibration structures 11-1 and 11-2 by a film laminating process using the second adhesive layer 14. Accordingly, each of the first and second vibration structures 11-1 and 11-2 may be integrated (or disposed) or tiled with the second protection member 15 to have the first separation distance (or the first interval) D1. For example, the vibration generator 10 may be implemented as one film by the first protection member 13 and the second protection member 15.

The first adhesive layer 12 may be disposed between the first and second vibration structures 11-1 and 11-2 and disposed at the first surface of each of the first and second vibration structures 11-1 and 11-2. For example, the first adhesive layer 12 may be formed at an inner surface 13*a* of the first protection member 13 facing the first surface of each of the first and second vibration structures 11-1 and 11-2, filled between the first and second vibration structures 11-1 and 11-2, and filled between at the first protection member 13 and the first surface of each of the first and second vibration structures 11-1 and 11-2.

The second adhesive layer 14 may be disposed between the first and second vibration structures 11-1 and 11-2 and disposed at the second surface of each of the first and second vibration structures 11-1 and 11-2. For example, the second adhesive layer 14 may be formed at an inner surface 15*a* of the second protection member 15 facing the second surface of each of the first and second vibration structures 11-1 and 11-2, filled between the first and second vibration structures 11-1 and 11-2, and filled between at the second protection member 15 and the second surface of each of the first and second vibration structures 11-1 and 11-2.

The first and second adhesive layers 12 and 14 may be connected or coupled to each other between the first and second vibration structures 11-1 and 11-2. Therefore, each of the first and second vibration structures 11-1 and 11-2 may be surrounded by the first and second adhesive layers 12 and 14. For example, the first and second adhesive layers 12 and 14 may be configured between the first protection member 13 and the second protection member 15 to completely surround the first and second vibration structures 11-1 and 11-2. For example, each of the first and second vibration structures 11-1 and 11-2 may be embedded or built-in between the first adhesive layer 12 and the second adhesive layer 14.

Each of the first and second adhesive layers 12 and 14 according to an example embodiment of the present disclosure may include an electric insulating material which has adhesiveness and is capable of compression and decompression. For example, each of the first and second adhesive layers 12 and 14 may include an epoxy-based polymer, an acrylic-based polymer, a silicone-based polymer, or a urethane-based polymer, but embodiments of the present disclosure are not limited thereto. Each of the first and second adhesive layers 12 and 14 may be configured to be transparent, translucent, or opaque.

The vibration generator 10 according to another example embodiment of the present disclosure may further include a first power supply line PL1 disposed at the first protection member 13, a second power supply line PL2 disposed at the second protection member 15, and a pad portion 17 electrically coupled to the first power supply line PL1 and the second power supply line PL2.

The first power supply line PL1 may be disposed at an inner surface 13*a* of the first protection member 13 facing the first surface of each of the first and second vibration structures 11-1 and 11-2. The first power supply line PL1 may be electrically coupled or electrically and directly connected to the first electrode portion 11*b* of each of the first and second vibration structures 11-1 and 11-2.

The first power supply line PL1 according to an example embodiment of the present disclosure may include 1-1$^{st}$ and 1-2$^{nd}$ power lines PL11 and PL12 disposed along a second direction Y. For example, the 1-1$^{st}$ power line PL11 may be electrically coupled to the first electrode portion 11*b* of the first vibration structure 11-1. The 1-2$^{nd}$ power line PL12 may be electrically coupled to the first electrode portion 11*b* of the second vibration structure 11-2. For example, the 1-1$^{st}$ power line PL11 may be a first upper power line, and the 1-2$^{nd}$ power line PL12 may be second upper power line, but embodiments of the present disclosure are not limited thereto.

The second power supply line PL2 may be disposed at an inner surface 15*a* of the second protection member 15 facing the second surface of each of the first and second vibration structures 11-1 and 11-2. The second power supply line PL2 may be electrically coupled or electrically and directly connected to the second electrode portion 11*c* of each of the first and second vibration structures 11-1 and 11-2.

The second power supply line PL2 according to an example embodiment of the present disclosure may include 2-1$^{st}$ and 2-2$^{nd}$ power lines PL21 and PL22 disposed along a second direction Y. For example, the 2-1$^{st}$ power line PL21 may be electrically coupled to the second electrode portion 11*c* of the first vibration structure 11-1. For example, the 2-1$^{st}$ power line PL21 may not to overlap the 1-1$^{st}$ power line PL11 and may be staggered to each other. The 2-2$^{nd}$ power line PL22 may be electrically coupled to the second electrode portion 11*c* of the second vibration structure 11-2. For example, the 2-2$^{nd}$ power line PL22 may not to overlap the 1-2$^{nd}$ power line PL12 and may be staggered to each other. For example, the 2-1$^{st}$ power line PL21 may be a first lower power line, and the 2-2$^{nd}$ power line PL22 may be a second lower power line, but embodiments of the present disclosure are not limited thereto.

The pad portion 17 may be configured at one periphery portion of any one of the first protection member 13 and the second protection member 15 to be electrically connected to one portion (or one end) of each of the first power supply line PL1 and the second power supply line PL2.

The pad portion 17 according to an example embodiment of the present disclosure may include a first pad electrode electrically coupled to one end of the first power supply line PL1, and a second pad electrode electrically coupled to one end of the second power supply line PL2.

The first pad electrode may be commonly coupled to one portion of each of the 1-1$^{st}$ and 1-2$^{nd}$ power lines PL11 and PL12 of the first power supply line PL1. For example, the one portion of each of the 1-1$^{st}$ and 1-2$^{nd}$ power lines PL11 and PL12 may branch from the first pad electrode. The second pad electrode may be commonly coupled to one portion of each of the 2-1$^{st}$ and 2-2$^{nd}$ power lines PL21 and PL22 of the second power supply line PL2. For example, the one portion of each of the 2-1$^{st}$ and 2-2$^{nd}$ power lines PL21 and PL22 may branch from the second pad electrode.

The vibration generator 10 according to another example embodiment of the present disclosure may further include a signal cable 19.

The signal cable 19 may be electrically connected to the pad portion 17 disposed at the vibration generator 10 and may supply the vibration generator 10 with a vibration driving signal (or a sound signal or a voice signal) provided from a vibration driving circuit (or a sound processing circuit). The signal cable 19 according to an example embodiment of the present disclosure may include a first terminal electrically coupled to the first pad electrode of the pad portion 17 and a second terminal electrically coupled to the second pad electrode of the pad portion 17. For example, the signal cable 19 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

As described above, the vibration generator 10 according to another example embodiment of the present disclosure may have the same effect as the vibration generator 10 described above with reference to FIGS. 14 to 17D. In addition, the vibration generator 10 according to another example embodiment of the present disclosure may include the first and second vibration structures 11-1 and 11-2 which are arranged (or tiled) at a certain interval D1, so as to be implemented as one single vibration body without being independently driven, and thus, may be driven as a large-area vibration body based on a single-body vibration of the first and second vibration structures 11-1 and 11-2.

Figure 20:
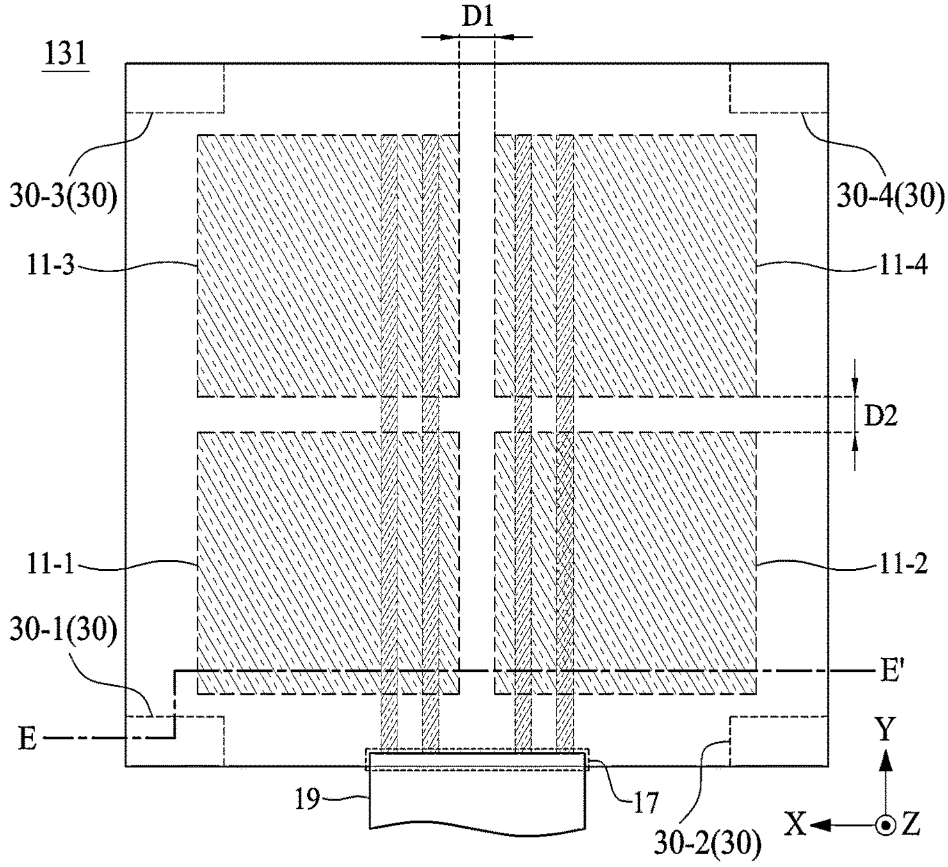
FIG. 20 illustrates a vibration apparatus according to another example embodiment of the present disclosure.

FIG. 20 illustrates a vibration apparatus according to another example embodiment of the present disclosure. FIG. 20 illustrates an example embodiment where four vibration structures are configured at the vibration generator illustrated in FIGS. 18 and 19. Hereinafter, therefore, the elements except four vibration structures and relevant elements may be referred to by like reference numerals, and the repetitive description thereof may be omitted or will be briefly given. A cross-sectional surface taken along line E-E' illustrated in FIG. 20 is illustrated in FIG. 19.

With reference to FIGS. 19 and 20, the vibration generator 10 according to another example embodiment of the present disclosure may include a plurality of vibration structures 11-1 to 11-4 or first to fourth vibration structures 11-1 to 11-4.

The plurality of vibration structures 11-1 to 11-4 may each be electrically disconnected and disposed spaced apart from one another in a first direction X and a second direction Y. For example, the plurality of vibration structures 11-1 to 11-4 may each be disposed or tiled in an i×j form on the same plane, and thus, the vibration generator 10 may be implemented to have a large area, based on tiling of the plurality of vibration structures 11-1 to 11-4 having a relatively small size. For example, i may be the number of the vibration structures disposed along the first direction X and may be a natural number of 2 or more, and j may be the number of the vibration structures disposed along the second direction Y and may be a natural number of 2 or more which is the same as or different from i. For example, the plurality of vibration structures 11-1 to 11-4 may be arranged or tiled in a 2×2 form, but embodiments of the present disclosure are not limited thereto. In the following description, an example where the vibration generator 10 includes the plurality of vibration structures 11-1 to 11-4 will be described.

According to an example embodiment of the present disclosure, the first and second vibration structures 11-1 and 11-2 may be spaced apart from each other along the first direction X. The third and fourth vibration structures 11-3 and 11-4 may be spaced apart from each other along the first direction X and may be spaced apart from each of the first and second vibration structures 11-1 and 11-2 along the second direction Y. The first and third vibration structures 11-1 and 11-3 may be spaced apart from each other along the second direction Y to face each other. The second and fourth vibration structures 11-2 and 11-4 may be spaced apart from each other along the second direction Y to face each other.

The vibration generator 10 according to another example embodiment of the present disclosure may further include a first protection member 13 and a second protection member 15.

The first to fourth vibration structures 11-1 to 11-4 may be disposed between the first protection member 13 and the second protection member 15. For example, each of the first protection member 13 and the second protection member 15 may be connected to the first to fourth vibration structures 11-1 to 11-4 in common or may support the first to fourth vibration structures 11-1 to 11-4 in common, and thus, may drive the first to fourth vibration structures 11-1 to 11-4 as one vibration apparatus (or a single vibration apparatus). For example, the first to fourth vibration structures 11-1 to 11-4 may be tiled in a certain interval by the protection members 13 and 15, and thus, may be driven as one vibration apparatus (or a single vibration apparatus).

According to an example embodiment of the present disclosure, as described above with reference to FIGS. 18 and 19, in order to a complete single body vibration or a large-area vibration, the first to fourth vibration structures 11-1 to 11-4 may be disposed (or tiled) at the separation distances (or the intervals D1 and D2) of 0.1 mm or more and less than 3 cm or may be disposed (or tiled) at the separation distances (or the intervals D1 and D2) of 0.1 mm or more and less than 5 mm in each of the first direction X and the second direction Y.

Each of the first to fourth vibration structures 11-1 to 11-4 may include a vibration portion 11*a*, a first electrode portion 11*b*, and a second electrode portion 11*c*.

The vibration portion 11*a* may include a ceramic-based material capable of realizing a relatively high vibration. For example, the vibration portion 11*a* may include a 1-3 composite structure having a piezoelectric characteristic of a 1-3 vibration mode or a 2-2 composite structure having a piezoelectric characteristic of a 2-2 vibration mode. For example, the vibration portion 11*a* may include the first portions 11*a*1 and the second portion 11*a*2 similar to the vibration portion 11*a* described above with reference to FIGS. 15 and 16, or to the vibration portion 11*a* described above with reference to any one of FIGS. 17A to 17D, and thus, like reference numerals refer to like elements, and their repetitive descriptions may be omitted for brevity.

According to an example embodiment of the present disclosure, the first to fourth vibration structures 11-1 to 11-4 may include any one vibration portion 11*a* among the vibration portion 11*a* described above with reference to FIGS. 15, 16, and 17A to 17D.

According to another example embodiment of the present disclosure, one or more of the first to fourth vibration structures 11-1 to 11-4 may include a different vibration portion 11*a* among the vibration portion 11*a* described above with reference to FIGS. 15, 16, and 17A to 17D.

The first electrode portion 11*b* may be disposed at a first surface of the corresponding vibration portion 11*a* and may be electrically coupled to the first surface of the vibration portion 11*a*. The first electrode portion 11*b* may be substantially the same as the first electrode portion 11*b* described above with reference to FIG. 15, and thus, like reference numerals may refer to like elements, and the repetitive description thereof may be omitted for brevity.

The second electrode portion 11*c* may be disposed at a second surface of the corresponding vibration portion 11*a* and electrically connected to the second surface of the vibration portion 11*a*. The second electrode portion 11*c* may be substantially the same as the second electrode portion 11*c* described above with reference to FIG. 15, and thus, like reference numerals may refer to like elements, and the repetitive description thereof may be omitted for brevity.

According to an example embodiment of the present disclosure, the first and second adhesive layers 12 and 14 may be connected or coupled to each other between the first to fourth vibration structures 11-1 to 11-4. Therefore, each of the first to fourth vibration structures 11-1 to 11-4 may be surrounded by the first and second adhesive layers 12 and 14. For example, the first and second adhesive layers 12 and 14 may be configured between the first protection member 13 and the second protection member 15 to completely surround the first to fourth vibration structures 11-1 to 11-4. For example, each of the first to fourth vibration structures 11-1 to 11-4 may be embedded or built-in between the first adhesive layer 12 and the second adhesive layer 14.

The vibration generator 10 according to another example embodiment of the present disclosure may further include a first power supply line PL1, a second power supply line PL2, and a pad portion 17.

Except for an electrical connection structure between the first and second power supply lines PL1 and PL2 and the first to fourth vibration structures 11-1 to 11-4, the first power supply line PL1 and the second power supply line PL2 may be substantially the same as each of the first power supply line PL1 and the second power supply line PL2 described above with reference to FIGS. 18 and 19, and thus, in the following description, only the electrical connection structure between the first and second power supply lines PL1 and PL2 and the first to fourth vibration structures 11-1 to 11-4 will be briefly described below.

The first power supply line PL1 according to an example embodiment of the present disclosure may include 1-1$^{st}$ and 1-2$^{nd}$ power lines PL11 and PL12 disposed along a second direction Y. For example, the 1-1$^{st}$ power line PL11 may be electrically coupled to the first electrode portion 11*b* of each of the first and third vibration structures 11-1 and 11-3 (or a first group or a first vibration structure group) arranged at a first column parallel to the second direction Y among the first to fourth vibration structures 11-1 to 11-4. The 1-2$^{nd}$ power line PL12 may be electrically coupled to the first electrode portion 11*b* of each of the second and fourth vibration structures 11-2 and 11-4 (or a second group or a second vibration structure group) arranged at a second column parallel to the second direction Y among the first to fourth vibration structures 11-1 to 11-4.

The second power supply line PL2 according to an example embodiment of the present disclosure may include 2-1$^{st}$ and 2-2$^{nd}$ power lines PL21 and PL22 disposed along a second direction Y. For example, the 2-1$^{st}$ power line PL21 may be electrically coupled to the second electrode portion 11*c* of each of the first and third vibration structures 11-1 and 11-3 (or the first group or the first vibration structure group) arranged at the first column parallel to the second direction Y among the first to fourth vibration structures 11-1 to 11-4. The 2-2$^{nd}$ power line PL22 may be electrically coupled to the second electrode portion 11*c* of each of the second and fourth vibration structures 11-2 and 11-4 (or the second group or the second vibration structure group) arranged at the second column parallel to the second direction Y among the first to fourth vibration structures 11-1 to 11-4.

The pad portion 17 may be configured at one periphery portion of any one among the first protection member 13 and the second protection member 15 so as to be electrically connected to one side (or one end) of each of the first and second power supply lines PL1 and PL2. The pad portion 17 may be substantially the same as the pad portion 17 illustrated in FIGS. 18 and 19, and thus, like reference numerals may refer to like elements, and the repetitive description thereof may be omitted for brevity.

As described above, the vibration generator 10 according to another example embodiment of the present disclosure may have the same effect as the vibration generator 10 described above with reference to FIGS. 14 to 17D. In addition, the vibration generator 10 according to another example embodiment of the present disclosure may include the first to fourth vibration structures 11-1 to 11-4 which are arranged (or tiled) at the separation distances (or the intervals D1 and D2), so as to be implemented as one single vibration body without being independently driven, and thus, may be driven as a large-area vibration body based on a single-body vibration of the first to fourth vibration structures 11-1 to 11-4.

Figure 21:
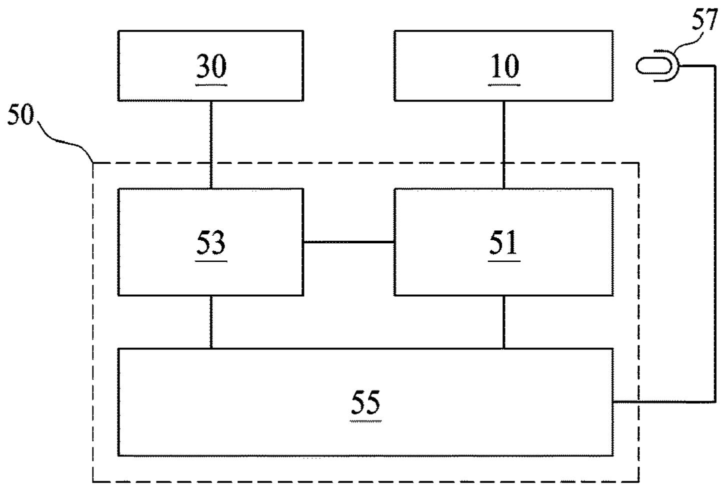
FIG. 21 is a block diagram illustrating a vibration driving circuit of a vibration apparatus according to an example embodiment of the present disclosure.

FIG. 21 is a block diagram illustrating a vibration driving circuit of a vibration apparatus according to an example embodiment of the present disclosure.

With reference to FIG. 21, the vibration apparatus according to an example embodiment of the present disclosure may further include a vibration driving circuit 50.

The vibration driving circuit 50 may be electrically coupled to each of a vibration generator 10 and a sensor portion 30. For example, the vibration driving circuit 50 may be electrically coupled to each of the vibration generator 10 and the sensor portion 30 through a signal cable. For example, each of the vibration generator 10 and the sensor portion 30 may be respectively and substantially the same as the vibration generator 10 and the sensor portion 30 described above with reference to FIGS. 1 to 20, and thus, like reference numerals may refer to like elements, and their repetitive descriptions may be omitted for brevity.

The vibration driving circuit 50 may supply a vibration driving signal to the vibration generator 10, generate sensing data by sensing an electrical characteristic change of the sensor portion 30, and correct the vibration driving signal suppled to the vibration generator 10 based on the sensing data.

The vibration driving circuit 50 (or a sound processing circuit) according to an example embodiment of the present disclosure may include a signal generating circuit portion 51, a sensing circuit portion 53, and a control circuit portion 55.

The signal generating circuit portion 51 may convert vibration data (or sound data), supplied from the control circuit portion 55, into the vibration driving signal (or the sound signal) and may supply the vibration driving signal to the vibration generator 10.

The signal generating circuit portion 51 according to an example embodiment of the present disclosure may include a digital-to-analog conversion circuit, which converts the vibration data, supplied from the control circuit portion 55, into analog vibration data, and an amplifier circuit including one or more operational amplifiers which amplify the analog vibration data to generate the vibration driving signal. For example, the amplifier circuit may amplify analog sound data based on a gain value set in the one or more operational amplifiers to generate the vibration driving signal. For example, the gain value may be a parameter for setting or varying a reference voltage supplied to the one or more operational amplifiers.

According to an example embodiment of the present disclosure, the vibration driving signal may include a first vibration driving signal and a second vibration driving signal. For example, the first vibration driving signal may be any one of a positive (+) vibration driving signal and a negative (−) vibration driving signal, and the second vibration driving signal may be any one of a positive (+) vibration driving signal and a negative (−) vibration driving signal.

The sensing circuit portion 53 may generate the sensing data by sensing an electrical characteristic change of the sensor portion 30.

The sensing circuit portion 53 according to an example embodiment of the present disclosure may generate the sensing data by sensing an electrical characteristic change of the sensor portion 30 by a bridge circuit electrically coupled to the sensor portion 30. For example, in the sensing circuit portion 53, the bridge circuit electrically coupled to the sensor portion 30 may be a quarter-bridge circuit, a half-bridge circuit, or a full-bridge circuit, but embodiments of the present disclosure are not limited thereto.

The control circuit portion 55 may generate vibration data based on a sound source supplied from a host system and may provide the vibration data to the signal generating circuit portion 51. For example, the control circuit portion 55 may generate vibration data of one or more channels based on the sound source and may provide the vibration data to the signal generating circuit portion 51.

The control circuit portion 55 according to an example embodiment of the present disclosure may set or vary a gain value of the amplifier circuit which outputs the vibration driving signal, based on the sensing data supplied from the sensing circuit portion 53, and thus, may compensate for a characteristic change of the vibration generator 10 based on a temperature and/or humidity, or the like or may compensate for a sound characteristic and/or a sound pressure level characteristic of the vibration generator 10 based on a vibration of the vibration generator 10.

The control circuit portion 55 according to an example embodiment of the present disclosure may calculate a frequency component of the sound from the sound source by a fast Fourier transform (FFT) algorithm and may correct (or modulate) a phase and/or an amplitude of the frequency component of the sound source based on the sensing data supplied from the sensing circuit portion 53, and thus, may generate vibration data where an electrical characteristic change of the sensor portion 30 has been corrected. For example, the control circuit portion 55 may shift or invert a phase of the frequency component of the sound source based on the sensing data, and thus, may change (or enhance) a vibration characteristic of the vibration generator 10 or may correct (or compensate for) a characteristic change of the vibration generator 10 based on an electrical characteristic change of the sensor portion 30.

According to an example embodiment of the present disclosure, the control circuit portion 55 may compensate for or correct a characteristic change of the vibration generator 10 based on an electrical characteristic change of the sensor portion 30.

The control circuit portion 55 according to an example embodiment of the present disclosure may filter the frequency component of the sound source to calculate a frequency component of a high-pitched sound band and a frequency component of a low-pitched sound band and may synthesize the frequency component of the high-pitched sound band and the frequency component of the low-pitched sound band to generate the vibration data. For example, one or more of the frequency component of the high-pitched sound band and the frequency component of the low-pitched sound band included in the vibration data may have an anti-phase and a corresponding frequency component filtered from the frequency component of the sound source. Accordingly, the vibration generator 10 may vibrate in one or more of a low-pitched sound band vibration mode and a high-pitched sound band vibration mode based on the vibration driving signal corresponding to the vibration data.

The vibration driving circuit 50 (or the sound processing circuit) according to an example embodiment of the present disclosure may further include a sound receiver 57.

The sound receiver 57 may be disposed near the vibration generator 10. For example, the sound receiver 57 may overlap at least a portion of the vibration generator 10. The sound receiver 57 may collect a sound generated based on a vibration of the vibration generator 10 to generate a sound collection signal.

In connection with an example embodiment of the present disclosure, the control circuit portion 55 may correct the vibration data or may vary the gain value of the amplifier circuit, based on a frequency characteristic of the sound collection signal supplied from the sound receiver 57. Accordingly, the control circuit portion 55 may correct in real time a frequency characteristic and/or a sound pressure level characteristic of a sound generated based on a vibration of the vibration generator 10.

With respect to another example embodiment of the present disclosure, the control circuit portion 55 may correct the vibration data or may vary the gain value of the amplifier circuit, based on a frequency characteristic of the sound collection signal supplied from the sound receiver 57 and the sensing data supplied from the sensing circuit portion 53. Accordingly, the control circuit portion 55 may correct a characteristic change of the vibration generator 10 based on a temperature and/or humidity, or the like and may correct in real time a frequency characteristic and/or a sound pressure level characteristic of a sound generated based on a vibration of the vibration generator 10.

According to an example embodiment of the present disclosure, as described above with reference to FIG. 8, 14, 18, or 20, when the sensor portion 30 includes a plurality of sensors, the control circuit portion 55 may set or vary the gain value of the amplifier circuit based on an average value or the largest value of sensor-based sensing data sensed by each of the plurality of sensors, but embodiments of the present disclosure are not limited thereto.

According to another example embodiment of the present disclosure, as described above with reference to FIG. 18 or 20, when the vibration generator 10 includes a plurality of vibration structures and the sensor portion 30 includes a plurality of sensors, the control circuit portion 55 may group one or more sensors configured near each of the plurality of vibration structures and may set or vary the gain value of the amplifier circuit which supplies the vibration driving signal to each of the plurality of vibration structures, based on an average value or a largest value of group-based sensing data, but embodiments of the present disclosure are not limited thereto.

Figure 22:
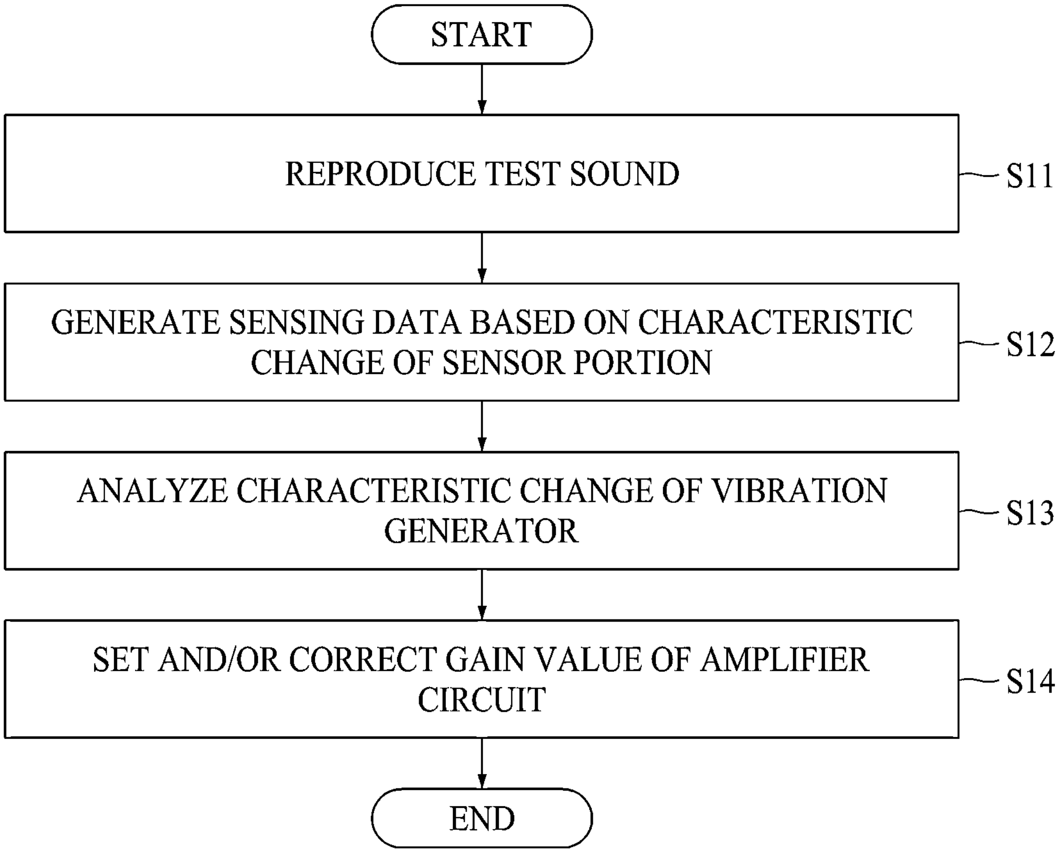
FIG. 22 is a flowchart illustrating a driving method of a vibration apparatus according to an example embodiment of the present disclosure.

FIG. 22 is a flowchart illustrating a driving method of a vibration apparatus according to an example embodiment of the present disclosure. FIG. 22 illustrates an initial compensation process performed on a vibration characteristic change of a vibration generator, in the vibration apparatus according to an example embodiment of the present disclosure.

An initial compensation process performed on a vibration characteristic change of a vibration generator in a vibration apparatus according to an example embodiment of the present disclosure will be described below with reference to FIG. 22 in conjunction with FIG. 21.

First, the vibration driving circuit 50 may generate test vibration data corresponding to a test sound source supplied from the host system or may autonomously generate the test vibration data and may vibrate the vibration generator 10 based on a vibration driving signal corresponding to the test vibration data to reproduce a test vibration or a test sound (step S11).

Subsequently, the sensing circuit portion 53 may sense an electrical characteristic change of the sensor portion 30 based on a vibration of the vibration generator 10 to generate sensing data (step S12).

Subsequently, according to an example embodiment of the present disclosure, the control circuit portion 55 may analyze a vibration characteristic change of the vibration generator 10 based on the sensing data (step S13). For example, the control circuit portion 55 may analyze the sensing data using the FFT algorithm to calculate an electrical characteristic change of the sensor portion 30 and may analyze a vibration characteristic of the vibration generator 10 is changed, based on the calculated electrical characteristic change of the sensor portion 30. For example, an electrical change of the sensor portion 30 may be changed by a temperature and/or humidity, or the like near the vibration apparatus, or may be changed by a temperature and/or humidity, or the like, of the vibration generator 10. Accordingly, a vibration characteristic change of the vibration generator 10 caused by a temperature and/or humidity, or the like may be calculated, determined or predicted from an electrical characteristic change of the sensor portion 30 through an analysis of the sensing data.

According to another example embodiment of the present disclosure, the control circuit portion 55 may additionally reflect a frequency characteristic of a sound collection signal supplied from the sound receiver 57 to analyze or determine whether a vibration characteristic of the vibration generator 10 is changed.

Subsequently, the control circuit portion 55 may set or correct a gain value of the amplifier circuit for compensating for a vibration characteristic change of the vibration generator 10, based on a vibration characteristic change of the vibration generator 10 (step S14). For example, the control circuit portion 55 may compare a reference vibration characteristic of the vibration generator 10, stored in a storage circuit, with a vibration characteristic change of the vibration generator 10 calculated through the analysis of the sensing data, and thus, may set or correct the gain value of the amplifier circuit for compensating for a vibration characteristic change of the vibration generator 10. For example, the reference vibration characteristic of the vibration generator 10 may be a vibration characteristic of the vibration generator 10 calculated in a peripheral environment such as a normal temperature and/or humidity, or the like, but embodiments of the present disclosure are not limited thereto. For example, the set or corrected gain value may be stored in the storage circuit.

Accordingly, the driving method of the vibration apparatus according to an example embodiment of the present disclosure may sense an electrical characteristic change of the sensor portion 30 to generate sensing data and may set or correct the gain value of the amplifier circuit which outputs the vibration driving signal, based on the sensing data, and thus, may compensate for a vibration characteristic change of the vibration generator 10.

Figure 23:
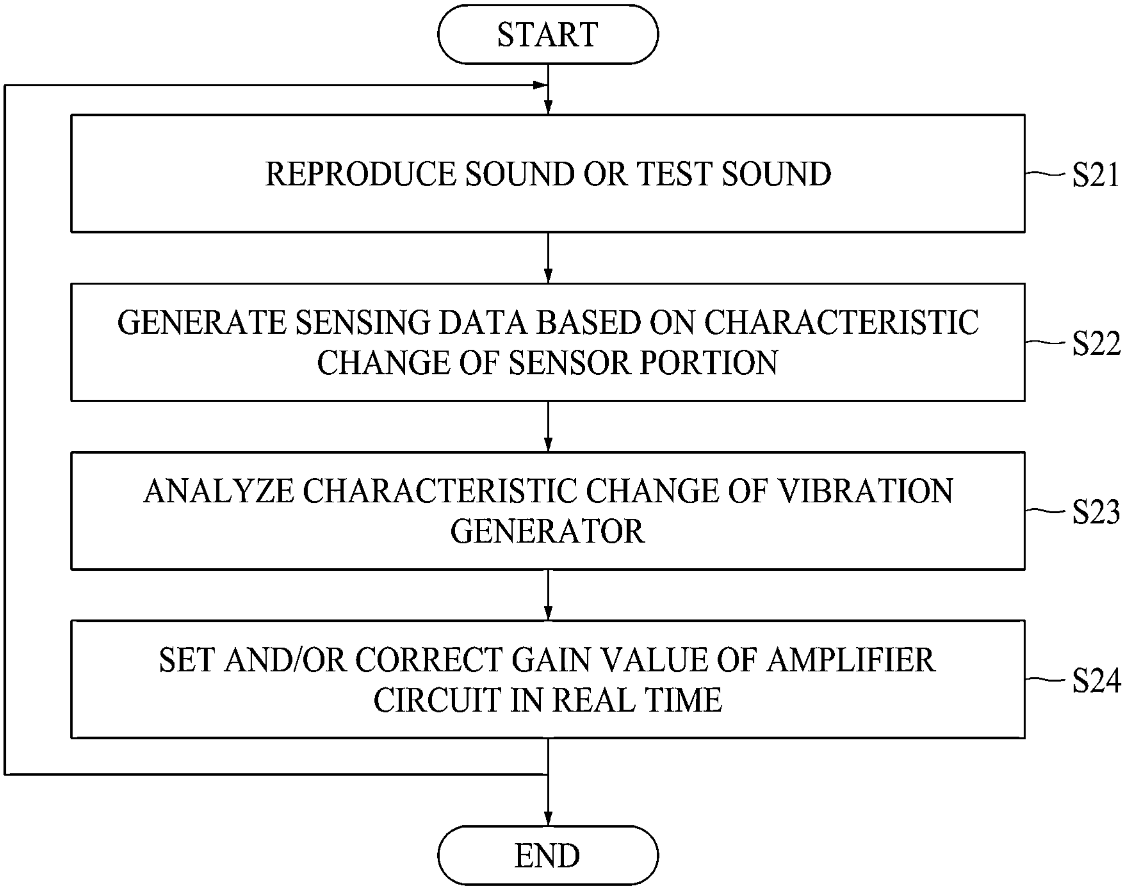
FIG. 23 is a flowchart illustrating a driving method of a vibration apparatus according to another example embodiment of the present disclosure.

FIG. 23 is a flowchart illustrating a driving method of a vibration apparatus according to another example embodiment of the present disclosure. FIG. 23 illustrates a real-time compensation process performed on a vibration characteristic change of a vibration generator, in the vibration apparatus according to another example embodiment of the present disclosure.

A real-time compensation process performed on a vibration characteristic change of a vibration generator in a vibration apparatus according to an example embodiment of the present disclosure will be described below with reference to FIG. 23 in conjunction with FIG. 21.

First, the vibration driving circuit 50 may generate vibration data corresponding to a sound source supplied from the host system and may vibrate the vibration generator 10 based on a vibration driving signal corresponding to the vibration data, thereby reproducing a sound corresponding to the sound source. In addition, the vibration driving circuit 50 may generate test vibration data corresponding to a test sound source supplied from the host system or may autonomously generate the test vibration data and may vibrate the vibration generator 10 based on a test vibration driving signal corresponding to the test vibration data to reproduce a test sound corresponding to the test sound source (step S21). For example, the test sound may be reproduced along with a sound corresponding to the sound source, but embodiments of the present disclosure are not limited thereto. For example, the test sound may have a high frequency or an inaudible frequency, but embodiments of the present disclosure are not limited thereto.

Subsequently, the sensing circuit portion 53 may sense an electrical characteristic change of the sensor portion 30 based on a vibration of the vibration generator 10 to generate sensing data (step S22).

Subsequently, according to an example embodiment of the present disclosure, the control circuit portion 55 may analyze a vibration characteristic change of the vibration generator 10 based on the sensing data (step S23). For example, the control circuit portion 55 may analyze the sensing data using the FFT algorithm to calculate an electrical characteristic change of the sensor portion 30 and may analyze whether a vibration characteristic of the vibration generator 10 is changed, based on the calculated electrical characteristic change of the sensor portion 30. For example, an electrical change of the sensor portion 30 may be changed by a temperature and/or humidity, or the like near the vibration apparatus, or may be changed by a temperature and/or humidity, or the like, of the vibration generator 10. Accordingly, a vibration characteristic change of the vibration generator 10 caused by a temperature and/or humidity, or the like may be calculated, determined or predicted from an electrical characteristic change of the sensor portion 30 through an analysis of the sensing data.

According to another example embodiment of the present disclosure, the control circuit portion 55 may additionally reflect a frequency characteristic of a sound collection signal supplied from the sound receiver 57 to analyze or determine whether a vibration characteristic of the vibration generator 10 is changed.

Subsequently, the control circuit portion 55 may set or correct a gain value of the amplifier circuit for compensating for a vibration characteristic change of the vibration generator 10, based on a vibration characteristic change of the vibration generator 10 (step S24). For example, the control circuit portion 55 may compare a reference vibration characteristic of the vibration generator 10, stored in a storage circuit, with a vibration characteristic change of the vibration generator 10 calculated through the analysis of the sensing data, and thus, may correct the gain value of the amplifier circuit for compensating for a vibration characteristic change of the vibration generator 10.

Subsequently, the vibration driving circuit 50 may end the reproduction of a sound based on the end or not of the sound based on the supply or not of the sound source supplied from the host system or may repeat steps S21 to S24 described above, and thus, may correct a vibration characteristic change of the vibration generator 10 in real time.

Accordingly, the driving method of the vibration apparatus according to an example embodiment of the present disclosure may sense an electrical characteristic change of the sensor portion 30 to generate sensing data in real time and may set or correct in real time the gain value of the amplifier circuit which outputs the vibration driving signal, based on the sensing data, and thus, may compensate for a vibration characteristic change of the vibration generator 10 in real time.

Figure 24:
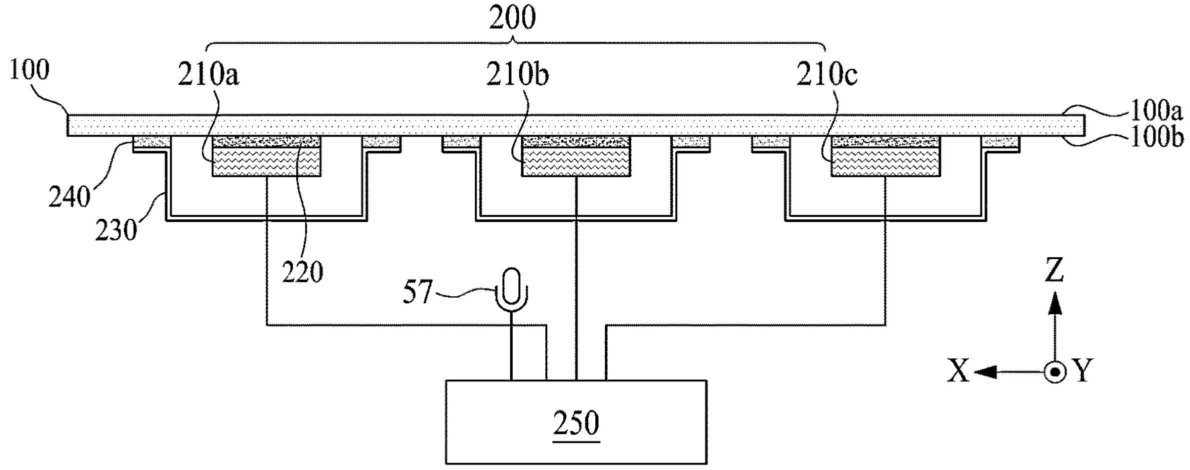
FIG. 24 illustrates an apparatus according to an example embodiment of the present disclosure.
Figure 25:
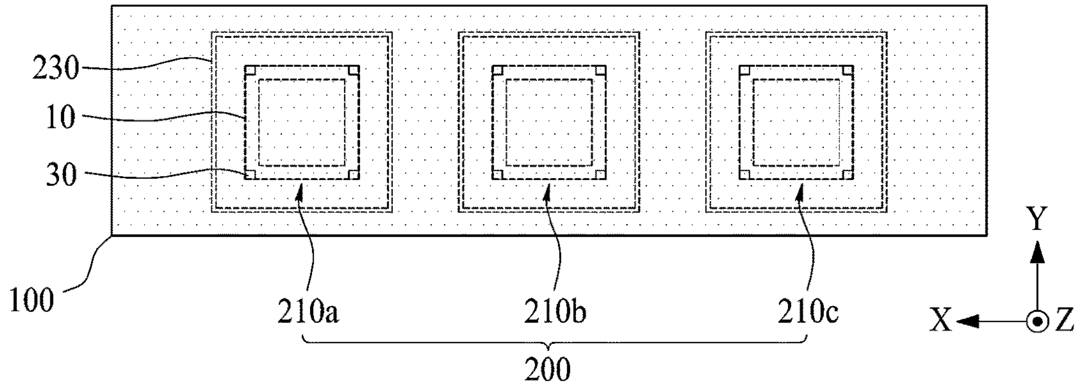
FIG. 25 is an example of a plan view of the apparatus illustrated in FIG. 24.

FIG. 24 illustrates an apparatus according to an example embodiment of the present disclosure. FIG. 25 is an example of a plan view of the apparatus illustrated in FIG. 24. FIGS. 24 and 25 illustrate an apparatus including the vibration apparatus described above with reference to FIGS. 1 to 20.

With reference to FIGS. 24 and 25, an apparatus according to an example embodiment of the present disclosure may be utilized to implement a sound apparatus, a sound output apparatus, a sound bar, a sound system, a sound apparatus for vehicular apparatuses, a sound output apparatus for vehicular apparatuses, or a sound bar for vehicular apparatuses, or the like. For example, the vehicular apparatus may include one or more seats and one or more glass windows. For example, the vehicular apparatus may include a vehicle, a train, a ship, or an aircraft, but embodiments of the present disclosure are not limited thereto. In addition, the apparatus according to an example embodiment of the present disclosure may implement an analog signage or a digital signage, or the like such as an advertising signboard, a poster, or a noticeboard, or the like.

The apparatus according to an example embodiment of the present disclosure may include a vibration member 100 and a vibration generating apparatus 200.

The vibration member 100 may be implemented to output a sound and/or a vibration based on a vibration of the vibration generating apparatus 200. Accordingly, the vibration member 100 may be a vibration object, a vibration plate, a vibration panel, a sound plate, a sound output member, a sound panel, a sound output panel, a passive vibration member, a forward member, or a front member, but embodiments of the present disclosure are not limited thereto.

The vibration member 100 according to an example embodiment of the present disclosure may include a first surface (or a front surface) 100*a* and a second surface (or a rear surface) 100*b* which differs from (or opposite to) the first surface 100*a*. One or more of the first surface 100*a* and the second surface 100*b* may include a nonplanar structure.

According to an example embodiment of the present disclosure, the vibration member 100 may include a display panel having a pixel to display an image. The display panel may include a flat display panel, a curved display panel, or a flexible display panel, or the like, but embodiments of the present disclosure are not limited thereto. For example, the display panel may include a liquid crystal display panel, an organic light emitting display panel, a quantum dot light emitting display panel, a micro light emitting diode display panel, or an electrophoresis display panel, or the like, but embodiments of the present disclosure are not limited thereto. For example, the display panel may include a touch panel or a touch electrode layer for sensing a user's touch.

According to another example embodiment of the present disclosure, the vibration member 100 may include a non-display panel without pixels for displaying an image. For example, the non-display panel may include a screen panel on which an image is projected from a display apparatus, a lighting panel, or a signage panel, or the like, but embodiments of the present disclosure are not limited thereto.

The lighting panel according to an example embodiment of the present disclosure may include a light emitting diode lighting panel (or apparatus), an organic light emitting lighting panel (or apparatus), or an inorganic light emitting lighting panel (or apparatus), or the like, but embodiments of the present disclosure are not limited thereto.

The signage panel according to an example embodiment of the present disclosure may include an analog signage or the like such as an advertising signboard, a poster, or a noticeboard, or the like, but embodiments of the present disclosure are not limited thereto. For example, when vibration member 100 implements or includes the signage panel, the analog signage may include signage content such as a sentence, a picture, and a sign, or the like. The signage content may be disposed at the vibration member 100 to be visible. For example, the signage content may be directly attached on one or more of a first surface 100*a* and a second surface 100*b* of the vibration member 100. For example, the signage content may be printed on a medium such as paper, and the medium with the signage content printed thereon may be directly attached on one or more of the first surface 100*a* and the second surface 100*b* of the vibration member 100. For example, when the signage content is attached on the second surface 100*b* of the vibration member 100, the vibration member 100 may be configured with (or may include) a transparent material.

According to another example embodiment of the present disclosure, the vibration member 100 may have a plate shape or a curved shape. For example, the vibration member 100 may include a plate having a plate shape or a curved shape. For example, the plate of the vibration member 100 may be configured to be transparent, translucent, or opaque. For example, the plate of the vibration member 100 may include a metal material or a nonmetal material (or a composite nonmetal material) having a material characteristic suitable for outputting a sound based on a vibration. In connection with an example embodiment of the present disclosure, the metal material of the plate of the vibration member 100 may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or a composite nonmetal material) of the plate of the vibration member 100 may include one or more of glass, plastic, foamed plastic, porous plastic, fiber, porous fiber, leather, porous leather, wood, porous wood, cloth, and paper, but embodiments of the present disclosure are not limited thereto. For example, the paper may be conge for speakers. For example, the conge may be pulp, foamed plastic, porous plastic, or the like, but embodiments of the present disclosure are not limited thereto.

The vibration member 100 according to another example embodiment of the present disclosure may include one or more among a vehicular interior material, a vehicular glass window, a vehicular exterior material, a vehicular seat interior material, a building ceiling material, a building interior material, a building glass window, an aircraft interior material, an aircraft glass window, and a mirror, but embodiments of the present disclosure are not limited thereto.

The vibration generating apparatus 200 may be configured to vibrate (or displace) the vibration member 100. The vibration generating apparatus 200 may include one or more vibration devices 210*a*, 210*c*, and 210*c*. The vibration generating apparatus 200 may include a plurality of vibration devices 210*a*, 210*c*, and 210*c* which are arranged at a certain interval along one or more direction of a first direction X and a second direction Y.

The plurality of vibration devices 210*a*, 210*c*, and 210*c* may each include a vibration generator 10 and a sensor portion 30. The vibration generator 10 and the sensor portion 30 which are configured in each of the plurality of vibration devices 210*a*, 210*c*, and 210*c* may each be substantially the same as the vibration generator 10 and the sensor portion 30 described above with reference to FIGS. 1 to 20, and thus, like reference numerals refer to like elements, and their repetitive descriptions may be omitted for brevity.

Each of the plurality of vibration devices 210*a*, 210*c*, and 210*c* may be connected or coupled to a second surface 100*b* of the vibration member 100 by a connection member 220. For example, the second surface 100*b* of the vibration member 100 may be connected or coupled to any one of a first protection member and a second protection member of each of the plurality of vibration devices 210*a*, 210*c*, and 210*c* by the connection member 220. Accordingly, each of the plurality of vibration devices 210*a*, 210*b*, and 210*c* may be supported by or hung on the second surface 100*b* of the vibration member 100.

The connection member 220 according to an example embodiment of the present disclosure may include an adhesive layer (or a tacky layer) which is good in adhesive force or attaching force. For example, the connection member 220 may include a double-sided adhesive tape, a double-sided foam pad, or a tacky sheet. For example, when the connection member 220 includes a tacky sheet (or a tacky layer), the connection member 220 may include only an adhesive layer or a tacky layer without a base member such as a plastic material or the like.

The adhesive layer (or a tacky layer) of the connection member 220 according to an example embodiment of the present disclosure may include an epoxy-based polymer, an acrylic-based polymer, a silicone-based polymer, or a urethane-based polymer, but embodiments of the present disclosure are limited thereto.

The adhesive layer (or a tacky layer) of the connection member 220 according to another example embodiment of the present disclosure may include a pressure sensitive adhesive (PSA), an optically clear adhesive (OCA), or an optically clear resin (OCR), but embodiments of the present disclosure are limited thereto.

The apparatus according to an example embodiment of the present disclosure may further include an enclosure 230.

The enclosure 230 may be coupled to the vibration member 100 to cover or surround the vibration generating apparatus 200. The enclosure 230 may be coupled to the second surface 100*b* of the vibration member 100 by an adhesive member 240 to cover the vibration generating apparatus 200 in the second surface 100*b* of the vibration member 100.

The enclosure 230 according to an example embodiment of the present disclosure may be coupled to the second surface 100*b* of the vibration member 100 by the adhesive member 240 to individually cover each of the plurality of vibration devices 210*a*, 210*b*, and 210*c*. For example, the enclosure 230 may maintain an impedance component based on air acting on the vibration member 100 when vibration member 100 vibrates. For example, air around the vibration member 100 may resist a vibration of the vibration member 100 and may act as an impedance component having a reactance component and a resistance based on a frequency. Therefore, the enclosure 230 may configure or provide a closed space which surrounds each of the plurality of vibration devices 210*a*, 210*b*, and 210*c* configured in the second surface 100*b* of the vibration member 100, and thus, may maintain an impedance component (or an air impedance or an elastic impedance) acting on the vibration member 100 based on air, thereby enhancing a sound characteristic and/or a sound pressure level characteristic of the low-pitched sound band and enhancing the quality of a sound of a high-pitched sound band. For example, the low-pitched sound band may be 500 Hz or less, but embodiments of the present disclosure are not limited thereto. The high-pitched sound band may be 1 kHz or more, or 3 kHz or more, but embodiments of the present disclosure are not limited thereto.

In FIG. 24, the enclosure 230 is illustrated as having a closed structure, but embodiments of the present disclosure are not limited thereto, and the enclosure 230 may be configured to be a bass-reflex or an open-baffle structure.

The apparatus according to an example embodiment of the present disclosure may further include a vibration driving circuit 250.

The vibration driving circuit 250 may be electrically coupled to each of the vibration generator 10 and the sensor portion 30 configured at each of the plurality of vibration devices 210*a*, 210*b*, and 210*c*. For example, the vibration driving circuit 250 may be electrically coupled to each of the vibration generator 10 and the sensor portion 30 through a signal cable.

The vibration driving circuit 250 according to an example embodiment of the present disclosure may supply the vibration driving signal to the vibration generator 10 configured at (or included in) each of the plurality of vibration devices 210*a*, 210*b*, and 210*c*, sense an electrical characteristic change of the sensor portion 30 configured at (or included in) each of the plurality of vibration devices 210*a*, 210*b*, and 210*c* to generate device-based sensing data, and correct or generate the vibration driving signal supplied to the vibration generator 10 provided at (or included in) each of the plurality of vibration devices 210*a*, 210*b*, and 210*c* based on the device-based sensing data. In addition, the vibration driving circuit 250 may correct or generate the vibration driving signal supplied to the vibration generator 10 provided in each of the plurality of vibration devices 210*a*, 210*b*, and 210*c* based on a frequency characteristic of a sound collection signal supplied from the sound receiver 57 and the device-based sensing data. For example, except that the vibration driving circuit 250 is coupled to the plurality of vibration devices 210*a*, 210*b*, and 210*c*, the vibration driving circuit 250 may be substantially the same as the vibration driving circuit 50 illustrated in FIG. 21, and thus, repeated descriptions thereof are omitted for brevity. The vibration driving circuit 250 may correct a vibration characteristic change of the vibration generator 10 of each of the plurality of vibration devices 210*a*, 210*b*, and 210*c*, based on substantially the same method as the driving method of the vibration driving circuit 50 described above with reference to FIG. 22 or 23, and thus, the repetitive description thereof may be omitted or will be briefly given below.

According to an example embodiment of the present disclosure, the vibration driving circuit 250 may be configured to generate or correct a device-based vibration driving signal based on the device-based sensing data of each of the plurality of vibration devices 210*a*, 210*b*, and 210*c*. Accordingly, in describing an embodiment of the present disclosure, it may be construed that a vibration driving signal or a device-based vibration driving signal described below is generated or corrected based on device-based sensing data.

The vibration driving circuit 250 according to an example embodiment of the present disclosure may supply the same vibration driving signal to each of the plurality of vibration devices 210*a*, 210*b*, and 210*c*, or may supply different vibration driving signals to one or more of the plurality of vibration devices 210*a*, 210*b*, and 210*c*. Accordingly, the plurality of vibration devices 210*a*, 210*b*, and 210*c* may identically or differently vibrate based on the same vibration driving signal or different vibration driving signals.

In connection with an example embodiment of the present disclosure, the vibration driving circuit 250 may generate device-based vibration data of each of the plurality of vibration devices 210*a*, 210*b*, and 210*c* from a sound source, generate a device-based vibration driving signal corresponding to the device-based vibration data, and supply the device-based vibration driving signal to each of the plurality of vibration devices 210*a*, 210*b*, and 210*c*. For example, the device-based vibration driving signal may be a synthesis signal of a low-pitched sound band vibration driving signal and a high-pitched sound band vibration driving signal generated from the sound source. For example, the device-based vibration driving signal may be a synthesis signal of the low-pitched sound band vibration driving signal and a phase-inverted high-pitched sound band vibration driving signal generated from the sound source. Accordingly, each of the plurality of vibration devices 210_a_, 210_b_, and 210_c_ may vibrate in one or more vibration modes of a low-pitched sound band vibration mode and a pitched sound band vibration mode.

In connection with an example embodiment of the present disclosure, the vibration driving circuit 250 may supply the same vibration driving signal of a pitched sound band to each of the plurality of vibration devices 210_a_, 210_b_, and 210_c_, or may supply vibration driving signals of different pitched sound bands to one or more of the plurality of vibration devices 210_a_, 210_b_, and 210_c_. For example, the vibration driving circuit 250 may supply a sound separation vibration driving signal to any one of the plurality of vibration devices 210_a_, 210_b_, and 210_c_. For example, the sound separation vibration driving signal may have a phase which differs from a vibration driving signal supplied to an adjacent vibration device, or may have an anti-phase of the vibration driving signal supplied to an adjacent vibration device. Accordingly, sound interference occurring based on a vibration of each of the plurality of vibration devices 210_a_, 210_b_, and 210_c_ may be minimized or prevented.

According to another example embodiment of the present disclosure, the vibration driving circuit 250 may separate a plurality of vibration channels among the plurality of vibration devices 210_a_, 210_b_, and 210_c_ and may supply the same vibration driving signal or different vibration driving signals to vibration devices 210_a_, 210_b_, and 210_c_ of each of the plurality of vibration channels. For example, the vibration driving circuit 250 may supply the same vibration driving signal of a pitched sound band to the vibration devices 210_a_, 210_b_, and 210_c_ of each of the plurality of vibration channels, or may supply vibration driving signals of different pitched sound bands to vibration devices 210_a_, 210_b_, and 210_c_ of two or more channels of the plurality of vibration channels. For example, the vibration driving circuit 250 may supply the sound separation vibration driving signal to vibration devices 210_a_, 210_b_, and 210_c_ of a vibration channel between two adjacent vibration channels among the plurality of vibration channels. Accordingly, an apparatus according to an example embodiment of the present disclosure may provide a user with a sound including a stereo sound, sounds of two or more channels, or a surround sound.

The vibration driving circuit 250 according to an example embodiment of the present disclosure may match a phase of a vibration driving signal supplied to each of the plurality of vibration devices 210_a_, 210_b_, and 210_c_, and thus, may minimize a dip phenomenon and a peak phenomenon of a sound frequency generated based on a vibration of the vibration member 100, thereby enhancing the flatness of a sound. Accordingly, the apparatus according to an example embodiment of the present disclosure may provide a user with a sense of sound field which is the same as a real sound.

The vibration driving circuit 250 according to another example embodiment of the present disclosure may identically correct or shift a phase of a vibration driving signal supplied to each of the plurality of vibration devices 210_a_, 210_b_, and 210_c_ based on device-based low-pitched sound band sensing data sensed through the sensor portion 30 of each of the plurality of vibration devices 210_a_, 210_b_, and 210_c_ with respect to a test sound of a low-pitched sound band, and thus, may enhance a sound characteristic and/or a sound pressure level characteristic of the low-pitched sound band generated based on a vibration of the vibration member 100.

The vibration driving circuit 250 according to another example embodiment of the present disclosure may match a vibration driving signal, supplied to each of the plurality of vibration devices 210_a_, 210_b_, and 210_c_, with a specific frequency band, and thus, may enhance a sound characteristic and/or a sound pressure level characteristic of the specific frequency band generated based on a vibration of the vibration member 100.

The vibration driving circuit 250 according to another example embodiment of the present disclosure may finely adjust or shift a phase of a vibration driving signal supplied to each of the plurality of vibration devices 210_a_, 210_b_, and 210_c_, and thus, a sound generated based on a vibration of the vibration member 100 may concentrate in a specific direction. For example, with respect to a phase of a vibration driving signal supplied to the vibration device 210_b_ provided at a center portion of the vibration member 100, the vibration driving circuit 250 may finely adjust or shift a phase of a vibration driving signal supplied to each of the vibration devices 210_a_ and 210_c_ provided at an edge portion of the vibration member 100.

As described above, the apparatus according to an example embodiment of the present disclosure may vibrate the vibration member 100 by the plurality of vibration devices 210_a_, 210_b_, and 210_c_ to output a sound, provide a user with a sound including a surround sound or sounds of two or more channels, and provide the user with a sense of sound field which is the same as a real sound. In addition, the apparatus according to an example embodiment of the present disclosure may correct or compensate for an electrical characteristic change of the vibration generator 10 caused by a temperature and/or humidity, or the like based on sensing data obtained through the sensor portion provided in each of the plurality of vibration devices 210_a_, 210_b_, and 210_c_, correct or compensate for a vibration characteristic of the vibration generator 10, and detect a physical change, such as damage or breakdown, or the like, of the vibration generator 10.

Figure 26:
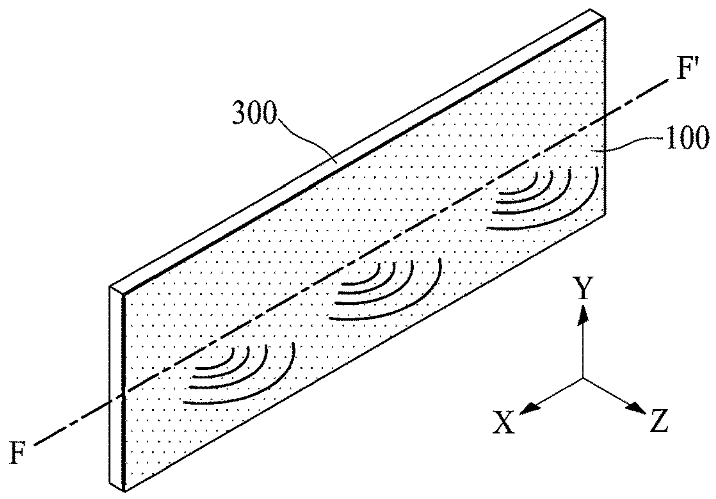
FIG. 26 illustrates an apparatus according to another example embodiment of the present disclosure.
Figure 27:
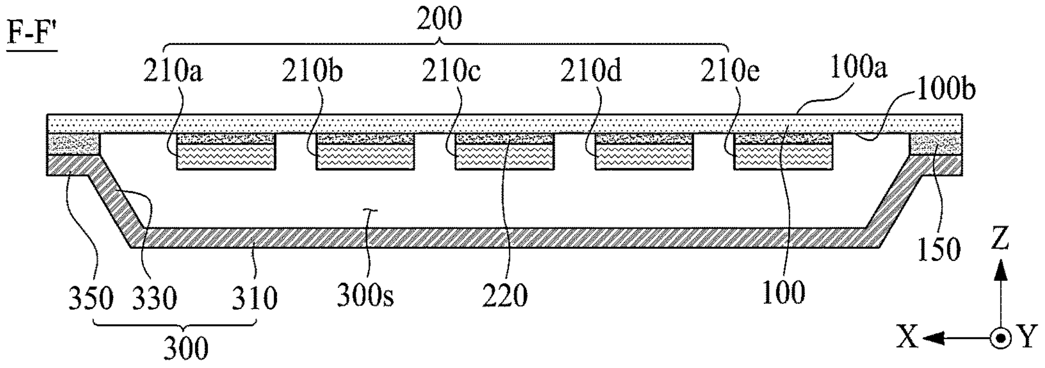
FIG. 27 is an example of a cross-sectional view taken along line F-F' illustrated in FIG. 26.
Figure 28:
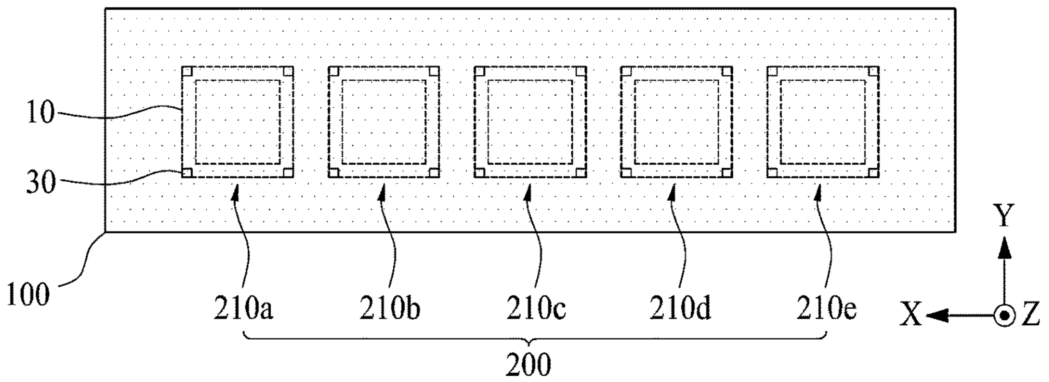
FIG. 28 is an example of a plan view of the apparatus illustrated in FIG. 27.

FIG. 26 illustrates an apparatus according to another example embodiment of the present disclosure, FIG. 27 is an example of a cross-sectional view taken along line F-F' illustrated in FIG. 26, and FIG. 28 is an example of a plan view of the apparatus illustrated in FIG. 27. FIGS. 26 to 28 illustrate an apparatus including the vibration apparatus described above with reference to FIGS. 1 to 20.

With reference to FIGS. 26 to 28, an apparatus according to another example embodiment of the present disclosure may implement a sound apparatus, a sound output apparatus, a sound bar, a sound system, a sound apparatus for vehicular apparatuses, a sound output apparatus for vehicular apparatuses, or a sound bar for vehicular apparatuses, or the like, as described above with reference to FIG. 24.

The apparatus according to another example embodiment of the present disclosure may further include a vibration member 100, a vibration generating apparatus 200, and a housing 300.

The vibration member 100 may output a sound and/or a vibration based on a vibration of the vibration generating apparatus 200. Accordingly, the vibration member 100 may be referred to as a vibration object, a vibration plate, a vibration panel, a sound plate, a sound output member, a sound panel, a sound output panel, a passive vibration member, a forward member, or a front member, but embodiments of the present disclosure are not limited thereto. For example, the vibration member 100 may be substantially the same as the vibration member 100 described above with reference to FIGS. 24 and 25, and thus, like reference numerals may refer to like elements, and the repetitive description thereof may be omitted for brevity.

The vibration generating apparatus 200 may be configured to vibrate (or displace) the vibration member 100. The vibration generating apparatus 200 may include a plurality of vibration devices 210*a* to 210*e*. For example, the vibration generating apparatus 200 may include a plurality of vibration devices 210*a* to 210*e* which are arranged at a certain interval along one or more direction of a first direction X and a second direction Y.

Each of the plurality of vibration devices 210*a* to 210*e* may each be substantially the same as the vibration apparatus including the vibration generator 10 and the sensor portion 30 described above with reference to FIGS. 1 to 20, and thus, their repetitive descriptions may be omitted for brevity.

According to an example embodiment of the present disclosure, each of the plurality of vibration devices 210*a* to 210*e* may be electrically coupled to the vibration driving circuit 250 described above with reference to FIG. 24. For example, the vibration driving circuit 250 may be configured to supply the same vibration driving signal or different vibration driving signals to the vibration generator 10 of each of the plurality of vibration devices 210*a* to 210*e*, and moreover, may be configured to individually generate or correct a vibration driving signal supplied to the vibration generator 10 of each of the plurality of vibration devices 210*a* to 210*e* based on device-based sensing data sensed through the sensor portion 30 of each of the plurality of vibration devices 210*a* to 210*e*. The vibration driving circuit may be substantially the same as the vibration driving circuit 250 described above with reference to FIG. 24, and thus, the repetitive description thereof may be omitted for brevity.

Each of the plurality of vibration devices 210*a* to 210*e* may be connected or coupled to a second surface 100*b* of the vibration member 100 by a connection member 220. For example, the second surface 100*b* of the vibration member 100 may be connected or coupled to any one of a first protection member and a second protection member of each of the plurality of vibration devices 210*a* to 210*e* by the connection member 220. Accordingly, each of the plurality of vibration devices 210*a* to 210*e* may be supported by or hung on the second surface 100*b* of the vibration member 100. For example, the connection member 220 may be substantially the same as the connection member 220 described above with reference to FIGS. 24 and 25, and thus, like reference numerals refer to like elements, and the repetitive description thereof may be omitted for brevity.

The housing 300 may be disposed at the second surface 100*b* of the vibration member 100 to cover the plurality of vibration devices 210*a* to 210*e* and the second surface 100*b* of the vibration member 100. The housing 300 may include an accommodation space 300*s* for accommodating the vibration generating apparatus 200 and may have a box shape where one side is opened.

The housing 300 according to an example embodiment of the present disclosure may include one or more of a metal material and a nonmetal material (or a composite nonmetal material), but embodiments of the present disclosure are not limited thereto. For example, the housing 300 may include one or more materials of a metal material, plastic, and wood, but embodiments of the present disclosure are not limited thereto. For example, the housing 300 may be referred to as a supporting member, a case, an outer case, a case member, a housing member, a cabinet, an enclosure, a sealing member, a sealing cap, a sealing box, or a sound box, or the like, but embodiments of the present disclosure are not limited thereto. For example, the accommodation space 300*s* of the housing 300 may be referred to as a gap space, an air gap, a vibration space, a sound space, a sound box, or a closed space, or the like, but embodiments of the present disclosure are not limited thereto.

The housing 300 according to an example embodiment of the present disclosure may maintain an impedance component based on air acting on the vibration member 100 when vibration member 100 vibrates. For example, air around the vibration member 100 may resist a vibration of the vibration member 100 and may act as an impedance component having a reactance component and a resistance based on a frequency. Therefore, the housing 300 may configure a closed space which surrounds the vibration generating apparatus 200, and thus, may maintain an impedance component (or an air impedance or an elastic impedance) acting on the vibration member 100 based on air, thereby enhancing a sound characteristic and/or a sound pressure level characteristic of a low-pitched sound band generated based on the vibration of the vibration member 100 and enhancing the quality of a sound of a high-pitched sound band generated based on the vibration of the vibration member 100.

The housing 300 according to an example embodiment of the present disclosure may include a floor portion 310 and a lateral portion 330.

The floor portion 310 may be disposed at the vibration member 100 to cover the second surface 100*b* of the vibration member 100. For example, the floor portion 310 may be disposed to be spaced apart from the second surface 100*b* of the vibration member 100. For example, the floor portion 310 may be referred to as a housing plate or a housing floor portion, but embodiments of the present disclosure are not limited thereto.

The lateral portion 330 may be connected to a periphery portion of the floor portion 310. For example, the lateral portion 330 may be bent from the periphery portion of the floor portion 310 along a thickness direction Z of the vibration member 100. For example, the lateral portion 330 may be parallel to the thickness direction Z of the vibration member 100, or may be inclined from the thickness direction Z of the vibration member 100. For example, the lateral portion 330 may include first to fourth lateral portions. For example, the lateral portion 330 may be referred to as a housing lateral surface or a housing sidewall, but embodiments of the present disclosure are not limited thereto.

The lateral portion 330 may be integrated into the floor portion 310. For example, the floor portion 310 and the lateral portion 330 may be provided as one body, and thus, the accommodation space 300*s* surrounded by the lateral portion 330 may be provided on the floor portion 310. Accordingly, the floor portion 310 and the lateral portion 330 may have a box shape where one side is opened.

The lateral portion 330 may be connected or coupled to the second surface 100*b* of the vibration member 100 by a connection member 150. For example, the lateral portion 330 may be connected or coupled to a periphery portion of the second surface 100*b* of the vibration member 100 by the connection member 150.

The housing 300 according to an example embodiment of the present disclosure may further include a connection frame portion 350.

The connection frame portion 350 may be connected to the lateral portion 330. For example, the connection frame portion 350 may be disposed in parallel with the floor portion 310 and may be connected to the lateral portion 330. The connection frame portion 350 may be bent from an end of the lateral portion 330 so as to be parallel to the first direction X and may extend to have a certain length along the first direction X. The connection frame portion 350 may include an opening portion corresponding to the accommodation space 300*s* provided on the floor portion 310 by the lateral portion 330. The floor portion 310, the lateral portion 330, and the connection frame portion 350 may be provided as one body, and thus, the floor portion 310, the lateral portion 330, and the connection frame portion 350 may have a box shape where one side is opened. For example, the connection frame portion 350 may be referred to as a housing connection portion, a housing eaves portion, or a housing skirt portion, or the like, but embodiments of the present disclosure are not limited thereto.

According to an example embodiment of the present disclosure, when the housing 300 includes the connection frame portion 350, the connection member 150 may be disposed between the connection frame portion 350 of the housing 300 and the second surface 100*b* of the vibration member 100. For example, the connection member 150 may connect or couple the periphery portion of the second surface 100*b* of the vibration member 100 to the connection frame portion 350.

According to an example embodiment of the present disclosure, the connection member 150 may be configured to minimize or prevent the vibration of the vibration member 100 from being transmitted to the housing 300. For example, the connection member 150 may include a material characteristic suitable for blocking a vibration. For example, the connection member 150 may include a material having elasticity for vibration absorption (or impact absorption). The connection member 150 according to an example embodiment of the present disclosure may be configured with (or may include) polyurethane material, or polyolefin material, but embodiments of the present disclosure are not limited thereto. For example, the connection member 150 according to an example embodiment of the present disclosure may include one or more of an adhesive, a double-sided tape, a double-sided foam tape, and a double-sided cushion tape, but embodiments of the present disclosure are not limited thereto.

As described above, the apparatus according to another example embodiment of the present disclosure may have the same effect as the apparatus described above with reference to FIGS. 24 and 25. In addition, the apparatus according to another example embodiment of the present disclosure may include the housing 300 which is configured to cover the second surface 100*b* of the vibration member 100 and the vibration generating apparatus 200, and thus, a sound characteristic and/or a sound pressure level characteristic of the low-pitched sound band generated based on a vibration of the vibration member 100 may be enhanced and the quality of a sound of the high-pitched sound band may be enhanced.

Figure 29:
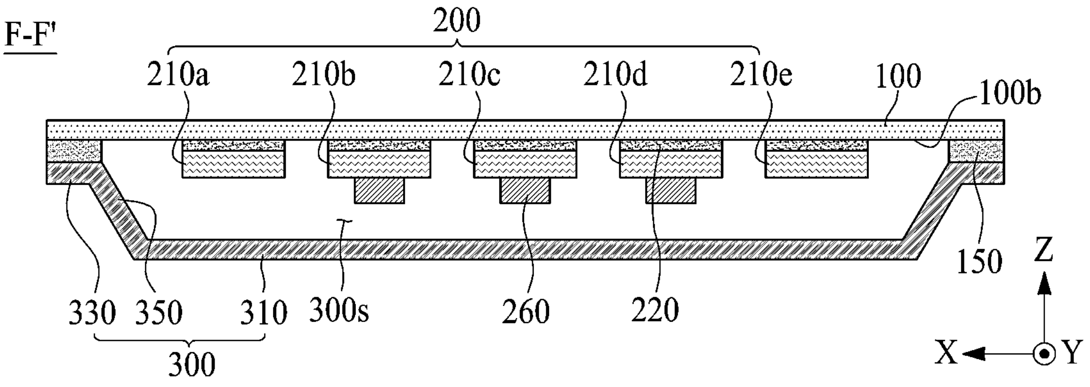
FIG. 29 is an example of another cross-sectional view taken along line F-F' illustrated in FIG. 26.
Figure 30:
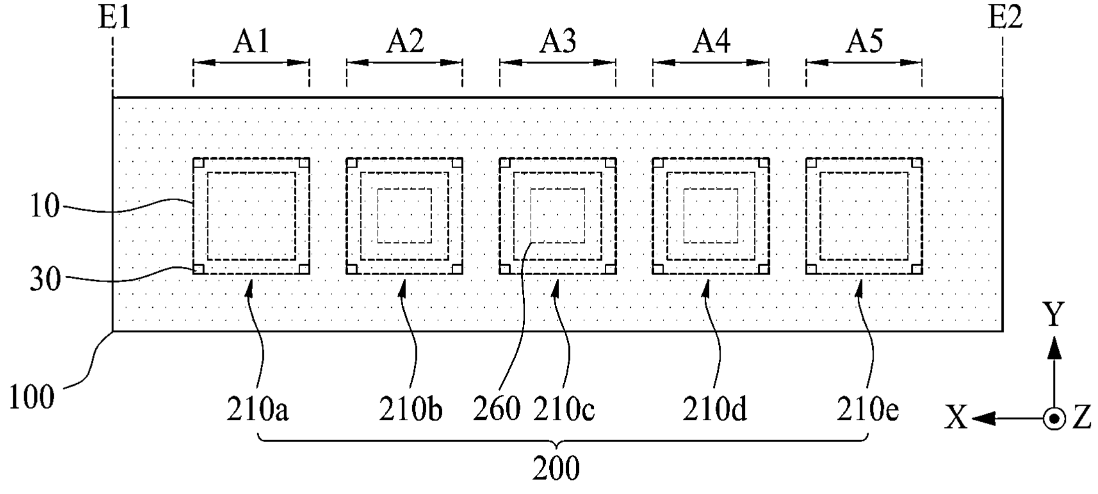
FIG. 30 is an example of a plan view of the apparatus illustrated in FIG. 29.

FIG. 29 is an example of another cross-sectional view taken along line F-F' illustrated in FIG. 26. FIG. 30 is an example of a plan view of the apparatus illustrated in FIG. 29. FIGS. 29 and 30 illustrate an example embodiment where a vibration control member is added to the apparatus described above with reference to FIGS. 27 and 28. In the following description, therefore, the elements except a vibration control member and relevant elements thereto may be referred to by like reference numerals, and their repetitive descriptions may be omitted or will be briefly given.

With reference to FIGS. 26, 29, and 30, an apparatus or a vibration generating apparatus 200 according to another example embodiment of the present disclosure may further include a vibration control member 260.

A vibration member 100 may include a plurality of regions A1 to A5. For example, the vibration member 100 may include first to fifth regions A1 to A5. The first region A1 may be disposed closest to one periphery portion (or a first periphery portion) E1 of the vibration member 100. The fifth region A5 may be disposed closest to the other periphery portion (or a second periphery portion) E2, which is opposite or parallel to the one periphery portion E1, of the vibration member 100. The second to fourth regions A2 to A4 may be disposed in a center region of the vibration member 100. The third region A3 may be disposed in the center region of the vibration member 100.

The plurality of regions A1 to A5 may include one or more vibration devices 210*a* to 210*e*. For example, the vibration generating apparatus 200 may include first to fifth vibration devices 210*a* to 210*e* which are respectively disposed in the plurality of regions A1 to A5.

Each of the first to fifth vibration devices 210*a* to 210*e* may identically vibrate based on the same vibration driving signal according to control by a vibration driving circuit, or may individually (or differently) vibrate based on a vibration driving signal which is individually controlled. For example, the vibration driving circuit may supply the same vibration driving signal to each of the first to fifth vibration devices 210*a* to 210*e*, or may supply different vibration driving signals to one or more of the first to fifth vibration devices 210*a* to 210*e*. The vibration driving circuit may be respectively and substantially the same as the vibration driving circuit 250 described above with reference to FIG. 24, and thus, the repetitive description thereof may be omitted for brevity.

The apparatus or the vibration generating apparatus 200 according to another example embodiment of the present disclosure may further include one or more vibration control members 260 which are coupled to respective one or more of the vibration devices 210*a* to 210*e* configured at one or more regions of the plurality of regions A1 to A5 defined in the vibration member 100. For example, the vibration control member 260 may be referred to as a mass, a mass member, a weight member, or a stiff member, but embodiments of the present disclosure are not limited thereto.

The vibration control member 260 may be configured to increase a mass distribution in a center region of the vibration member 100, and thus, may enhance a sound characteristic and/or a sound pressure level characteristic of the low-pitched sound band generated based on a vibration of each of the plurality of vibration devices 210*a* to 210*e*. For example, when a mass distribution in a center region of the vibration member 100 is relatively high, a first-order response of a vibration generated when the vibration member 100 vibrates may be enhanced, and thus, a sound characteristic and/or a sound pressure level characteristic of the low-pitched sound band may be enhanced.

The vibration control member 260 according to an example embodiment of the present disclosure may be coupled to the vibration devices 210*b*, 210*c*, and 210*d* configured at middle regions A2 to A4 among the plurality of regions A1 to A5 defined in the vibration member 100. In connection with an example embodiment of the present disclosure, the vibration control member 260 may be coupled to a rear surface of each of one or more second to fourth vibration devices 210*b*, 210*c*, and 210*d* respectively configured at the second to fourth regions A2 to A4 of the vibration member 100. With respect to another example embodiment of the present disclosure, the vibration control member 260 may be coupled to a rear surface of one or more third vibration devices 210*c* configured at the third region A3 of the vibration member 100.

The vibration control member 260 according to an example embodiment of the present disclosure may include a metal material or a high-density metal material. For example, the vibration control member 260 may include one or more materials of stainless steel, aluminum (Al), an Al alloy, a magnesium (Mg), a Mg alloy, and a magnesium-lithium (Mg—Li) alloy, but embodiments of the present disclosure are not limited thereto.

The vibration control member 260 according to an example embodiment of the present disclosure may increase a mass distribution in the center region of the vibration member 100, and thus, may enhance a first-order response of a vibration, thereby enhancing a sound characteristic and/or a sound pressure level characteristic of the low-pitched sound band generated based on a vibration of the vibration member 100. In addition, the vibration control member 260 may increase a mass of each of the second to fourth vibration devices 210*b*, 210*c*, and 210*d* provided in the center region of the vibration member 100 to decrease a resonance frequency of the center region of the vibration member 100, and thus, may enhance a sound characteristic and/or a sound pressure level characteristic of the low-pitched sound band generated based on a vibration of the vibration member 100.

As described above, the apparatus according to another example embodiment of the present disclosure may have the same effect as the apparatus described above with reference to FIGS. 24 to 28. In addition, the apparatus according to another example embodiment of the present disclosure may have a mass distribution which is relatively high in the center region of the vibration member 100, based on the vibration control member 260, thereby enhancing a sound characteristic and/or a sound pressure level characteristic of the low-pitched sound band.

Figure 31:
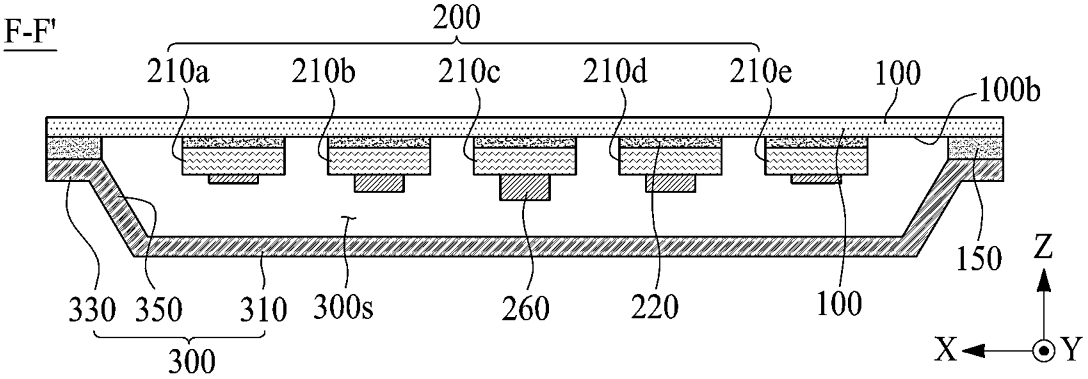
FIG. 31 is an example of another cross-sectional view taken along line F-F' illustrated in FIG. 26.
Figure 32:
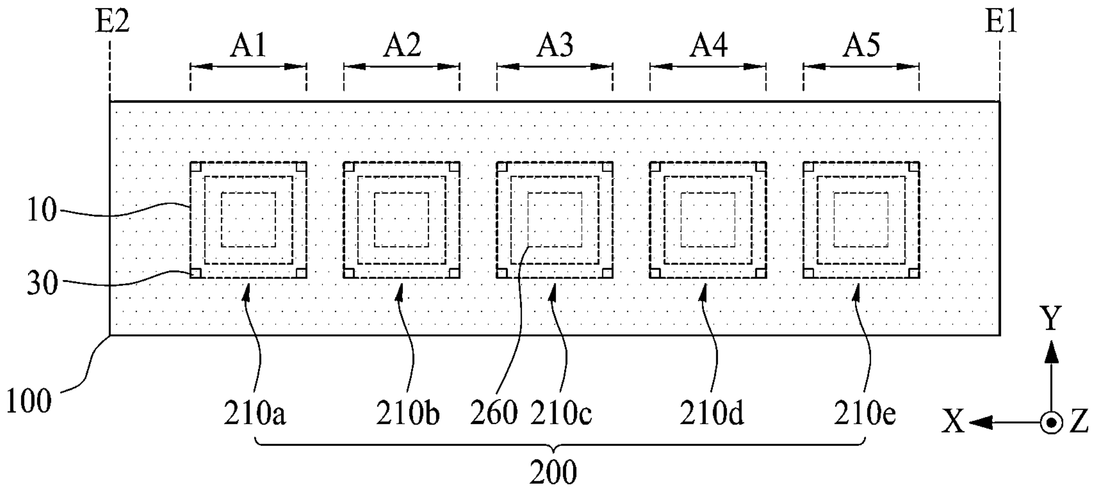
FIG. 32 is an example of a plan view of the apparatus illustrated in FIG. 31.

FIG. 31 is an example of another cross-sectional view taken along line F-F' illustrated in FIG. 26. FIG. 32 is an example of a plan view of the apparatus illustrated in FIG. 31. FIGS. 31 and 32 illustrate an example embodiment implemented by modifying the vibration control member described above with reference to FIGS. 29 and 30. In the following description, therefore, the elements except the vibration control member and relevant elements thereto may be referred to by like reference numerals, and their repetitive descriptions may be omitted or will be briefly given.

With reference to FIGS. 26, 31, and 32, an apparatus or a vibration generating apparatus 200 according to another example embodiment of the present disclosure may further include a vibration control member 260.

One or more vibration control members 260 may be coupled to one or more vibration devices 210*a* to 210*e* configured at (or provided at) each of the plurality of regions A1 to A5 defined in the vibration member 100. For example, the vibration control member 260 may be coupled to a rear surface of each of first and fifth vibration devices 210*a* to 210*e* configured at each of the plurality of regions A1 to A5 defined in the vibration member 100.

A mass of the vibration control member 260 according to another example embodiment of the present disclosure may increase toward a center portion of a vibration member 100 from periphery portions E1 and E2 of the vibration member 100. For example, a vibration control member 260 coupled to each of a first vibration device 210*a* and a fifth vibration device 210*e* configured at the first and fifth regions A1 and A5 of the vibration member 100 may have a first mass. A vibration control member 260 coupled to one or more third vibration devices 210*c* configured at a third region A3 of the vibration member 100 may have a second mass which is greater than the first mass. In addition, a vibration control member 260 coupled to each of a second vibration device 210*b* and a fourth vibration device 210*d* configured at the second and fourth regions A2 and A4 of the vibration member 100 may have a third mass which is greater than the first mass and smaller than the second mass.

According to another example embodiment of the present disclosure, a mass distribution of the vibration member 100 may increase progressively toward a center portion from the periphery portions E1 and E2 based on a region-based mass differentiation of the vibration control member 260, and thus, a vibration frequency response to a center region of the vibration member 100 may decrease and a first-order response of a vibration may be enhanced, thereby enhancing a sound characteristic and/or a sound pressure level characteristic of the low-pitched sound band generated based on a vibration of the vibration member 100 and enhancing the flatness of a sound.

Each of the first to fifth vibration devices 210*a* to 210*e* may identically vibrate based on the same vibration driving signal according to control by a vibration driving circuit, or may individually (or differently) vibrate based on a vibration driving signal which is individually controlled. For example, the vibration driving circuit may supply the same vibration driving signal to each of the first to fifth vibration devices 210*a* to 210*e*, or may supply different vibration driving signals to one or more of the first to fifth vibration devices 210*a* to 210*e*. The vibration driving circuit may be respectively and substantially the same as the vibration driving circuit 250 described above with reference to FIG. 24, and thus, the repetitive description thereof may be omitted for brevity.

As described above, the apparatus according to another example embodiment of the present disclosure may have the same effect as the apparatus described above with reference to FIG. 24. In addition, the apparatus according to another example embodiment of the present disclosure may have a mass distribution which relatively increases toward the center portion of the vibration member 100 from the edge portion of the vibration member 100, based on the vibration control member 260, thereby more enhancing a sound characteristic and/or a sound pressure level characteristic of the low-pitched sound band.

Figure 33:
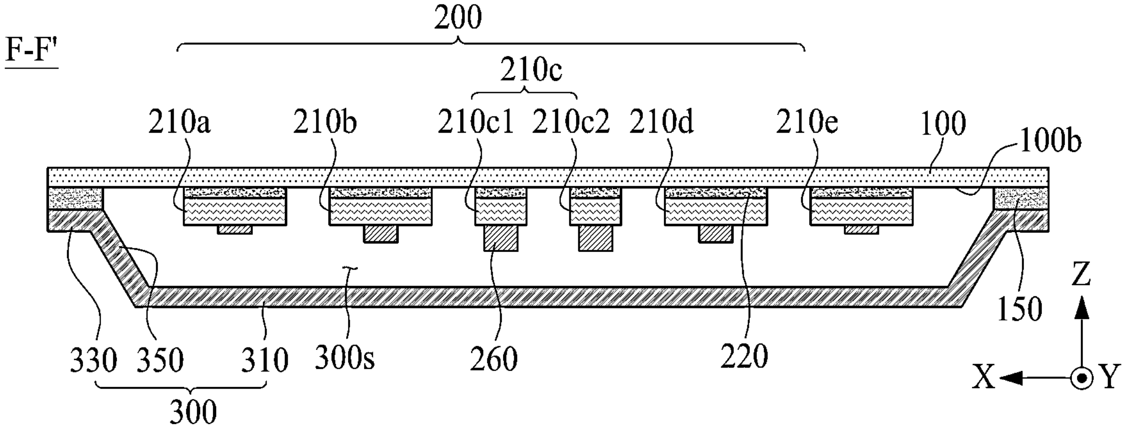
FIG. 33 is an example of another cross-sectional view taken along line F-F' illustrated in FIG. 26.
Figure 34:
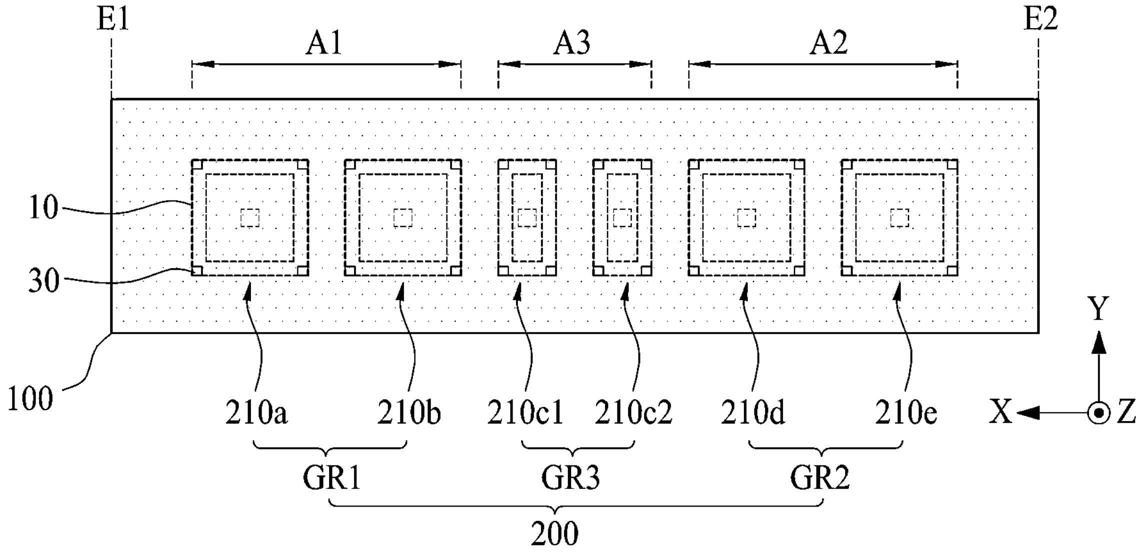
FIG. 34 is an example of a plan view of the apparatus illustrated in FIG. 33.

FIG. 33 is an example of another cross-sectional view taken along line F-F' illustrated in FIG. 26. FIG. 34 is an example of a plan view of the apparatus illustrated in FIG. 32. FIGS. 33 and 34 illustrate an example embodiment implemented by modifying the vibration generating apparatus in the apparatus described above with reference to FIGS. 27 and 28. In the following description, therefore, the elements except the vibration generating apparatus and relevant elements thereto may be referred to by like reference numerals, and their repetitive descriptions may be omitted or will be briefly given.

With reference to FIGS. 26, 33, and 34, an apparatus according to another example embodiment of the present disclosure may include a vibration member 100 and a vibration generating apparatus 200.

The vibration member 100 may include a first region A1, a second region A2, and a third region A3 between the first region A1 and the second region A2. Except that the vibration member 100 includes the first to third regions A1 to A3, the vibration member 100 may be substantially the same as the vibration member 100 described above with reference to FIGS. 27 and 28, and thus, like reference numerals may refer to like elements, and the repetitive description thereof may be omitted for brevity.

In the vibration member 100, the first region A1 may be a left region or a left channel. The second region A2 may be a right region or a right channel. The third region A3 may be a center region, a center channel, or a channel separation region.

The vibration generating apparatus 200 may include a plurality of vibration devices 210*a* to 210*e* which are connected or coupled to a second surface 100*b* of the vibration member 100 by a connection member 220. For example, the plurality of vibration devices 210*a* to 210*e* may be connected or coupled to the second surface 100*b* of the vibration member 100 to have a certain interval along a first direction X, but embodiments of the present disclosure are not limited thereto. Each of the plurality of vibration devices 210*a* to 210*e* may each be substantially the same as the vibration apparatus including the vibration generator 10 and the sensor portion 30 described above with reference to FIGS. 1 to 20, and thus, their repetitive descriptions may be omitted for brevity.

According to an example embodiment of the present disclosure, each of the plurality of vibration devices 210*a* to 210*e* may be electrically coupled to the vibration driving circuit 250 described above with reference to FIG. 24. For example, the vibration driving circuit 250 may be configured to supply the same vibration driving signal or different vibration driving signals to the vibration generator 10 of each of the plurality of vibration devices 210*a* to 210*e*, and moreover, may be configured to individually generate or correct a vibration driving signal supplied to the vibration generator 10 of each of the plurality of vibration devices 210*a* to 210*e* based on device-based sensing data sensed through the sensor portion 30 of each of the plurality of vibration devices 210*a* to 210*e*. The vibration driving circuit may be substantially the same as the vibration driving circuit 250 described above with reference to FIG. 24, and thus, the repetitive description thereof may be omitted for brevity.

The vibration generating apparatus 200 according to an example embodiment of the present disclosure may include one or more vibration devices 210*a* to 210*e* which are respectively configured at the first to third regions A1 to A3 of the vibration member 100.

According to an example embodiment of the present disclosure, the vibration generating apparatus 200 may include a plurality of vibration channels GR1, GR2, and GR3 including one or more vibration devices. For example, vibration driving signals supplied to one or more vibration devices configured in each of the plurality of vibration channels GR1, GR2, and GR3 may be the same or differ. For example, the number of vibration devices configured at each of the plurality of vibration channels (for example, first to third vibration channels) GR1, GR2, and GR3 may be the same or differ.

According to an example embodiment of the present disclosure, the vibration generating apparatus 200 may include first and second vibration devices 210*a* and 210*b* configured at the first region A1 of the vibration member 100, fourth and fifth vibration devices 210*d* and 210*e* configured at the second region A2 of the vibration member 100, and a third vibration device 210*c* configured at the third region A3 of the vibration member 100.

According to an example embodiment of the present disclosure, the third vibration device 210*c* may include a 3-1$^{st}$ vibration device 210*c*1 and a 3-2$^{nd}$ vibration device 210*c*2. Each of the 3-1$^{st}$ vibration device 210*c*1 and the 3-2$^{nd}$ vibration device 210*c*2 may have a size which is the same as or differs from each of the first, second, fourth, and fifth vibration devices 210*a*, 210*b*, 210*d*, and 210*e*. For example, each of the 3-1$^{st}$ vibration device 210*c*1 and the 3-2$^{nd}$ vibration device 210*c*2 may have a size which is smaller than each of the second vibration device 210*b* and the fourth vibration device 210*d* adjacent thereto.

The first and second vibration devices 210*a* and 210*b* may configure a first vibration channel GR1, the fourth and fifth vibration devices 210*d* and 210*e* may configure a second vibration channel GR2, and the 3-1$^{st}$ and 3-2$^{nd}$ vibration devices 210*c*1 and 210*c*2 may configure a third vibration channel GR3.

According to an example embodiment of the present disclosure, each of the first to fifth vibration devices 210*a* to 210*e* configured at each of the first to third vibration channels GR1, GR2, and GR3 may vibrate based on the same vibration driving signal. For example, the vibration driving signal may supply the same vibration driving signal of the low-pitched sound band to the first to fifth vibration devices 210*a* to 210*e* provided in each of the first to third vibration channels GR1, GR2, and GR3 based on a sound frequency of the low-pitched sound band, and thus, may enhance a sound characteristic and/or a sound pressure level characteristic of the low-pitched sound band generated based on a vibration of the vibration member 100.

According to an example embodiment of the present disclosure, each of the first and second vibration devices 210*a* and 210*b* configured at the first vibration channel GR1 may vibrate based on the same vibration driving signal to implement a left sound or a left channel. Each of the fourth and fifth vibration devices 210*d* and 210*e* configured at the second vibration channel GR2 may vibrate based on the same vibration driving signal to implement a right sound or a right channel.

According to an example embodiment of the present disclosure, a sound wave of a high-pitched sound band generated in the first vibration channel GR1 may travel to the second vibration channel GR2 through the third vibration channel GR3, and a sound wave of a high-pitched sound band generated in the second vibration channel GR2 may travel to the first vibration channel GR1 through the third vibration channel GR3, whereby a left channel and a right channel may not be separated from each other. Accordingly, the third vibration device 210*c* configured at the third vibration channel GR3 may vibrate based on the vibration driving signal to implement a sound separation channel which separates a left sound and a right sound (or the left channel and the right channel).

According to an example embodiment of the present disclosure, the 3-1$^{st}$ vibration device 210*c*1 of the third vibration channel GR3 may vibrate based on a 3-1$^{st}$ sound separation vibration driving signal to generate a first sound separation wave, and thus, may block or minimize a sound wave which travels from the first vibration channel GR1 to the second vibration channel GR2. In connection with an example embodiment of the present disclosure, the 3-1$^{st}$ sound separation vibration driving signal may have a phase which differs from a vibration driving signal supplied to the first and second vibration devices 210*a* and 210*b* of the first vibration channel GR1, or may have an anti-phase thereof. For example, a frequency component of a high-pitched sound band in the 3-1$^{st}$ sound separation vibration driving signal may have an anti-phase, corresponding to a frequency component of a high-pitched sound band, of the vibration driving signal supplied to the first and second vibration devices 210*a* and 210*b* of the first vibration channel GR1.

According to an example embodiment of the present disclosure, the 3-2$^{nd}$ vibration device 210*c*2 of the third vibration channel GR3 may vibrate based on a 3-2$^{nd}$ sound separation vibration driving signal to generate a second sound separation wave, and thus, may block or minimize a sound wave which travels from the second vibration channel GR2 to the first vibration channel GR1. In connection with an example embodiment of the present disclosure, the 3-2$^{nd}$ sound separation vibration driving signal may have a phase which differs from a vibration driving signal supplied to the fourth and fifth vibration devices 210*d* and 210*e* of the second vibration channel GR2, or may have an anti-phase thereof. For example, a frequency component of a middle-high-pitched sound band in the 3-2$^{nd}$ sound separation vibration driving signal may have an anti-phase, corresponding to a frequency component of a high-pitched sound band, of the vibration driving signal supplied to the fourth and fifth vibration devices 210*d* and 210*e* of the second vibration channel GR2.

An apparatus according to another example embodiment of the present disclosure may further include a vibration control member 260.

The vibration control member 260 may be configured so that a mass distribution of the vibration member 100 increases progressively toward a center portion thereof from a periphery portion thereof.

The vibration control member 260 may be connected or coupled to a rear surface of each of first and fifth vibration devices 210*a* to 210*e* configured at each of the first to third regions A1, A2, and A3 defined at the vibration member 100. A mass of the vibration control member 260 according to another example embodiment of the present disclosure may increase toward a center portion of the vibration member 100 from periphery portions E1 and E2 of the vibration member 100. For example, a mass of the vibration control member 260 may increase progressively toward the 3-1$^{st}$ vibration device 210*c*1 from the first vibration device 210*a* and may decrease progressively toward the fifth vibration device 210*e* from the 3-2$^{nd}$ vibration device 210*c*2. The vibration control member 260 may be respectively and substantially the same as the vibration control member 260 described above with reference to FIGS. 31 and 32, and thus, the repetitive description thereof may be omitted for brevity.

In FIGS. 33 and 34, it has been described that the vibration control member 260 is configured at each of the first to fifth vibration devices 210*a* to 210*e*, but embodiments of the present disclosure are not limited thereto. In other embodiments, as described above with reference to FIGS. 29 and 30, the vibration control member 260 may be coupled to only each of the 3-1$^{st}$ and 3-2$^{nd}$ vibration devices 210*c*1 and 210*c*2 of the third vibration channel GR3, and thus, the vibration control member 260 may relatively increase or concentrate a mass distribution at the center portion of the vibration member 100, thereby more enhancing a sound characteristic and/or a sound pressure level characteristic of the low-pitched sound band.

As described above, the apparatus according to another example embodiment of the present disclosure may have the same effect as the apparatus described above with reference to FIG. 24, or may have the same effect as the apparatus described above with reference to FIGS. 29 to 32. In addition, a left sound and a right sound may be separated from each other based on a vibration of the third vibration device 210*c* of the third vibration channel GR3 configured at a third region (or a center region) of the vibration member 100, and thus, a stereo sound based on the left and right sounds may be provided to a user and a sound characteristic and/or a sound pressure level characteristic of a low-pitched sound band of each of the left and right sounds may be enhanced by the vibration control member 260.

Figure 35:
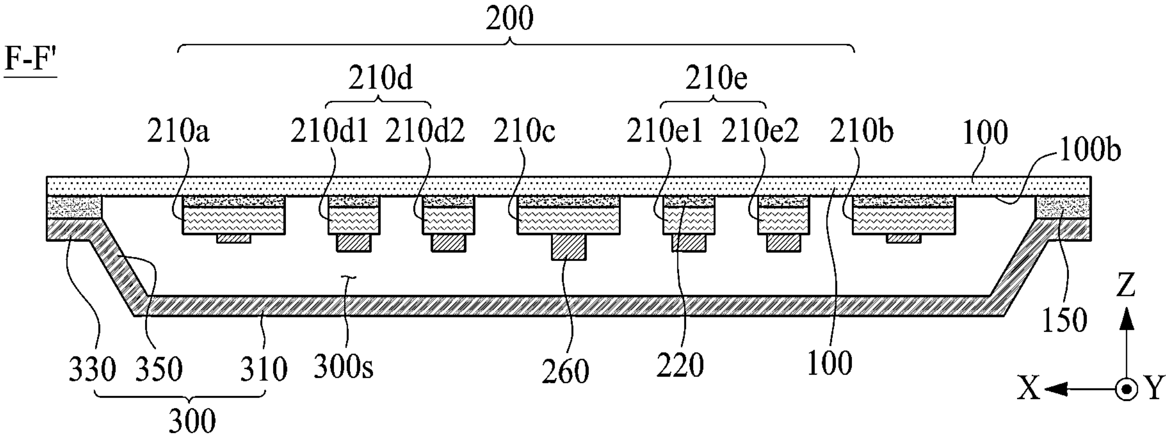
FIG. 35 is an example of another cross-sectional view taken along line F-F' illustrated in FIG. 26.
Figure 36:
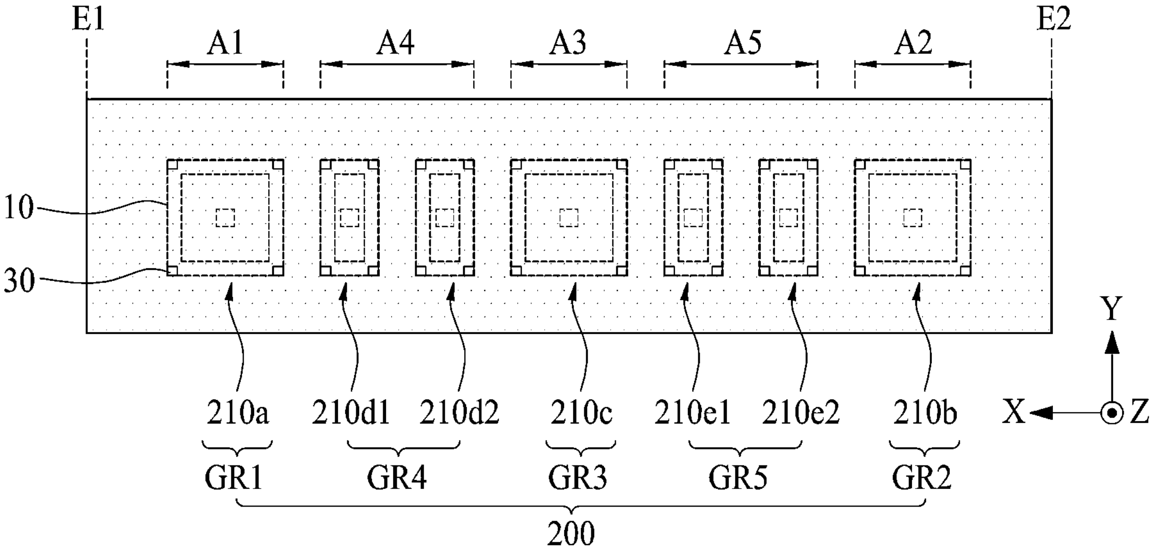
FIG. 36 is an example of a plan view of the apparatus illustrated in FIG. 35.

FIG. 35 is an example of another cross-sectional view taken along line F-F' illustrated in FIG. 26. FIG. 36 is an example of a plan view of the apparatus illustrated in FIG. 35. FIGS. 35 and 36 illustrate an example embodiment implemented by modifying a configuration of the vibration generating apparatus in the apparatus described above with reference to FIGS. 33 and 34. In the following description, therefore, the elements except the vibration generating apparatus and relevant elements thereto may be referred to by like reference numerals, and their repetitive descriptions may be omitted or will be briefly given.

With reference to FIGS. 26, 35, and 36, an apparatus according to another example embodiment of the present disclosure may include a vibration member 100 and a vibration generating apparatus 200.

The vibration member 100 may include a first region A1, a second region A2, and a third region A3 between the first region A1 and the second region A2, a fourth region A4 between the first region A1 and the third region A3, and a fifth region A5 between the second region A2 and the third region A3. Except that the vibration member 100 further includes the fourth and fifth regions A4 and A5, the vibration member 100 may be substantially the same as the vibration member 100 described above with reference to FIGS. 33 and 34, and thus, like reference numerals may refer to like elements, and the repetitive description thereof may be omitted for brevity.

In the vibration member 100, the first region A1 may be a left region or a left channel. The second region A2 may be a right region or a right channel. The third region A3 may be a center region or a center channel. The fourth region A4 may be a left channel separation region or a first channel separation region. The fifth region A5 may be a right channel separation region or a second channel separation region.

The vibration generating apparatus 200 may include a plurality of vibration devices 210*a* to 210*e* which are connected or coupled to a second surface 100*b* of the vibration member 100 by a connection member 220. For example, the plurality of vibration devices 210*a* to 210*e* may be connected or coupled to the second surface 100*b* of the vibration member 100 to have a certain interval along a first direction X, but embodiments of the present disclosure are not limited thereto. Each of the plurality of vibration devices 210*a* to 210*e* may each be substantially the same as the vibration apparatus including the vibration generator 10 and the sensor portion 30 described above with reference to FIGS. 1 to 20, and thus, their repetitive descriptions may be omitted for brevity.

According to an example embodiment of the present disclosure, each of the plurality of vibration devices 210*a* to 210*e* may be electrically coupled to the vibration driving circuit 250 described above with reference to FIG. 24. For example, the vibration driving circuit 250 may be configured to supply the same vibration driving signal or different vibration driving signals to the vibration generator 10 of each of the plurality of vibration devices 210*a* to 210*e*, and moreover, may be configured to individually generate or correct a vibration driving signal supplied to the vibration generator 10 of each of the plurality of vibration devices 210*a* to 210*e* based on device-based sensing data sensed through the sensor portion 30 of each of the plurality of vibration devices 210*a* to 210*e*. The vibration driving circuit may be substantially the same as the vibration driving circuit 250 described above with reference to FIG. 24, and thus, their repetitive descriptions may be omitted for brevity.

The vibration generating apparatus 200 according to an example embodiment of the present disclosure may include one or more vibration devices 210*a* to 210*e* which are respectively configured at the first to fifth regions A1 to A5 of the vibration member 100.

According to an example embodiment of the present disclosure, the vibration generating apparatus 200 may include a plurality of vibration channels GR1 to GR5 including one or more vibration devices. For example, vibration driving signals supplied to one or more vibration devices configured at each of the plurality of vibration channels GR1 to GR5 may be the same or differ. For example, the number of vibration devices configured at each of the plurality of vibration channels (for example, first to fifth vibration channels) GR1 to GR5 may be the same or differ.

According to an example embodiment of the present disclosure, the vibration generating apparatus 200 may include a first vibration device 210*a* configured at the first region A1 of the vibration member 100, a second vibration device 210*b* configured at the second region A2 of the vibration member 100, a third vibration device 210*c* configured at the third region A3 of the vibration member 100, a fourth vibration device 210*d* configured at the fourth region A4 of the vibration member 100, and a fifth vibration device 210*e* configured at the fifth region A5 of the vibration member 100.

According to an example embodiment of the present disclosure, the fourth vibration device 210*d* may include a 4-1$^{st}$ vibration device 210*d*1 and a 4-2$^{nd}$ vibration device 210*d*2. Each of the 4-1$^{st}$ vibration device 210*d*1 and the 4-2$^{nd}$ vibration device 210*d*2 may have a size which is the same as or differs from each of the first, second, and third vibration devices 210*a*, 210*b*, and 210*c*. For example, each of the 4-1$^{st}$ vibration device 210*d*1 and the 4-2$^{nd}$ vibration device 210*d*2 may have a size which is smaller than each of the first vibration device 210*a* and the third vibration device 210*c* adjacent thereto.

According to an example embodiment of the present disclosure, the fifth vibration device 210*e* may include a 5-1$^{st}$ vibration device 210*e*1 and a 5-2$^{nd}$ vibration device 210*e*2. Each of the 5-1$^{st}$ vibration device 210*e*1 and the 5-2$^{nd}$ vibration device 210*e*2 may have a size which is the same as or differs from each of the first, second, and third vibration devices 210*a*, 210*b*, and 210*c*. For example, each of the 5-1$^{st}$ vibration device 210*e*1 and the 5-2$^{nd}$ vibration device 210*e*2 may have a size which is smaller than each of the second vibration device 210*b* and the third vibration device 210*c* adjacent thereto.

Each of the 4-1$^{st}$ vibration device 210*d*1 and the 4-2$^{nd}$ vibration device 210*d*2 may have the same size or different sizes to each other. Each of the 5-1$^{st}$ vibration device 210*e*1 and the 5-2$^{nd}$ vibration device 210*e*2 may have the same size or different sizes to each other. Each of the 4-1$^{st}$ vibration device 210*d*1 and the 4-2$^{nd}$ vibration device 210*d*2 may have a size which is the same as or differs from each of the 5-1$^{st}$ vibration device 210*e*1 and the 5-2$^{nd}$ vibration device 210*e*2

Each of the first to fifth vibration devices 210*a* to 210*e* may configure first to fifth vibration channels GR1 to GR5, respectively.

According to an example embodiment of the present disclosure, each of the first to fifth vibration devices 210*a* to 210*e* configured at each of the first to fifth vibration channels GR1 to GR5 may vibrate based on the same vibration driving signal. For example, the vibration driving signal may supply the same vibration driving signal of the low-pitched sound band to the first to fifth vibration devices 210*a* to 210*e* provided at each of the first to third vibration channels GR1 to GR3 based on a sound frequency of the low-pitched sound band, and thus, may enhance a sound characteristic and/or a sound pressure level characteristic of the low-pitched sound band generated based on a vibration of the vibration member 100.

According to an example embodiment of the present disclosure, the first vibration device 210*a* configured at the first vibration channel GR1 may vibrate based on the vibration driving signal to implement a left sound or a left channel. The second vibration device 210*b* configured at the second vibration channel GR2 may vibrate based on the vibration driving signal to implement a right sound or a right channel. The third vibration device 210*c* configured at the third vibration channel GR3 may vibrate based on the vibration driving signal to implement a center sound or a center channel.

According to an example embodiment of the present disclosure, a sound wave of a high-pitched sound band generated in the first vibration channel GR1 may travel to the third vibration channel GR3 through the fourth vibration channel GR4, and a sound wave of a high-pitched sound band generated in the second vibration channel GR2 may travel to the third vibration channel GR3 through the fifth vibration channel GR5, whereby a left channel, a right channel, and a center channel may not be separated from each other. Accordingly, the fourth vibration device 210*d* configured at the fourth vibration channel GR4 and the fifth vibration device 210*e* configured at the fifth vibration channel GR5 may vibrate based on the vibration driving signal to implement a sound separation channel which separates each of a left sound and a right sound (or the left channel and the right channel) and a center sound (or the center channel).

According to an example embodiment of the present disclosure, the 4-1$^{st}$ vibration device 210*d*1 of the fourth vibration channel GR4 may vibrate based on a 4-1$^{st}$ sound separation vibration driving signal to generate a 4-1$^{st}$ sound separation wave, and thus, may block or minimize a sound wave which travels from the first vibration channel GR1 to the third vibration channel GR3. In connection with an example embodiment of the present disclosure, the 4-1$^{st}$ sound separation vibration driving signal may have a phase which differs from a vibration driving signal supplied to the first vibration device 210*a* of the first vibration channel GR1, or may have an anti-phase thereof. For example, a frequency component of a high-pitched sound band in the 4-1$^{st}$ sound separation vibration driving signal may have an anti-phase, corresponding to a frequency component of a high-pitched sound band, of the vibration driving signal supplied to the first vibration device 210*a* of the first vibration channel GR1.

According to an example embodiment of the present disclosure, the 4-2$^{nd}$ vibration device 210*d*2 of the fourth vibration channel GR4 may vibrate based on a 4-2$^{nd}$ sound separation vibration driving signal to generate a 4-2$^{nd}$ sound separation wave, and thus, may block or minimize a sound wave which travels from the third vibration channel GR3 to the first vibration channel GR1. In connection with an example embodiment of the present disclosure, the 4-2$^{nd}$ sound separation vibration driving signal may have a phase which differs from a vibration driving signal supplied to the third vibration device 210*c* of the third vibration channel GR3, or may have an anti-phase thereof. For example, a frequency component of a high-pitched sound band in the 4-2$^{nd}$ sound separation vibration driving signal may have an anti-phase, corresponding to a frequency component of a high-pitched sound band, of the vibration driving signal supplied to the third vibration device 210*c* of the third vibration channel GR3.

According to an example embodiment of the present disclosure, the 5-1$^{st}$ vibration device 210e1 of the fifth vibration channel GR5 may vibrate based on a 5-1$^{st}$ sound separation vibration driving signal to generate a 5-1$^{st}$ sound separation wave, and thus, may block or minimize a sound wave which travels from the third vibration channel GR3 to the second vibration channel GR2. In connection with an example embodiment of the present disclosure, the 5-1$^{st}$ sound separation vibration driving signal may have a phase which differs from a vibration driving signal supplied to the third vibration device 210c of the third vibration channel GR3, or may have an anti-phase thereof. For example, a frequency component of a high-pitched sound band in the 5-1$^{st}$ sound separation vibration driving signal may have an anti-phase, corresponding to a frequency component of a high-pitched sound band, of the vibration driving signal supplied to the third vibration device 210c of the third vibration channel GR3.

According to an example embodiment of the present disclosure, the 5-2$^{nd}$ vibration device 210e2 of the fifth vibration channel GR5 may vibrate based on a 5-2$^{nd}$ sound separation vibration driving signal to generate a 5-2$^{nd}$ sound separation wave, and thus, may block or minimize a sound wave which travels from the second vibration channel GR2 to the third vibration channel GR3. In connection with an example embodiment of the present disclosure, the 5-2$^{nd}$ sound separation vibration driving signal may have a phase which differs from a vibration driving signal supplied to the second vibration device 210b of the second vibration channel GR2, or may have an anti-phase thereof. For example, a frequency component of a high-pitched sound band in the 5-2$^{nd}$ sound separation vibration driving signal may have an anti-phase, corresponding to a frequency component of a high-pitched sound band, of the vibration driving signal supplied to the second vibration device 210b of the second vibration channel GR2.

An apparatus according to another example embodiment of the present disclosure may further include a vibration control member 260.

The vibration control member 260 may be configured so that a mass distribution of the vibration member 100 increases progressively toward a center portion thereof from a periphery portion thereof.

The vibration control member 260 may be connected or coupled to a rear surface of each of first and fifth vibration devices 210a to 210e configured at each of the first to fifth regions A1 to A5 defined at the vibration member 100. A mass of the vibration control member 260 according to another example embodiment of the present disclosure may increase toward a center portion of the vibration member 100 from periphery portions E1 and E2 of the vibration member 100. For example, a mass of the vibration control member 260 may increase progressively toward the third vibration device 210c from the first vibration device 210a and may decrease progressively toward the fifth vibration device 210e from the third vibration device 210c. The vibration control member 260 may be respectively and substantially the same as the vibration control member 260 described above with reference to FIGS. 31 and 32, and thus, the repetitive description thereof may be omitted for brevity.

In FIGS. 35 and 36, it has been described that the vibration control member 260 is configured at each of the first to fifth vibration devices 210a to 210e, but embodiments of the present disclosure are not limited thereto. In other embodiments, the vibration control member 260 may be coupled to only the third vibration devices 210c of the third vibration channel GR3, and thus, the vibration control member 260 may relatively increase or concentrate a mass distribution at the center portion of the vibration member 100, thereby more enhancing a sound characteristic and/or a sound pressure level characteristic of the low-pitched sound band.

As described above, the apparatus according to another example embodiment of the present disclosure may have the same effect as the apparatus described above with reference to FIG. 24, or may have the same effect as the apparatus described above with reference to FIGS. 29 to 32. In addition, the apparatus according to another example embodiment of the present disclosure may separate a left sound, a right sound, and a center sound based on a vibration of the fourth vibration device 210d of the fourth vibration channel GR4 provided between the first region A1 and the third region A3 of the vibration member 100 and a vibration of the fifth vibration device 210e of the fifth vibration channel GR5 provided between the second region A2 and the third region A3 of the vibration member 100, and thus, may provide a three-channel sound to a user based on the left sound, the right sound, and the center sound, thereby enhancing a sound characteristic and/or a sound pressure level characteristic of a low-pitched sound band of each of the left and right sounds by the vibration control member 260.

Figure 37:
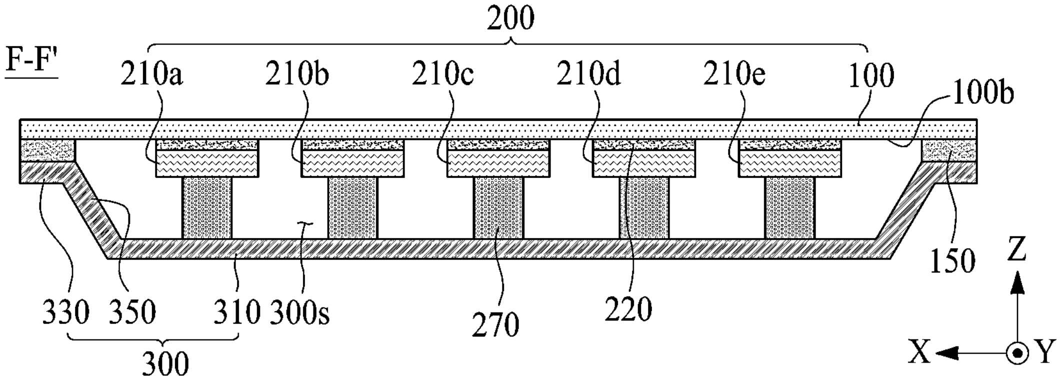
FIG. 37 is an example of another cross-sectional view taken along line F-F' illustrated in FIG. 26.
Figure 38:
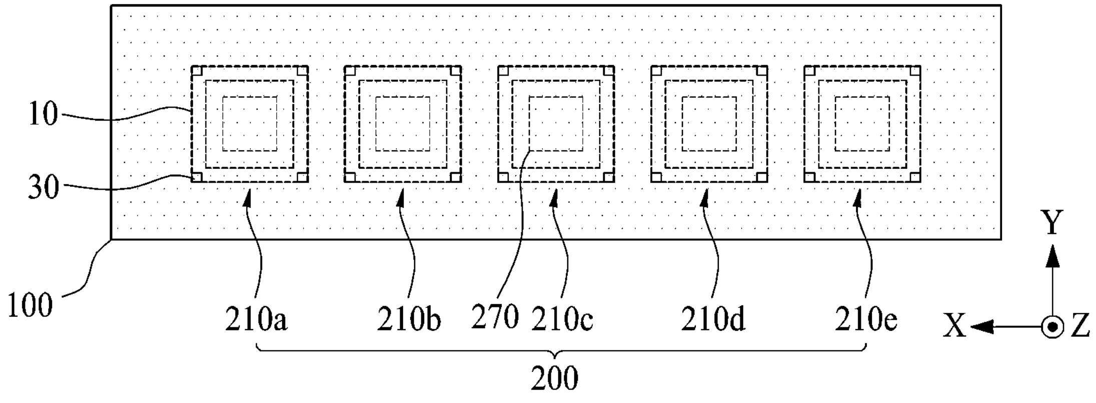
FIG. 38 is an example of a plan view of the apparatus illustrated in FIG. 37.

FIG. 37 is an example of another cross-sectional view taken along line F-F' illustrated in FIG. 26. FIG. 38 is an example of a plan view of the apparatus illustrated in FIG. 37. FIGS. 37 and 38 illustrate an example embodiment where a vibration control member is added to the apparatus described above with reference to FIGS. 27 and 28. In the following description, therefore, the elements except the vibration control member and relevant elements thereto may be referred to by like reference numerals, and their repetitive descriptions may be omitted or will be briefly given.

With reference to FIGS. 26, 37, and 38, an apparatus according to another example embodiment of the present disclosure may further include a vibration control member 270.

A vibration control member 270 may be configured to decrease a dip phenomenon of a sound generated based on a vibration of each of a plurality of vibration devices 210a to 210e. For example, the vibration control member 270 may control vibrations of the vibration devices 210a to 210e, and thus, may reduce a dip phenomenon which occurs in a frequency component of a high-pitched sound band generated based on a vibration of the vibration member 100. For example, the vibration control member 270 may reduce a dip phenomenon in a frequency of 3 kHz to 4 kHz of a sound generated based on a vibration of the vibration member 100. A frequency of 3 kHz to 4 kHz may affect an articulation of a sound, and when a dip phenomenon occurs in the frequency, a sound output characteristic may be reduced due to an unclear sound.

The vibration control member 270 according to an example embodiment of the present disclosure may be configured between a housing 300 and one or more vibration devices (for example, first to fifth vibration devices) 210a to 210e connected or coupled to the vibration member 100. The vibration control member 270 may be configured between a rear surface of each of the first to fifth vibration devices 210a to 210e and a floor portion 310 of the housing 300.

According to another example embodiment of the present disclosure, a first surface (or a front surface) of the vibration control member 270 may be attached on or coupled to the vibration devices 210a to 210e. A second surface (or a rear surface) of the vibration control member 270 may be attached on or coupled to the floor portion 310 of the housing 300. Therefore, the vibration control member 270 may support the vibration devices 210*a* to 210*e* by the floor portion 310 of the housing 300 as a supporter, and thus, the vibration devices 210*a* to 210*e* may be fixed to the housing 300 by the vibration control member 270. For example, a center portion of each of the vibration devices 210*a* to 210*e* may be fixed to the housing 300 by the vibration control member 270. Accordingly, a dip phenomenon in a frequency of 3 kHz to 4 kHz may be reduced.

According to another example embodiment of the present disclosure, the vibration control member 270 may be a mass connected between the vibration devices 210*a* to 210*e* and the housing 300 and may act as a mass value "m", a stiffness value "k", and an attenuation value "c" in a function representing a natural vibration frequency characteristic of each of the vibration devices 210*a* to 210*e* to induce an attenuation vibration of each of the vibration devices 210*a* to 210*e*, and thus, may enhance a vibration balance of the vibration devices 210*a* to 210*e* to reduce a dip phenomenon caused by a transient response, thereby enhancing the flatness of a sound. In addition, the vibration control member 270 may decrease an anti-phase vibration of each of the vibration devices 210*a* to 210*e*.

The vibration control member 270 according to an example embodiment of the present disclosure may include an elastic material for absorbing or controlling a vibration. For example, the vibration control member 270 may be configured with (or may include) one or more among a silicone-based polymer, polyolefin, paraffin wax, and an acrylic-based polymer, but embodiments of the present disclosure are not limited thereto. For example, the vibration control member 270 may be referred to as an elastic portion, a buffer member, a pad member, a foam member, a damping member, or a damping portion, but embodiments of the present disclosure are not limited thereto.

As described above, the apparatus according to another example embodiment of the present disclosure may have the same effect as the apparatus described above with reference to FIG. 24, or may have the same effect as the apparatus described above with reference to FIGS. 26 to 28. In addition, the apparatus according to another example embodiment of the present disclosure may further include the vibration control member 270 configured between the vibration devices 210*a* to 210*e* and the housing 300, and thus, a dip phenomenon of a sound occurring based on a vibration of the vibration member 100 may be reduced, thereby enhancing an output characteristic of a sound and the flatness of a sound.

Figure 39:
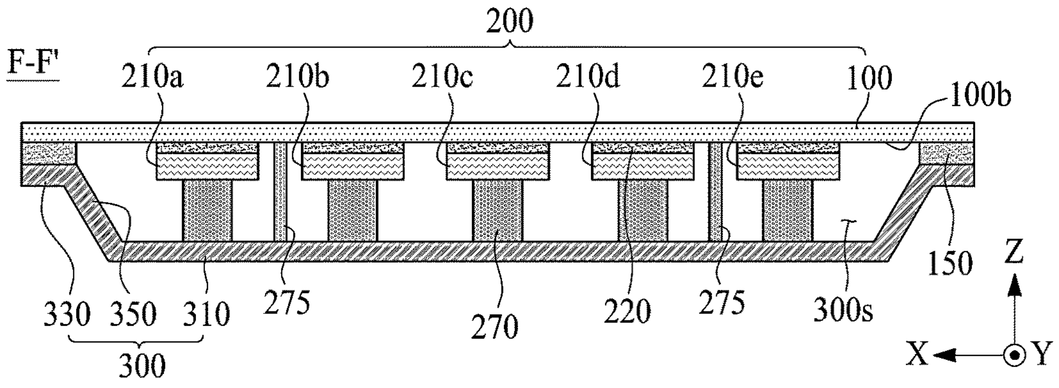
FIG. 39 is an example of another cross-sectional view taken along line F-F' illustrated in FIG. 26.
Figure 40:
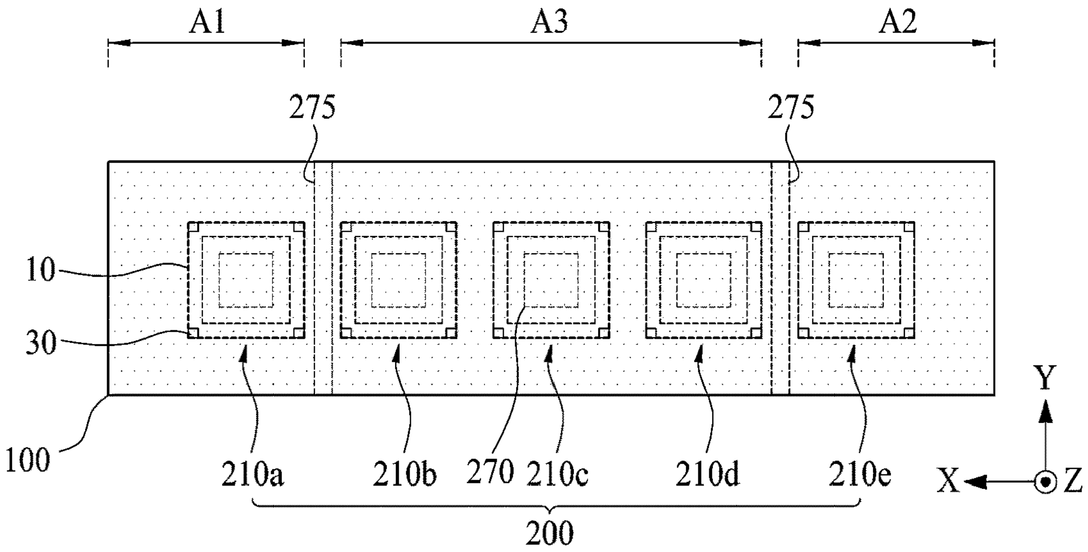
FIG. 40 is an example of a plan view of the apparatus illustrated in FIG. 39.

FIG. 39 is an example of another cross-sectional view taken along line F-F' illustrated in FIG. 26. FIG. 40 is an example of a plan view of the apparatus illustrated in FIG. 39. FIGS. 39 and 40 illustrate an example embodiment where a partition member is added to the apparatus described above with reference to FIGS. 37 and 38. In the following description, therefore, the elements except the partition member and relevant elements thereto may be referred to by like reference numerals, and their repetitive descriptions may be omitted or will be briefly given.

With reference to FIGS. 26, 39, and 40, an apparatus according to another example embodiment of the present disclosure may further include a partition member 275.

A partition member 275 according to an example embodiment of the present disclosure may be provided between a housing 300 and a second surface 100*b* of a vibration member 100 near one or more vibration devices (for example, first to fifth vibration devices) 210*a* to 210*e*. The partition member 275 may be configured between a floor portion 310 of the housing 300 and the second surface 100*b* of the vibration member 100 at one or more regions of regions between the first to fifth vibration devices 210*a* to 210*e*.

According to an example embodiment of the present disclosure, a first surface (or a front surface) of the partition member 275 may be adhered or coupled to the second surface 100*b* of the vibration member 100. A second surface (or a rear surface) of the partition member 275 may be adhered or coupled to the floor portion 310 of the housing 300. For example, the partition member 275 may be configured with (or may include) a material for absorbing or controlling a vibration. For example, the partition member 275 may include the same material as the vibration control member 270. The partition member 275 may be adhered or coupled to the floor portion 310 of the housing 300 and the second surface 100*b* of the vibration member 100 by an adhesive member such as a double-sided tape or a double-sided foam tape.

The partition member 275 according to an example embodiment of the present disclosure may attenuate a vibration of the vibration member 100 near the one or more vibration devices 210*a* to 210*e* to reduce an anti-phase vibration of the vibration member 100.

The vibration member 100 according to an example embodiment of the present disclosure may include a first region A1, a second region A2, and a third region A3 between the first region A1 and the second region A2. For example, the first region A1 may be one periphery region of the vibration member 100, the second region A2 may be the other periphery region of the vibration member 100, and the third region A3 may be a center region of the vibration member 100.

The partition member 275 according to an example embodiment of the present disclosure may be configured between the second surface 100*b* of the vibration member 100 and the floor portion 310 of the housing 300, in each of a region between the first region A1 and the third region A3 and a region between the second region A2 and the third region A3. Therefore, the partition member 275 may spatially divide each of the first to third regions A1 to A3 of the vibration member 100, and thus, may prevent or minimize sound interference between the first to third regions A1 to A3.

The number of vibration devices 210*a* to 201*e* disposed at each of the first to third regions A1 to A3 may be the same or differ. For example, each of the first region A1 and the second region A2 may include one or more vibration devices 210*a* and 201*e*. The third region A3 may include a plurality of vibration devices 210*b* to 210*d* which are more than the number of vibration devices configured at each of the first region A1 and the second region A2.

As described above, the apparatus according to another example embodiment of the present disclosure may have the same effect as the apparatus described above with reference to FIGS. 37 and 38. In addition, the apparatus according to another example embodiment of the present disclosure may further include the partition member 275 configured between the housing 300 and the vibration member 100 near the vibration devices 210*a* to 210*e*, and thus, an anti-phase vibration of the vibration member 100 may be reduced, thereby enhancing an output characteristic of a sound and the flatness of a sound.

Figure 41:
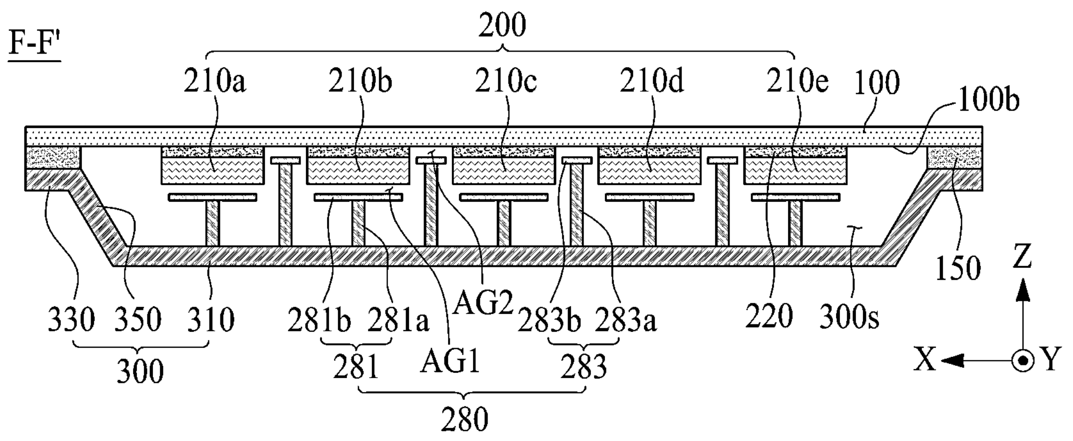
FIG. 41 is an example of another cross-sectional view taken along line F-F' illustrated in FIG. 26.
Figure 42:
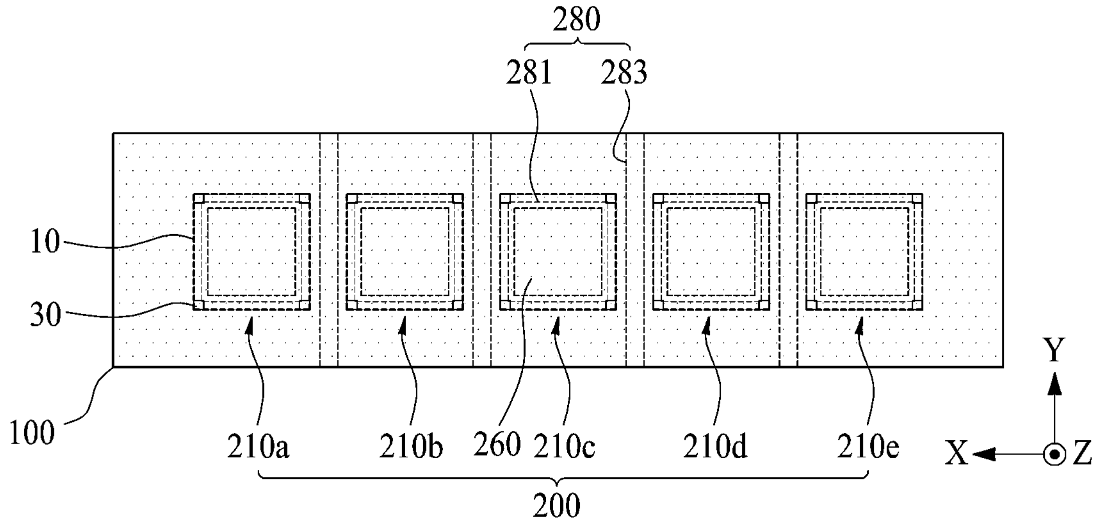
FIG. 42 is an example of a plan view of the apparatus illustrated in FIG. 41.

FIG. 41 is an example of another cross-sectional view taken along line F-F' illustrated in FIG. 26. FIG. 42 is an example of a plan view of the apparatus illustrated in FIG.

41. FIGS. 41 and 42 illustrate an example embodiment where a gap member is added to the apparatus described above with reference to FIGS. 27 and 28. In the following description, therefore, the elements except the gap member and relevant elements thereto may be referred to by like reference numerals, and their repetitive descriptions may be omitted or will be briefly given.

With reference to FIGS. 26, 41, and 42, an apparatus according to another example embodiment of the present disclosure may further include a gap member 280.

A gap member 280 may be configured to decrease an anti-phase vibration of each of a plurality of vibration devices 210*a* to 210*e*. For example, the vibration member 100 may vibrate based on a vibration of each of the plurality of vibration devices 210*a* to 210*e* configured in a certain interval, and thus, an anti-phase vibration may occur in one or more of the plurality of vibration devices 210*a* to 210*e* due to a vibration of the vibration member 100 or may occur in a region of the vibration member 100 corresponding to a region between the plurality of vibration devices 210*a* to 210*e*, whereby a vibration characteristic or a sound output characteristic of the vibration member 100 may be reduced due to the non-uniformity of a vibration or a peak phenomenon and a dip phenomenon.

One or more gap members 280 may be configured at (or provided at or in) one or more of (a) a region between one or more vibration devices 210*a* to 210*e* and a housing 300 and (b) a region between the vibration member 100 and the housing 300.

The gap member 280 according to an example embodiment of the present disclosure may include one or more of a first gap member 281 and a second gap member 283.

The first gap member 281 according to an example embodiment of the present disclosure may be configured to form a first air gap AG1 between the plurality of vibration devices 210*a* to 210*e* and the housing 300. The first gap member 281 may include a first supporting portion 281*a* and a first gap plate 281*b*.

The first supporting portion 281*a* may be configured to be vertical to a floor portion 310 of the housing 300 overlapping the plurality of vibration devices 210*a* to 210*e*. For example, the first supporting portion 281*a* may overlap a center portion of each of the plurality of vibration devices 210*a* to 210*e*. A height of the first supporting portion 281*a* may be smaller than a height between the plurality of vibration devices 210*a* to 210*e* and the floor portion 310 of the housing 300.

The first gap plate 281*b* may be configured on (or may be placed on) a top surface of the first supporting portion 281*a* to face a rear surface of each of the plurality of vibration devices 210*a* to 210*e*. The first gap plate 281*b* may be parallel to or directly face the rear surface of each of the plurality of vibration devices 210*a* to 210*e* with the first air gap AG1 therebetween. For example, the first gap plate 281*b* may have a size which is smaller than or equal to each of the plurality of vibration devices 210*a* to 210*e*.

According to an example embodiment of the present disclosure, the first supporting portion 281*a* and the first gap plate 281*b* may be configured with (or may include) the same material. For example, the first supporting portion 281*a* and the first gap plate 281*b* may be configured with a plastic material, but embodiments of the present disclosure are not limited thereto. For example, the first supporting portion 281*a* and the first gap plate 281*b* may be configured with the same material as the housing 300.

According to another example embodiment of the present disclosure, the first supporting portion 281*a* and the first gap plate 281*b* may be configured with (or may include) different materials. For example, the first supporting portion 281*a* may be configured with a plastic material or the same material as the housing 300 and the first gap plate 281*b* may be configured with a metal material or a plastic material which differs from the first supporting portion 281*a*, but embodiments of the present disclosure are not limited thereto.

The first gap member 281 according to an example embodiment of the present disclosure may provide the first air gap AG1, which is relatively narrow, in the rear surface of each of the plurality of vibration devices 210*a* to 210*e*, and thus, may perform a function of an air stiffness member. For example, the first gap member 281 may decrease an anti-phase vibration of a vibration device based on an air damping effect based on air flow in a rear surface of the vibration device and may maintain an impedance component (or an air impedance or an elastic impedance) applied to (provided at or to) each of the plurality of vibration devices 210*a* to 210*e* by air, and thus, may enhance a sound characteristic and/or a sound pressure level characteristic of a low-pitched sound band and may enhance the quality of a sound of a high-pitched sound band.

In the first gap member 281 according to an example embodiment of the present disclosure, the first gap plate 281*b* may be configured to contact or directly contact the plurality of vibration devices 210*a* to 210*e*. In this case, the first gap plate 281*b* may include a material for absorbing or controlling a vibration. The first gap member 281, where the first gap plate 281*b* is configured to directly contact the plurality of vibration devices 210*a* to 210*e*, may have substantially the same function as the vibration control member 270 described above with reference to FIGS. 27 and 28, and thus, the repetitive description thereof may be omitted for brevity.

The second gap member 283 according to an example embodiment of the present disclosure may be configured to form a second air gap AG2 between the housing 300 and the vibration member 100 near the plurality of vibration devices 210*a* to 210*e*. The second gap member 283 may be configured to spatially divide a rear space of each of the plurality of vibration devices 210*a* to 210*e*.

According to an example embodiment of the present disclosure, the second gap member 283 may include a second supporting portion 283*a* and a second gap plate 283*b*.

The second supporting portion 283*a* may be configured to be vertical to the floor portion 310 of the housing 300 overlapping the plurality of vibration devices 210*a* to 210*e*. For example, a height of the second supporting portion 283*a* may be smaller than a height between the vibration member 100 and the floor portion 310 of the housing 300. An upper portion of the second supporting portion 283*a* adjacent to a second surface 100*b* of the vibration member 100 may be disposed between the plurality of vibration devices 210*a* to 210*e*. For example, the upper portion of the second supporting portion 283*a* adjacent to the second surface 100*b* of the vibration member 100 may be parallel to or directly face lateral surfaces of the plurality of vibration devices 210*a* to 210*e* adjacent thereto.

The second gap plate 283*b* may be configured on (or may be placed on) a top surface of the second supporting portion 283*a* to face the second surface 100*b* of the vibration member 100. The second gap plate 283*b* may be parallel to or directly face the second surface 100*b* of the vibration member 100 with the second air gap AG2 therebetween.

According to an example embodiment of the present disclosure, the second supporting portion 283*a* and the second gap plate 283*b* may be configured with (or may include) the same material. For example, the second supporting portion 283*a* and the second gap plate 283*b* may be configured with a plastic material, but embodiments of the present disclosure are not limited thereto. For example, the second supporting portion 283*a* and the second gap plate 283*b* may be configured with the same material as the housing 300.

According to another example embodiment of the present disclosure, the second supporting portion 283*a* and the second gap plate 283*b* may be configured with (or may include) different materials. For example, the second supporting portion 283*a* may be configured with a plastic material or the same material as the housing 300, and the second gap plate 283*b* may be configured with a metal material or a plastic material which differs from the second supporting portion 283*a*, but embodiments of the present disclosure are not limited thereto.

The second gap member 283 according to an example embodiment of the present disclosure may provide the second air gap AG2, which is relatively narrow, in the second surface 100*b* of the vibration member 100 near the plurality of vibration devices 210*a* to 210*e*, and thus, may perform a function of an air stiffness member. For example, the second gap member 283 may decrease an anti-phase vibration of a vibration device or a region of the vibration member 100 corresponding to a region between the plurality of vibration devices 210*a* to 210*e* based on an air damping effect based on air flow between the plurality of vibration devices 210*a* to 210*e* and may maintain an impedance component (or an air impedance or an elastic impedance) applied to (provided at or to) each of the plurality of vibration devices 210*a* to 210*e* by air, and thus, may enhance a sound characteristic and/or a sound pressure level characteristic of a low-pitched sound band and may enhance the quality of a sound of a high-pitched sound band.

In the second gap member 283 according to an example embodiment of the present disclosure, the second gap plate 283*b* may be configured to contact or directly contact the second surface 100*b* of the vibration member 100. In this case, the second gap plate 283*b* may include a material for absorbing or controlling a vibration, or may be replaced with an adhesive member such as a double-sided tape or a double-sided foam tape. Accordingly, the second gap member 283 may be connected or coupled to the second surface 100*b* of the vibration member 100 and may be connected or coupled to the floor portion 310 of the housing 300, and thus, may have a function of a partition member which divides or spatially divides each of the plurality of vibration devices 210*a* to 210*e*.

As described above, the apparatus according to another example embodiment of the present disclosure may have the same effect as the apparatus described above with reference to FIG. 24, or may have the same effect as the apparatus described above with reference to FIGS. 26 to 28. In addition, the apparatus according to another example embodiment of the present disclosure may further include the gap member 280 which is configured at one or more of a region between the plurality of vibration devices 210*a* to 210*e* and the housing 300 and a region between the vibration member 100 and the housing 300, and thus, an anti-phase vibration of each of the plurality of vibration devices 210*a* to 210*e* may decrease, thereby enhancing an output characteristic of a sound and the flatness of the sound.

Figure 43A:
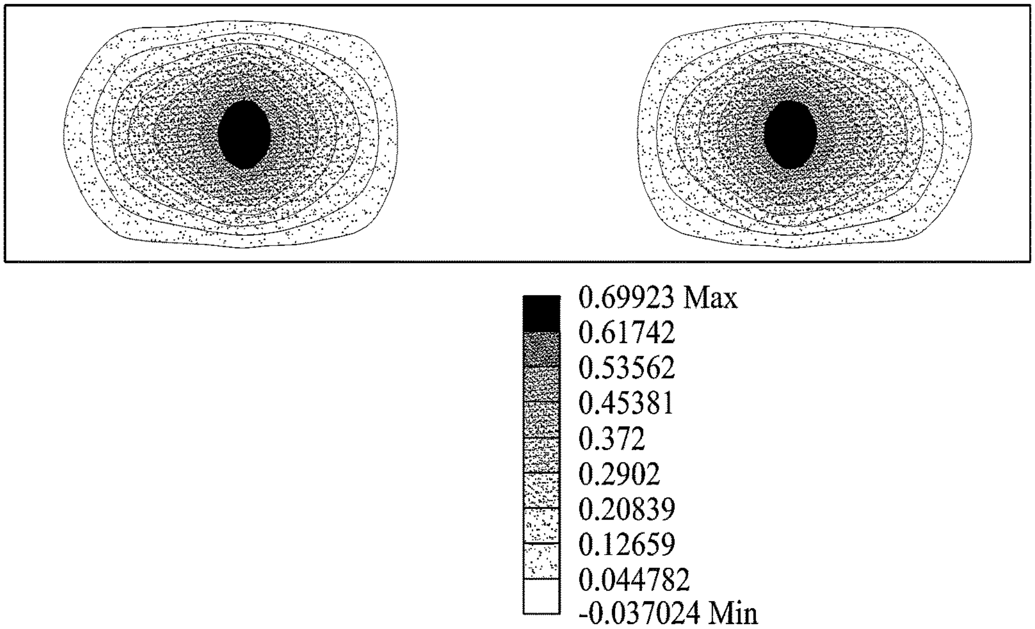
FIG. 43A is a diagram showing a vibration strength of an apparatus according to an experiment example.
Figure 43B:
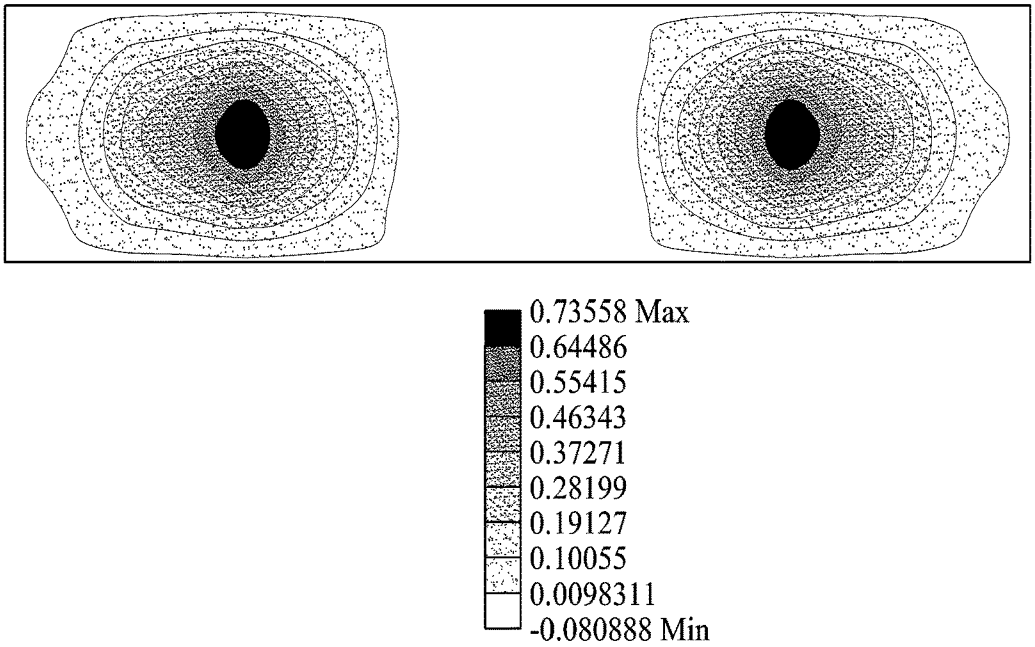
FIG. 43B is a diagram showing a vibration strength of an apparatus according to an example embodiment of the present disclosure.

FIG. 43A is a diagram showing a vibration strength of an apparatus according to an experiment example. FIG. 43B is a diagram showing a vibration strength of an apparatus according to an example embodiment of the present disclosure. FIG. 43A shows a strength of a vibration obtained by applying vibration driving signals having the same phase to two vibration devices. FIG. 43B shows a strength of a vibration obtained by applying a phase-shifted vibration driving signal to two vibration devices based on sensing data based on a sensor portion.

With reference to FIGS. 43A and 43B, it may be seen that the apparatus according to the experiment example has a vibration strength of 0.69923. It may be seen that the apparatus according to an example embodiment of the present disclosure has a vibration strength of 0.73558. In addition, in the apparatus according to an example embodiment of the present disclosure, it may be seen that a vibration area of each of two vibration devices is relatively wider than that of the apparatus according to the experiment example.

Accordingly, a vibration apparatus and an apparatus including the same according to one or more example embodiments of the present disclosure may compensate for or correct a vibration driving signal based on sensing data by a sensor portion, and thus, a sound characteristic and/or a sound pressure level characteristic may be enhanced.

A vibration apparatus according to an example embodiment of the present disclosure may be applied to (or may be implemented in or as) a vibration apparatus disposed at an apparatus (or a display apparatus). The apparatus according to an example embodiment of the present disclosure may be applied to (or may be implemented in) mobile apparatuses, video phones, smart watches, watch phones, wearable apparatuses, foldable apparatuses, rollable apparatuses, bendable apparatuses, flexible apparatuses, curved apparatuses, variable apparatuses, sliding apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration generating apparatus according to some embodiments of the present disclosure may be applied to (or may be implemented in) a light-emitting diode lighting apparatuses, organic light-emitting lighting apparatuses, or inorganic light-emitting lighting apparatuses. When the vibration apparatus is applied to lighting apparatuses, the vibration apparatus may act as lighting and a speaker. In addition, when the vibration apparatus according to some embodiments of the present disclosure is applied to (or is implemented in) a mobile device, or the like, the vibration apparatus may be one or more of a speaker, a receiver, and a haptic device, but embodiments of the present disclosure are not limited thereto. With respect to another example embodiment of the present disclosure, a vibration apparatus according to an example embodiment of the present disclosure may be applied to (or may be used with) a vibration object (or a vibration member) or a non-display apparatus instead of a display apparatus. For example, when the vibration apparatus is applied to a vibration object (or a vibration member) or a non-display apparatus instead of a display apparatus, the vibration apparatus may be a vehicle speaker or a speaker implemented along with lighting, but embodiments of the present disclosure are not limited thereto.

An apparatus according to one or more example embodiments of the present disclosure are described below.

According to some embodiments of the present disclosure, a vibration apparatus may include: a vibration generator including a piezoelectric material; and a sensor portion configured at the vibration generator.

According to some embodiments of the present disclosure, the sensor portion may be configured (or placed) inside the vibration generator. According to some other embodiments of the present disclosure, the sensor portion may be configured outside the vibration generator.

According to some embodiments of the present disclosure, the vibration generator may include an inner region and an outer region surrounding the inner region, and the sensor portion may include one or more sensors configured at one or more regions of the inner region and the outer region of the vibration generator.

According to some embodiments of the present disclosure, the vibration generator may include a plurality of corner portions and a center portion between the plurality of corner portions, and the sensor portion may include one or more sensors configured at one or more portions of the plurality of corner portions and the center portion of the vibration generator.

According to some embodiments of the present disclosure, the vibration generator may include: a vibration portion including the piezoelectric material; a first protection member disposed at a first surface of the vibration portion; and a second protection member disposed at a second surface different from the first surface of the vibration portion, and the sensor portion may be configured at one or more of the first protection member and the second protection member.

According to some embodiments of the present disclosure, the sensor portion may overlap at least a portion of the vibration portion.

According to some embodiments of the present disclosure, the sensor portion may include: a gauge pattern portion configured to contact an inner surface of any one of the first protection member and the second protection member facing the vibration portion; and a sensor lead line connected to the gauge pattern portion.

According to some embodiments of the present disclosure, the vibration generator may include: a vibration portion including the piezoelectric material; a first protection member disposed on a first surface of the vibration portion; and a second protection member disposed on a second surface different from the first surface of the vibration portion, and the sensor portion may be configured between the first protection member and the second protection member.

According to some embodiments of the present disclosure, the sensor portion may include: a base member disposed between the first protection member and the second protection member; a gauge pattern portion configured at the base member; an insulation member configured at the base member to cover the gauge pattern portion; and a sensor lead line connected to the gauge pattern portion.

According to some embodiments of the present disclosure, the vibration generator may include: a plurality of vibration structures arranged in each of a first direction and a second direction intersecting with the first direction, each of the plurality of vibration structures including the piezoelectric material; a first protection member connected to a first surface of each of the plurality of vibration structures by a first adhesive layer; and a second protection member connected to a second surface different from the first surface of each of the plurality of vibration structures by a second adhesive layer, and the sensor portion may be configured at one or more of the first protection member and the second protection member.

According to some embodiments of the present disclosure, the sensor portion may include a gauge pattern portion configured to contact an inner surface of any one of the first protection member and the second protection member facing the vibration portion, and the gauge pattern portion may be covered by one or more of the first adhesive layer and the second adhesive layer.

According to some embodiments of the present disclosure, each of the plurality of vibration structures may include: a vibration portion including the piezoelectric material and a ductile material; a first electrode portion configured between the vibration portion and the first protection member; and a second electrode portion configured between the vibration portion and the second protection member.

According to some embodiments of the present disclosure, the vibration portion may include: a plurality of inorganic material portions including the piezoelectric material; and an organic material portion between the plurality of inorganic material portions, the organic material portion including the ductile material.

According to some embodiments of the present disclosure, the vibration generator may include: a first power supply line configured between the first protection member and the first electrode portion of each of the plurality of vibration structures; and a second power supply line configured between the second protection member and the second electrode portion of each of the plurality of vibration structures.

According to some embodiments of the present disclosure, the sensor portion may include a gauge pattern portion configured on the same layer as one or more of the first power supply line and the second power supply line.

According to some embodiments of the present disclosure, the vibration apparatus may further include a vibration driving circuit connected to each of the vibration generator and the sensor portion.

According to some embodiments of the present disclosure, the vibration driving circuit may include: a signal generating circuit portion including an amplifier circuit configured to supply a vibration driving signal to the vibration generator; a sensing circuit portion connected to the sensor portion to sense an electrical characteristic change of the sensor portion to generate sensing data; and a control circuit portion configured to supply vibration data to the signal generating circuit portion and to correct a gain value of the amplifier circuit based on the sensing data.

According to some embodiments of the present disclosure, an apparatus may include: a vibration member; and a vibration generating apparatus including one or more vibration devices configured to vibrate the vibration member, where the one or more vibration devices may include a vibration apparatus, and the vibration apparatus may include: a vibration generator including a piezoelectric material; and a sensor portion configured at the vibration generator.

According to some embodiments of the present disclosure, the vibration generating apparatus may further include a vibration driving circuit connected to the sensor portion and the vibration generator configured at the one or more vibration devices.

According to some embodiments of the present disclosure, the vibration driving circuit may include: a signal generating circuit portion including an amplifier circuit configured to supply a vibration driving signal to the vibration generator; a sensing circuit portion connected to the sensor portion to sense an electrical characteristic change of the sensor portion to generate sensing data; and a control circuit portion configured to supply a vibration data to the signal generating circuit portion and to correct a gain value of the amplifier circuit based on the sensing data.

According to some embodiments of the present disclosure, the vibration generating apparatus may include a plurality of vibration channels, where each of the plurality of vibration channels may include the one or more vibration devices, and vibration driving signals supplied to the one or more vibration devices configured at each of the plurality of vibration channels may be the same or differ.

According to some embodiments of the present disclosure, the one or more vibration devices at each of the plurality of vibration channels may be configured to receive a same vibration driving signal.

According to some embodiments of the present disclosure, the one or more vibration devices at a first one of the plurality of vibration channels may be configured to receive a first vibration driving signal, and the one or more vibration devices at a second one of the plurality of vibration channels may be configured to receive a second vibration driving signal that is different from the first vibration driving signal.

According to some embodiments of the present disclosure, the number of vibration devices configured at each of the plurality of vibration channels may be the same or differ.

According to some embodiments of the present disclosure, each of the plurality of vibration channels may include the same number of vibration devices.

According to some embodiments of the present disclosure, a first one of the plurality of vibration channels may include a first number of vibration devices, and a second one of the plurality of vibration channels may include a second number of vibration devices that is different from the first number.

According to some embodiments of the present disclosure, the vibration member may include first to third regions. The vibration generating apparatus may include: a first vibration channel including the one or more vibration devices configured at the first region of the vibration member; a second vibration channel including the one or more vibration devices configured at the second region of the vibration member; and a third vibration channel including one or more vibration devices configured at the third region between the first region and the second region of the vibration member. Vibration driving signals supplied to the one or more vibration devices configured at each of the first to third vibration channels may be the same or differ.

According to some embodiments of the present disclosure, the third vibration channel may include a 3-1$^{st}$ vibration device and a 3-2$^{nd}$ vibration device, and a vibration driving signal supplied to the 3-1$^{st}$ vibration device may be the same as or differ from a vibration driving signal supplied to the 3-2$^{nd}$ vibration device.

According to some embodiments of the present disclosure, the vibration driving signal supplied to the 3-1$^{st}$ vibration device may be the same as or differ from a vibration driving signal supplied to a vibration device configured at the first vibration channel, and the vibration driving signal supplied to the 3-2$^{nd}$ vibration device may be the same as or differ from a vibration driving signal supplied to a vibration device configured at the second vibration channel.

According to some embodiments of the present disclosure, the vibration member may further include a fourth region between the first region and the third region, and a fifth region between the second region and the third region. The vibration generating apparatus may include: a fourth vibration channel including one or more vibration devices configured at the fourth region of the vibration member; and a fifth vibration channel including one or more vibration devices configured at the fifth region of the vibration member. Vibration driving signals supplied to vibration devices configured at each of the first to fifth vibration channels may be the same or differ.

According to some embodiments of the present disclosure, the fourth vibration channel may include a 4-1$^{st}$ vibration device and a 4-2$^{nd}$ vibration device, the fifth vibration channel may include a 5-1$^{st}$ vibration device and a 5-2$^{nd}$ vibration device, a vibration driving signal supplied to the 4-1$^{st}$ vibration device may be the same as or differ from a vibration driving signal supplied to the 4-2$^{nd}$ vibration device, and a vibration driving signal supplied to the 5-1$^{st}$ vibration device may be the same as or differ from a vibration driving signal supplied to the 5-2$^{nd}$ vibration device.

According to some embodiments of the present disclosure, the vibration driving signal supplied to the 4-1$^{st}$ vibration device may be the same as or differ from a vibration driving signal supplied to a vibration device configured at the first vibration channel, the vibration driving signal supplied to the 4-2$^{nd}$ vibration device may be the same as or differ from a vibration driving signal supplied to a vibration device configured at the third vibration channel, the vibration driving signal supplied to the 5-1$^{st}$ vibration device may be the same as or differ from a vibration driving signal supplied to a vibration device configured at the third vibration channel, and the vibration driving signal supplied to the 5-2$^{nd}$ vibration device may be the same as or differ from a vibration driving signal supplied to a vibration device configured at the second vibration channel.

According to some embodiments of the present disclosure, the vibration member may include a first region, a second region, and a third region. The one or more vibration devices may include one or more first vibration devices, one or more second vibration devices, and one or more third vibration devices. The vibration generating apparatus may include: a first vibration channel including the one or more first vibration devices configured at the first region of the vibration member; a second vibration channel including the one or more second vibration devices configured at the second region of the vibration member; and a third vibration channel including the one or more third vibration devices configured at the third region between the first region and the second region of the vibration member.

According to some embodiments of the present disclosure, the third vibration channel may include a first vibration device and a second vibration device. Each of the first vibration device and the second vibration device of the third vibration channel may be configured to receive a same third vibration driving signal.

According to some embodiments of the present disclosure, the third vibration channel may include a first vibration device and a second vibration device. The first vibration device of the third vibration channel may be configured to receive a first vibration driving signal. The second vibration device of the third vibration channel may be configured to receive a second vibration driving signal different from the first vibration driving signal.

According to some embodiments of the present disclosure, the one or more first vibration devices of the first vibration channel may be configured to receive a first vibration driving signal. The one or more second vibration devices of the second vibration channel may be configured to receive a second vibration driving signal.

According to some embodiments of the present disclosure, the first vibration driving signal may be the same as the second vibration driving signal, and the first vibration driving signal may be different from the third vibration driving signal.

According to some embodiments of the present disclosure, the first vibration driving signal may be different from the second vibration driving signal, and the first vibration driving signal may be different from the third vibration driving signal.

According to some embodiments of the present disclosure, the vibration member may include a fourth region between the first region and the third region, and a fifth region between the second region and the third region. The one or more vibration devices may include one or more fourth vibration devices and one or more fifth vibration devices. The vibration generating apparatus may further include: a fourth vibration channel including the one or more fourth vibration devices configured at the fourth region of the vibration member; and a fifth vibration channel including the one or more fifth vibration devices configured at the fifth region of the vibration member.

According to some embodiments of the present disclosure, the one or more fourth vibration devices and the one or more fifth vibration devices may be configured to receive a same vibration driving signal.

According to some embodiments of the present disclosure, the one or more fourth vibration devices may be configured to receive a fourth vibration driving signal, and the one or more fifth vibration devices may be configured to receive a fifth vibration driving signal different from the fourth vibration driving signal.

According to some embodiments of the present disclosure, the vibration member may include a plurality of regions, each of the plurality of regions may include the one or more vibration devices, and the vibration generating apparatus may further include a vibration control member connected to the one or more vibration devices configured at a center region of the plurality of regions.

According to some embodiments of the present disclosure, a mass distribution of the vibration member connected to the vibration generating apparatus may be greater in a center portion than a periphery portion.

According to some embodiments of the present disclosure, a mass distribution of the vibration member connected to the vibration generating apparatus may increase toward a center portion from a periphery portion.

According to some embodiments of the present disclosure, the apparatus may further include: a housing covering a rear surface of the vibration member and the vibration generating apparatus; and a vibration control member configured between the rear surface of the vibration member and the housing.

According to some embodiments of the present disclosure, the vibration control member may include an elastic material.

According to some embodiments of the present disclosure, the apparatus may further include a partition member configured between the housing and the rear surface of the vibration member near the one or more vibration devices.

According to some embodiments of the present disclosure, the vibration member may include a first region, a second region, and a third region between the first region and the second region, and the partition member may divide each region between the first to third regions.

According to some embodiments of the present disclosure, each of the first to third regions may include the one or more vibration devices, and the number of vibration devices configured at the third region may be more than the number of vibration devices configured at each of the first region and the second region.

According to some embodiments of the present disclosure, the apparatus may further include: a housing covering a rear surface of the vibration member and the vibration generating apparatus; and a gap member configured at one or more of a region between the one or more vibration devices and the housing and a region between the rear surface of the vibration member and the housing.

According to some embodiments of the present disclosure, the gap member may include one or more among a first gap member configured between the one or more vibration devices and the housing with a first air gap therebetween and a second gap member configured between the vibration member and the housing with a second air gap therebetween.

According to some embodiments of the present disclosure, the vibration generating apparatus may include a plurality of vibration devices, the first gap member may be configured between each of the plurality of vibration devices and the housing with the first air gap therebetween, and the second gap member may be configured between the rear surface of the vibration member and the housing with the second air gap therebetween in a region between the plurality of vibration devices.

It will be apparent to those skilled in the art that various modifications and variations can be made in the present disclosure without departing from the scope of the present disclosure. Thus, it is intended that the present disclosure covers the modifications and variations of this disclosure provided they come within the scope of the appended claims and their equivalents.

What is claimed is:

1. A vibration apparatus, comprising:
- a vibration generator including a piezoelectric material; and
- a sensor portion configured at the vibration generator,
- wherein the vibration generator comprises a plurality of corner portions and a center portion between the plurality of corner portions, and
- wherein the sensor portion comprises one or more sensors configured at one or more portions of the plurality of corner portions and the center portion of the vibration generator.

2. The vibration apparatus of claim 1, wherein the sensor portion is configured inside the vibration generator.

3. The vibration apparatus of claim 1, wherein the vibration generator comprises an inner region and an outer region surrounding the inner region, and
- wherein the sensor portion comprises one or more sensors configured at the outer region of the vibration generator.

4. The vibration apparatus of claim 1, wherein the vibration generator comprises:
- a vibration portion including the piezoelectric material;
- a first protection member disposed at a first surface of the vibration portion; and a second protection member disposed at a second surface different from the first surface of the vibration portion, wherein the sensor portion is configured at one or more of the first protection member and the second protection member.

5. The vibration apparatus of claim 4, wherein the sensor portion overlaps at least a portion of the vibration portion.

6. The vibration apparatus of claim 4, wherein the sensor portion comprises:

a gauge pattern portion configured to contact an inner surface of one of the first protection member and the second protection member toward the vibration portion; and a sensor lead line connected to the gauge pattern portion.

7. The vibration apparatus of claim 1, wherein the vibration generator comprises:

a vibration portion including the piezoelectric material;

a first protection member disposed at a first surface of the vibration portion; and a second protection member disposed at a second surface different from the first surface of the vibration portion, wherein the sensor portion is between the first protection member and the second protection member.

8. The vibration apparatus of claim 7, wherein the sensor portion comprises:

a base member disposed between the first protection member and the second protection member;

a gauge pattern portion at the base member;

an insulation member at the base member to cover the gauge pattern portion; and a sensor lead line connected to the gauge pattern portion.

9. The vibration apparatus of claim 1, wherein the vibration generator comprises:

a plurality of vibration structures arranged in each of a first direction and a second direction intersecting with the first direction, each of the plurality of vibration structures including the piezoelectric material;

a first protection member connected to a first surface of each of the plurality of vibration structures by a first adhesive layer; and a second protection member connected to a second surface different from the first surface of each of the plurality of vibration structures by a second adhesive layer, wherein the sensor portion is configured at one or more of the first protection member and the second protection member.

10. The vibration apparatus of claim 9, wherein:

the sensor portion comprises a gauge pattern portion configured to contact an inner surface of one of the first protection member and the second protection member toward a vibration portion of the vibration generator; and the gauge pattern portion is covered by one or more of the first adhesive layer and the second adhesive layer.

11. The vibration apparatus of claim 9, wherein each of the plurality of vibration structures comprises:

a vibration portion including the piezoelectric material and a ductile material;

a first electrode portion configured between the vibration portion and the first protection member; and a second electrode portion configured between the vibration portion and the second protection member.

12. The vibration apparatus of claim 11, wherein the vibration portion comprises:

a plurality of inorganic material portions including the piezoelectric material; and an organic material portion between the plurality of inorganic material portions, the organic material portion including the ductile material.

13. The vibration apparatus of claim 11, wherein the vibration generator comprises:

a first power supply line configured between the first protection member and the first electrode portion of each of the plurality of vibration structures; and a second power supply line configured between the second protection member and the second electrode portion of each of the plurality of vibration structures.

14. The vibration apparatus of claim 13, wherein the sensor portion comprises a gauge pattern portion configured on the same layer as one or more of the first power supply line and the second power supply line.

15. The vibration apparatus of claim 1, further comprising a vibration driving circuit connected to each of the vibration generator and the sensor portion.

16. The vibration apparatus of claim 15, wherein the vibration driving circuit comprises:

a signal generating circuit portion including an amplifier circuit configured to supply a vibration driving signal to the vibration generator;

a sensing circuit portion connected to the sensor portion and configured to sense an electrical characteristic change of the sensor portion to generate sensing data; and a control circuit portion configured to supply a vibration data to the signal generating circuit portion and to correct a gain value of the amplifier circuit based on the sensing data.

17. An apparatus, comprising:

a vibration member; and a vibration generating apparatus including one or more vibration devices and configured to vibrate the vibration member, wherein the one or more vibration devices comprise the vibration apparatus of claim 1.

18. The apparatus of claim 17, wherein the vibration generating apparatus further comprises a vibration driving circuit connected to the sensor portion and the vibration generator configured at the one or more vibration devices.

19. The apparatus of claim 18, wherein the vibration driving circuit comprises:

a signal generating circuit portion including an amplifier circuit configured to supply a vibration driving signal to the vibration generator;

a sensing circuit portion connected to the sensor portion and configured to sense an electrical characteristic change of the sensor portion to generate sensing data; and a control circuit portion configured to supply a vibration data to the signal generating circuit portion and to correct a gain value of the amplifier circuit based on the sensing data.

20. The apparatus of claim 18, wherein:

the vibration generating apparatus comprises a plurality of vibration channels; and each of the plurality of vibration channels includes the one or more vibration devices.

21. The apparatus of claim 20, wherein the one or more vibration devices at each of the plurality of vibration channels are configured to receive a same vibration driving signal.

22. The apparatus of claim 20, wherein:

the one or more vibration devices at a first one of the plurality of vibration channels are configured to receive a first vibration driving signal; and the one or more vibration devices at a second one of the plurality of vibration channels are configured to receive a second vibration driving signal that is different from the first vibration driving signal.

23. The apparatus of claim 20, wherein each of the plurality of vibration channels includes a same number of vibration devices.

24. The apparatus of claim 20, wherein:

a first one of the plurality of vibration channels includes a first number of vibration devices; and a second one of the plurality of vibration channels includes a second number of vibration devices that is different from the first number.

25. The apparatus of claim 18, wherein:

the vibration member comprises a first region, a second region, and a third region;

the one or more vibration devices comprise one or more first vibration devices, one or more second vibration devices, and one or more third vibration devices; and the vibration generating apparatus comprises:

a first vibration channel including the one or more first vibration devices configured at the first region of the vibration member;

a second vibration channel including the one or more second vibration devices configured at the second region of the vibration member; and a third vibration channel including the one or more third vibration devices configured at the third region between the first region and the second region of the vibration member.

26. The apparatus of claim 25, wherein:

the third vibration channel comprises a first vibration device and a second vibration device; and each of the first vibration device and the second vibration device of the third vibration channel is configured to receive a same third vibration driving signal.

27. The apparatus of claim 25, wherein:

the third vibration channel comprises a first vibration device and a second vibration device;

the first vibration device of the third vibration channel is configured to receive a first vibration driving signal; and the second vibration device of the third vibration channel is configured to receive a second vibration driving signal different from the first vibration driving signal.

28. The apparatus of claim 26, wherein:

the one or more first vibration devices of the first vibration channel are configured to receive a first vibration driving signal; and the one or more second vibration devices of the second vibration channel are configured to receive a second vibration driving signal.

29. The apparatus of claim 28, wherein:

the first vibration driving signal is same as the second vibration driving signal; and the first vibration driving signal is different from the third vibration driving signal.

30. The apparatus of claim 28, wherein:

the first vibration driving signal is different from the second vibration driving signal; and the first vibration driving signal is different from the third vibration driving signal.

31. The apparatus of claim 25, wherein:

the vibration member further comprises a fourth region between the first region and the third region, and a fifth region between the second region and the third region;

the one or more vibration devices further comprise one or more fourth vibration devices and one or more fifth vibration devices; and the vibration generating apparatus further comprises:

a fourth vibration channel including the one or more fourth vibration devices configured at the fourth region of the vibration member; and a fifth vibration channel including the one or more fifth vibration devices configured at the fifth region of the vibration member.

32. The apparatus of claim 31, wherein the one or more fourth vibration devices and the one or more fifth vibration devices are configured to receive a same vibration driving signal.

33. The apparatus of claim 31, wherein:

the one or more fourth vibration devices are configured to receive a fourth vibration driving signal; and the one or more fifth vibration devices are configured to receive a fifth vibration driving signal different from the fourth vibration driving signal.

34. The apparatus of claim 17, wherein:

the vibration member comprises a plurality of regions;

each of the plurality of regions comprises the one or more vibration devices; and the vibration generating apparatus further comprises a vibration control member connected to the one or more vibration devices configured at a center region of the plurality of regions.

35. The apparatus of claim 17, wherein a mass distribution of the vibration member connected to the vibration generating apparatus is greater in a center portion than a periphery portion.

36. The apparatus of claim 17, wherein a mass distribution of the vibration member connected to the vibration generating apparatus increases toward a center portion from a periphery portion.

37. The apparatus of claim 17, further comprising:

a housing covering a rear surface of the vibration member and the vibration generating apparatus; and a vibration control member configured between the rear surface of the vibration member and the housing.

38. The apparatus of claim 37, wherein the vibration control member comprises an elastic material.

39. The apparatus of claim 37, further comprising a partition member between the housing and the rear surface of the vibration member near the one or more vibration devices.

40. The apparatus of claim 39, wherein:

the vibration member comprises a first region, a second region, and a third region between the first region and the second region; and the partition member divides each region between the first to third regions.

41. The apparatus of claim 40, wherein:

each of the first to third regions comprises the one or more vibration devices; and a number of vibration devices configured at the third region is more than a number of vibration devices configured at each of the first region and the second region.

42. The apparatus of claim 17, further comprising:

a housing covering a rear surface of the vibration member and the vibration generating apparatus; and a gap member configured at one or more of a region between the one or more vibration devices and the housing and a region between the rear surface of the vibration member and the housing.

43. The apparatus of claim 42, wherein the gap member comprises one or more among a first gap member configured between the one or more vibration devices and the housing with a first air gap therebetween and a second gap member configured between the vibration member and the housing with a second air gap therebetween.

44. The apparatus of claim 43, wherein:

the vibration generating apparatus comprises a plurality of vibration devices;

the first gap member is configured between each of the plurality of vibration devices and the housing with the first air gap therebetween; and the second gap member is configured between the rear surface of the vibration member and the housing with the second air gap therebetween in a region between the plurality of vibration devices.

* * * * *